(12) United States Patent
Hennum

(10) Patent No.: US 7,490,292 B2
(45) Date of Patent: *Feb. 10, 2009

(54) WEB-BASED INSTRUCTION

(75) Inventor: Erik Hennum, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

This patent is subject to a terminal disclaimer.

(21) Appl. No.: 09/728,073

(22) Filed: Dec. 4, 2000

(65) Prior Publication Data

US 2002/0054138 A1 May 9, 2002

Related U.S. Application Data

(63) Continuation-in-part of application No. 08/888,925, filed on Jul. 7, 1997, now Pat. No. 6,259,445.

(51) Int. Cl.
*G06F 3/00* (2006.01)
*G06F 3/048* (2006.01)

(52) U.S. Cl. .................. 715/714; 715/711; 715/715

(58) Field of Classification Search ......... 345/705–715, 345/749, 776, 802–805, 811–816, 852, 853, 345/808
See application file for complete search history.

(56) References Cited

U.S. PATENT DOCUMENTS

| | | | |
|---|---|---|---|
| 5,432,903 A | 7/1995 | Frid-Nielsen | |
| 5,481,667 A | 1/1996 | Bieniek et al. | |
| 5,493,658 A | 2/1996 | Chiang et al. | |
| 5,502,805 A * | 3/1996 | Anderson et al. | 345/781 |
| 5,602,996 A | 2/1997 | Powers, III et al. | |
| 5,678,039 A | 10/1997 | Hinks et al. | |
| 5,717,879 A | 2/1998 | Moran et al. | |
| 5,786,815 A | 7/1998 | Ford | |
| 5,798,757 A | 8/1998 | Smith | |
| 5,802,530 A * | 9/1998 | Van Hoff | 345/835 |
| 5,842,020 A * | 11/1998 | Faustini | 345/866 |

(Continued)

FOREIGN PATENT DOCUMENTS

EP 0 436 459 A 7/1991

(Continued)

OTHER PUBLICATIONS

FrontPage Screen Capture, Microsoft Copyright 1995-1999, figures 1-10.*

(Continued)

*Primary Examiner*—Weilun Lo
*Assistant Examiner*—Truc T Chuong
(74) *Attorney, Agent, or Firm*—Michael J. Buchenhorner; Prentiss W. Johnson

(57) ABSTRACT

A method performed in a web-based environment on a computer system teaches a user to implement an application. The method includes providing predetermined applications and presenting an annotation page that includes one or more annotations descriptive of a predetermined application. Each annotation includes keyword links, annotation links, and detail of implementation of the application. The method includes permitting the user to select a link in an annotation. If the user selects a keyword link, reference documentation associated with that keyword is presented. If the user selects an annotation link, another annotation descriptive of another source file of a predetermined application is presented.

26 Claims, 59 Drawing Sheets

U.S. PATENT DOCUMENTS

| | | | | |
|---|---|---|---|---|
| 5,877,757 | A | 3/1999 | Baldwin et al. | 345/336 |
| 5,883,639 | A * | 3/1999 | Walton et al. | 345/473 |
| 5,892,909 | A * | 4/1999 | Grasso et al. | 709/201 |
| 5,923,328 | A * | 7/1999 | Griesmer | 345/854 |
| 5,933,140 | A * | 8/1999 | Strahorn et al. | 345/712 |
| 5,953,011 | A | 9/1999 | Matsuoka | |
| 6,016,467 | A | 1/2000 | Newsted et al. | |
| 6,092,068 | A * | 7/2000 | Dinkelacker | 715/707 |
| 6,169,992 | B1 * | 1/2001 | Beall et al. | 345/744 |
| 6,226,654 | B1 * | 5/2001 | Van Hoff | 345/744 |
| 6,226,655 | B1 * | 5/2001 | Borman et al. | 345/764 |
| 6,247,020 | B1 * | 6/2001 | Minard | 345/854 |
| 6,275,223 | B1 * | 8/2001 | Hughes | 345/751 |
| 6,467,081 | B2 * | 10/2002 | Vaidyanathan et al. | 707/203 |
| 6,560,620 | B1 * | 5/2003 | Ching | 707/511 |

FOREIGN PATENT DOCUMENTS

| | | |
|---|---|---|
| EP | 0509947 A2 | 3/1992 |
| EP | 0 509 947 A | 10/1992 |

OTHER PUBLICATIONS

Selker, T., "COACH: A Teaching Agent That Learns", Communications of the Association for Computing Machinery, New York, vol. 37, No. 7, Jul. 1, 1994, pp. 93-99.

"NETHELP" (NetHelp Release 1.0 8 DK Documentation) and "Software Downloads", http://home.netscape.com/eng/help/sdkl/sdksite.html, pp. 1-14, p. 1, Aug. 1996.

Microsoft Word for Windows 95 Version 7.0 (copyright 1995) Online Help (OLH) System, WordBasic Reference Window, WordBasic Example Window (Screenshots A-D).

"msdn online Web Workshop," "XML Developer's Guide" Screen shot E, http://msdn.microsoft.com/xml/c-frame.htm?936810337770#/xml/xmlguide/default.asp, p. 1, before Sep. 9, 1999.

"msdn online Web Workshop," "XML Developer's Guide" Screen shot F, http://msdn.microsoft.com/xml/c-frame.htm#/xml/demos/auction/auction.asp, p. 1, before Sep. 9, 1999.

"msdn online Web Workshop," "XML Developer's Guide" Screen shot G, http://msdn.microsoft.com/xml/c-frame.htm#/xml/demos/auction/auction.asp, p. 1, before Sep. 9, 1999.

"msdn online Web Workshop," "XML Developer's Guide" Screen shot H, http://msdn.microsoft.com/xml/c-frame.htm#/xml/demos/auction/auction.asp, p. 1, before Sep. 9, 1999.

"msdn online Web Workshop," "XML Developer's Guide" Screen shot I, http://msdn.microsoft.com/xml/c-frame.htm?936796858078#/downloads/samples/internet/xml/example_files/default.asp, p. 1, before Sep. 9, 1999.

"msdn online Web Workshop," "XML Developer's Guide" Screen shot J, http://msdn.microsoft.com/workshop/index/default.asp, p. 1, before Sep. 9, 1999.

"msdn online Web Workshop," "XML Developer's Guide" Screen shot K, http://msdn.microsoft.com/xml/c-frame.htm#/xml/demos/auction/auction.asp, p. 1, before Sep. 9, 1999.

"msdn online Web Workshop," "XML Developer's Guide" Screen shot L, http://msdn.microsoft.com/xml/c-frame.htm#/xml/demos/auction/auction.asp, p. 1, before Sep. 9, 1999.

"msdn online Web Workshop," "XML Developer's Guide" Screen shot M, http://msdn.microsoft.com/downloads/samples/internet/xml/book_finder.htm, p. 1, before Sep. 9, 1999.

"msdn online Web Workshop," "XML Developer's Guide" Screen shot N, http://msdn.microsoft.com/downloads/samples/internet/xml/book_finder.htm, p. 1, before Sep. 9, 1999.

Priestley, M., "Task Oriented or Task Disoriented: Designing a Usable Help Web", Sep. 23, 1998, 16th Annual International Conference of Computer Documentation Conference Proceedings, pp. 194-199.

Rintjema, L. et al., "Creating an HTML Help System for Web-based Products", Sep. 23, 1998, 16th Annual International Conference of Computer Documentation Conference Proceedings, pp. 227-233.

"DX Windows Start Act. 27," Mainichi Communications Co., Ltdl, vol. 4 (10), p. 150-151, Aug. 29, 1999.

"Windows Introductory Lesson for Beginners, Open the Windows 95/98," Katsuhito Kiida, vol. 4(6), p. 190-191, Apr. 29, 1999.

"Comprehensive Development Environm ent for Helpfile, RolboHELP Office 7.O," Softbank Corp., vol. 5(8), p. 24-25, Aug. 1, 1999.

* cited by examiner

WordBasic Help

File  Edit  Bookmark  Options  Help

Contents | Search | Back | Print | << | >> | Index

AddAddIn, AddAddIn()

☐ Example

AddAddIn *AddIn$ [, Load]*
AddAddIn(*AddIn$ [, Load]*)

The AddAddIn statement adds a template or Word add-in library (WLL) to the list of global templates and add-ins in the Templates And Add-ins dialog box (Templates command, File menu).

| Argument | Explanantion |
|---|---|
| *AddIn$* | The path and filename of the template or WLL |
| *Load* | Specifies whether to load the template or add-in after adding it to the list: |
|  | 0 (zero)  Does not load the template or add-in |
|  | 1 or omitted  Loads the template or add-in |

The AddAddIn() function behaves the same as the statement and also returns a value corresponding to the position of the global template or add-in in the list, where 1 is the first template or add-in, 2 is the second, and so on. This value may be used with other add-in statements and functions.

You can use functions defined in a loaded WLL in a macro. Functions that take no arguments may be used just like WordBasic statements; you can return the names of these functions using CountMacros() and MacroNames$(). Functions in the WLL that take arguments must be declared using the Declare statement.

For more information on loading global templates and add-ins, see Chapter 31, "Customizing and Optimizing Word," in the *Microsoft Word User's Guide*. For more information on using functions in WLLs, see Chapter 9, "More WordBasic Techniques," in the *Microsoft Word Developer's Kit*.

See Also
Documents, Templates, and AddIns Statements and Functions
AddInState()
ClearAddIns
CountAddIns()
CountMacros()
DeleteAddIn
GetAddInID()
GetAddInName$()
MacroName$()

FIG. 5B
PRIOR ART

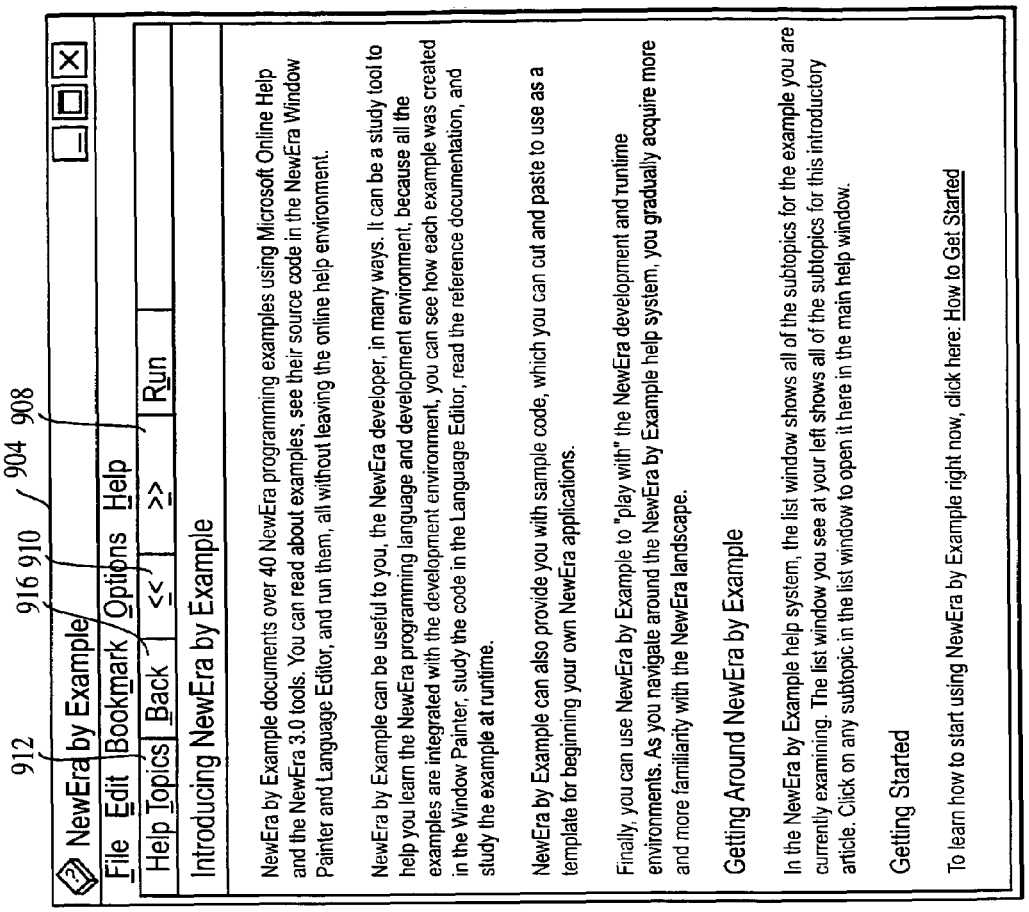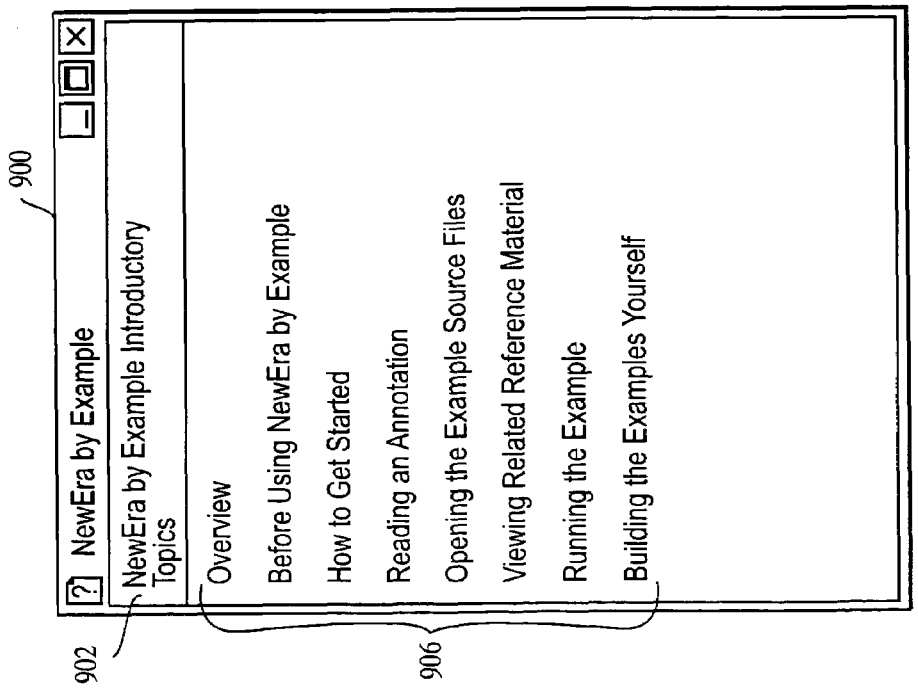
FIG. 9A nextBT :: activate()

The activate handler for the Next button. ——934

☐ button2w.wif - in nextBT handler for ixButton::activate event:

```
VARIABLE ok BOOLEAN
VARIABLE SuperTable ixSuperTable
VARIABLE rowPosition INTEGER LET SuperTable = (getVisualContainer() CAST ixSuperTable)

LET rowPosition = SuperTable.getCurrRowNum() +1

Get the number of rows for the current displayMode:
    IF rowPosition > SuperTable.getNumStoredRows(NULL) THEN} 932
    LET rowPosition = ixSuperTable::lastRow
    END IF Don't do anything w/ the return status:
    LET ok = SuperTable.setCurrentCell(rowPosition, ixSuperTable::currentColumn)} 932

Set the button states:
    CALL (getWindow() CAST exampleWin).resetSuperTableButtons( )} 932

Show the current row position:
    CALL (getWindow() CAST exampleWin).showRowInfo()} 932
```

```
NewEra by Example                                    _ □ ×
 File  Edit  Bookmark  Options  Help
 Help Topics | Back   |  <<  |  >>  |  Run  |
 The MAIN( ) FUNCTION
958──▥ button2m.4gl:

MAIN
944      VARIABLE exampleWindow exampleWin
         CALL ixSQLConnect::get ImplicitConnection() .connect("Sports")
942──    Let exampleWindow = NEW exampleWin()
         CALL exampleWindow.open()                                    ⎬940

RETURN

END MAIN
```

FIG. 9F

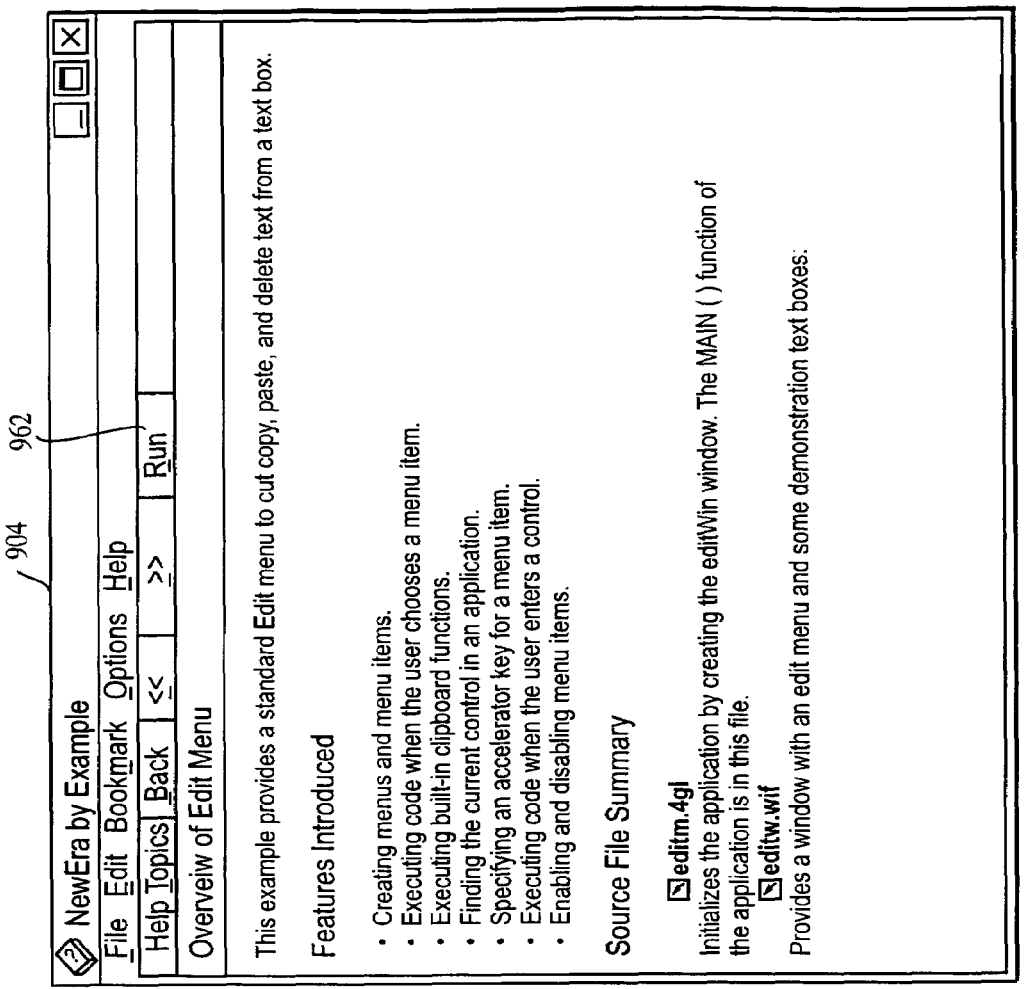
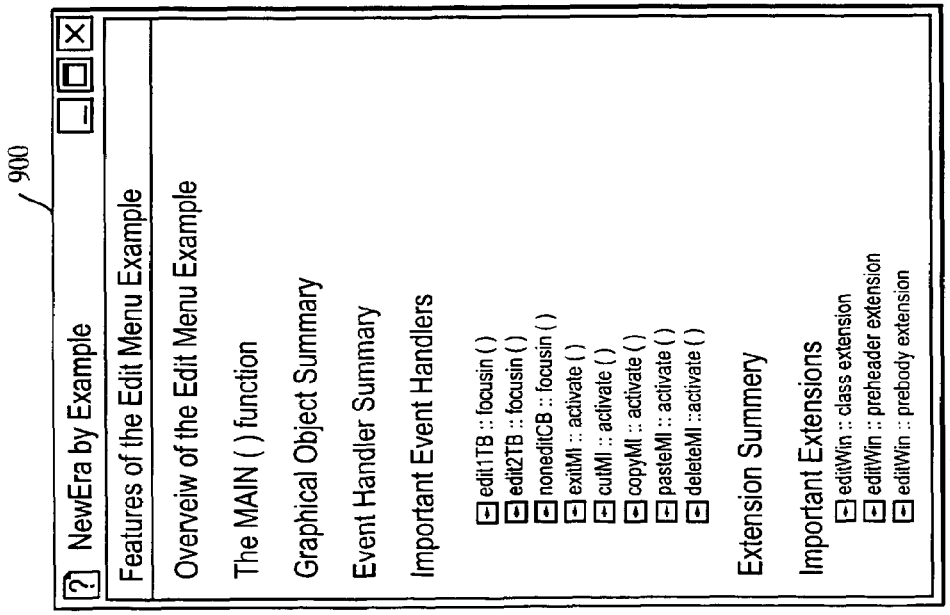
FIG. 9L

FIG. 9M

NewEra by Example — 900

Features of the Edit Menu Example

Overview of the Edit Menu Example

The MAIN ( ) function

Graphical Object Summary

Event Handler Summary

Important Event Handlers

- edit1TB :: focusin ( )
- edit2TB :: focusin ( )
- noneditCB :: focusin ( )
- exitMI :: activate ( )
- cutMI :: activate ( )
- copyMI :: activate ( )
- pasteMI :: activate ( )
- deleteMI :: activate ( )

Extension Summary

Important Extensions

- editWin :: class extension
- editWin :: preheader extension
- editWin :: prebody extension

---

NewEra by Example — 904

File  Edit  Bookmark  Options  Help

Help Topics | Back | << | >> | Run

The MAIN ( ) Function edit.4gl

```
MAIN
VARIABLE
    editWN editwin
    LET editWN = NEW editWin()
    CALL editWN.open()
RETURN
END MAIN
```

Initializes the application by creating the editWin window. MAIN defines a variable in which to store a reference to the created window, creates the window, and then opens the window.

In fact, the same actions could be performed without defining a variable as in the following example:

```
MAIN
    CALL ( NEW editWin ( ) ).open ( )
RETURN
END MAIN
```

The trick here is that we only need a reference to the editWin window to qualify the call to open ( ). Once the window is opened, the window can take care of itself. Thus, instead of capturing the reference generated by NEW in a variable, we use it instead to qualify the call to open ( ).

---

Edit Window

File  Edit

Text to edit

More text to edit

☐ CheckBox

Start Editor

Use the edit menu to cut and paste text from one textbox to the other. Use the button to start a text editor so you can paste in the editor. Tab to the checkbox and button to see disabling of the menu items.

— 964

NewEra by Example

Features of the Edit Menu Example

Overview of the Edit Menu Example

The MAIN ( ) function

Graphical Object Summary

Event Handler Summary

Important Event Handlers
- edit1TB :: focusin ( )
- edit2TB :: focusin ( )
- noneditCB :: focusin ( )
- exitMI :: activate ( )
- cutMI :: activate ( )
- copyMI :: activate ( )
- pasteMI :: activate ( )
- deleteMI :: activate ( )

Extension Summary

Important Extensions
- editWin :: class extension
- editWin :: preheader extension
- editWin :: prebody extension

---

NewEra by Example — 904

File  Edit  Bookmark  Options  Help

| Help Topics | Back | << | >> | Run | edit1TB :: focusin()

editw.wif - in edit1TB handler for ixTextBox::focusIn event:

```
VARIABLE
    win editWin = getWindow ()

CALL win.setEditItemsEnabled( SELF )
```

```
LET editWin = getWindow ( )
```

In the handler of the window, the members of the window are in scope. The members in scope include the graphical objects that you paint within the window.

In the handlers of other graphical objects, however, the members of the window are not in scope. You have to qualify a member with a reference to the window.

Each graphical object has the getWindow () member function, which conveniently returns a reference to the window. You can capture the reference in a local variable of the handler.

```
CALL win.setEditItemsEnabled( TRUE )
```

The example uses the reference to qualify the call to the setEditItemsEnabled()function. The call passes the TRUE parameter to enable the editing menu items while the user is in the text box.

---

Edit Window — 964

File  Edit

[ Text to edit ] — 966    ☐ CheckBox — 970
[ More text to edit ] — 968    [ Start Editor ]

Use the edit menu to cut and paste text from one textbox to the other. Use the button to start a text editor so you can paste in the editor. Tab to the checkbox and button to see disabling of the menu items.

NewEra by Example

Features of the Edit Menu Example

Overveiw of the Edit Menu Example

The MAIN ( ) function

Graphical Object Summary

Event Handler Summary

Important Event Handlers

- edit1TB :: focusin ( )
- edit2TB :: focusin ( )
- noneditCB :: focusin ( )
- exitMI :: activate ( )
- cutMI :: activate ( )
- copyMI :: activate ( )
- pasteMI :: activate ( )
- deleteMI :: activate ( )

Extension Summary

Important Extensions

- editWin :: class extension
- editWin :: preheader extension
- editWin :: prebody extension

---

NewEra by Example

File  Edit  Bookmark  Options  Help

Help Topics | Back | << | >> | Run noneditCB :: focusIn ( )

editw.wif - in noneditCB handler for ixCheckBox::focusIn event:

```
VARIABLE
    win editWin = getWindow ()

CALL win.setEditItemsEnabled( SELF )
```

Works in the same way as the edit1TB::focusIn ( ), but passes the FALSE parameter to disable the editing menu items while the user is in the check box.

Calls the setEditItemsEnabled ( ) function to disable the editing menu items when the user enters the check box. The user cannot paste into a check box.

---

Edit Window

File  Edit

[Text to edit]    ☑iCheckBox:
[More text to edit]    [Start Editor]

Use the edit menu to cut and paste text from one textbox to the other. Use the button to start a text editor so you can paste in the editor. Tab to the checkbox and button to see disabling of the menu items.

FIG. 9P

```
           FUNCTION driveStockRpt( destType SMALLINT, destName CHAR(*) )
1200   RETURNING VOID
       {.normal
          Since objects, in particular ixRow objects, cannot be passed
          as arguments to the report formatter, rows of fetched data will
          be unpacked into a record that matches the data types and lengths
          of elements in the fetched rows.
          }
       VARIABLE
             stockRec RECORD
                   mn CHAR(15),     -- manufact.manu_name
                   sn SMALLINT,     -- stock.stock_num
                   sd CHAR(15),     -- stock.description
                   sp MONEY(6,2),   -- stock.unit_price
                   su CHAR(4)       -- stock.unit
                END RECORD stockStmt ixSQLStmt,
             stmtString CHAR(*),
             stockRow ixRow, errorCode INTEGER,
             logFile ixErrorLog
1205
       {.normal
          Use the implicit connection object to create an SQL statement
          object. The connection object must already be connected to a
          database.
          Checking the status of the prepare( ) call will confirm this.
1210   }
       {.[edit stmt}
          LET stockStmt =
          ixSQLConnect::getImplicitConnection().createStmtObject()
          {.]file stmt}
1215
```

FIG. 12

Generating a Report Using the Web Datablade Module

1500

The customer report example demonstrates how to use the Web DataBlade module to query for data and report the results in HTML format. —1505

*Contributed by Erik Hennum, byExample Team* cust_db.html —1510

1505

This app page accepts a query and generates an HTML report querydb.html —1510

1510

1505

This HTML page contains a form that invokes an app page sportsFooter.tag —1510

1505

The sportsFooter dynamic tag generates the footer for an app page.

sportsHeader.tag —1510

1505

The sportsHeader dynamic tag generates the header for an app page.

 Click here to view or print all of the source files for this example.

FIG. 15B

1525 querydb.html File

This HTML page contains a form that invokes an app page instead of a CGI program to process the values in the form.

The sportsHeader dynamic tag creates a standard header for the HTML page as well as standard opening text.

⎫
⎬ 1535
⎭

```
<?sportsHeader title="Customer Query">   }1530
         |
        1540
```

As its action, the form must specify the Web Driver utility.

```
<P>
<FORM ACTION ="<?MIVAR>$WEB_HOME<?/MIVAR"METHOD="GET">   }1530
                    |
                   1550
```

To specify the app page, the form must use a hidden input component. The input component must have a name of MIval and a value that's the name of the app page. The input component below specifies the cust_db.html app page.

⎫
⎬ 1535
⎭

```
<INPUT TYPE="HIDDEN" NAME="MIval" VALUE="/examples/CustRpt/cust_db.html">

Optional state:
<INPUT TYPE="TEXT" NAME="SelectState" SIZE="3" MAXLENGTH="2">
<INPUT TYPE="SUBMIT" NAME="SUBMIT" VALUE="SUBMIT">

</FORM>
</P>

</BODY>
</HTML>
```

⎫
⎬ 1530
⎭

FIG. 15D querydb.html  1560

```
<!--<ibyx>
<intro>
<p><abstract>This HTML page contains a form that invokes
an app page</abstract> instead of a CGI program to process
the values in the form.
</p>
</intro>
</ibyx> -- >

<!-- <ibyx>
<p> The sportsHeader dynamic tag creates a standard header
for the HTML page as well as standard opening text.
</p>
</ibyx> -->
<?sportsHeader title="Customer Query">

<!-- <ibyx>
<p> As its action, the form must specify the Web Driver utility.
</p>
</ibyx>-->
<P>
<FORM ACTION="<?MIVAR>$WEB_HOME<?/MIVAR>" METHOD="GET">

<!-- <ibyx>
<p> To specify the app page, the form must use a hidden input component.
The input component must have a name of <strong>MIval</strong> and
a value that's the name of the app page. The input component below
specifies the <a href="cust_db.html">cust_db.html</a> app page.
</p>
</ibyx> -->
<INPUT TYPE="HIDDEN" NAME="MIval" VALUE="/examples/CustRpt/cust_db.html">

Optional state:
<INPUT TYPE="TEXT" NAME="selectState" SIZE="3" MAXLENGTH="2">
<INPUT TYPE="SUBMIT" NAME="Submit" VALUE="Submit">

</FORM>
</P>

<?annotate>

</BODY>
</HTML>
```

Annotations labeled 1535 point to the commented ibyx blocks.

FIG. 15E

```
                <!-- <ibyx>
                <intro>
                <p> <abstract>This app page accepts a query and generates an HTML
                report</abstract > in response.
1810            The app page uses dynamic tags to generate the header and footer for the
                HTML report.
                </p>
                </intro>
                </ibyx> -->
                <!-- <ibyx>
                <p> The sportsHeader dynamic tag creates a standard header
                for the HTML page as well as standard opening text.
                </p>
                </ibyx> -->
                <?sportsHeader title="Customer Report">

<!-- <ibyx>
                <p> First, the app page checks whether a state was specified to use for
                selecting customers in the state. If so, the block generates a
                paragraph to identify the state.
                </p>
                </ibyx> -->
                <?MIVAR NAME=$WHERE_STR><?/MIVAR>
                <?MIBLOCK COND="$(AND,$(XST,$selectState) ,  $ (<,0,$ (STRLEN, $selectState))]">
                        <?MIVAR NAME= $WHERE_STR>WHERE state= " $selectState"<?/MIVAR>
                        <?MIVAR><P>For state: $selectState</P><?/MIVAR>
                <?/MIBLOCK>

<!-- <ibyx>
                <p>Next, the app page starts the table that will contain the data.
                </p>
                </ibyx> -->
                        <P><TABLE BORDER="1">
                                <TR>
                                <TH>Number</TH><TH>Name</TH><TH>Company</TH><TH>State</TH>
                                </TR>

<!-- <ibyx>
                <p> The MISQL block queries for customers, optionally selecting only customers
                from the specified state. Because the contents of the block are generated
                for every row of data, a new table row describes each customer.

The & ;nbsp; HTML entity is a non-breaking space. By putting a non-breaking
                space in each column, we force the Web Browser to display the column even
                if the value is null.
                </p>
                </ibyx> -->
                <?MISQL SQL= "SELECT customer_num, fname, lname, company, state FROM customer $WHERE_STR; ">
                                <TR>
                                <TD> $1  </TD><TD>$2  $3</TD><TD>$4&NbSP;</TD><TD>$5 </TD>
                                </TR>
                <?/MISQL>

</TABLE></P>

<!-- <ibyx>
                <p> The sportsFooter dynamic tag creates a standard footer
                for the HTML page.
                </p>
                </ibyx> -->
                <?sportsFooter>
```

 Creating Web Applications with the Web DataBlade AppPage

1930

In this How To we'll build a simple Web application using Web DataBlade Application Page (AppPage). This Web application will access an Informix database.

Requirements: IDS 9.x, the Web DataBlade module, BladeManager, and a web server. BladeManager is provided with IDS 9.x for UNIX. NT users must install BladeManager from the DataBlade Development Kit (DBDK)

These instructions assume you've already installed Informix IDS 9.x and have it running locally.

1935

Define a server connection and prepare a sample database.

1. Define a server connection with setnet32 (NT). Create a sample database or use the stores7 demo database.
   ▷ Prepare Database.

2. Prepare the Web DataBlade development environment.
   Install the Web DataBlade module and BladeManager.
   ▷ Prepare Web DataBlade Development Environment.

3. Register the Web DataBlade module in the demo database with BladeManager.
   ▷ Register the Web DataBlade.

4. Create a sbspace for smart large objects, like gifs.
   ▷ Create Smart Blob Space (sbspace).

5. Install AppPage Builder in your database.
   ▷ Install AppPage Builder in Your Database.

6. Setup AppPage Builder on your web server.
   ▷ Setup AppPage Builder on Your Web Server.

7. Create a sample AppPage.
   ▷ Create Sample AppPage.

Run the sample application.

8. Enter the URL http:// your_server/scripts/webdriver.exe.

This How To has been compiled into two separate files for ease of printing. The basic file contains all of the steps you need to Create Web Applications with AppPage Builder. The secondary file contains additional detailed instructions for setting and testing database environment properties.

FIG. 19B

WEB-BASED INSTRUCTION

CROSS-REFERENCE TO RELATED APPLICATIONS

This application is a continuation-in-part of U.S. patent application Ser. No. 08/888,925 filed on Jul. 7, 1997, now U.S. Pat. No. 6,259,445, entitled "Computer-Based Documentation and Instruction," which is hereby incorporated by reference in its entirety. This application claims priority to the filing date of U.S. Pat. No. 6,259,445."

TECHNICAL FIELD

This application relates to web-based documentation and instruction.

BACKGROUND

A typical computer system as shown in FIG. 1 includes a computer 100 having a central processing unit 105, an input/output unit 110 and a memory 115 containing various programs used by the computer 100 such as an operating system 120 and one or more application programs 125. An end-user of the computer system communicates with the computer 100 by means of various input devices (keyboard 130, mouse 135) which transfer information to the computer 100 via input/output unit 110. The computer 100 replies to this input data, among other ways, by providing responsive output to the end-user, for example, by displaying appropriate text and images on the screen of a display monitor 140.

The operating system 120 may include a graphical user interface (GUI) by which the operating system and any applications it may be running (for example, a word-processing program) can communicate with a user of the computer system. A commonly used GUI implementation employs a desktop metaphor in which the screen of the monitor is regarded as a virtual desktop. The desktop is an essentially two-dimensional working template area supporting various graphical objects, including one or more display regions. As shown in FIG. 2, information generated by application programs or the operating system can be displayed on the desktop 200 within display regions 205 (for example, windows, dialog boxes, pop-up menus, pull-down menus, drop-down lists, icons). The user can interact with the operating system, and any applications it may be running, by manipulating the cursor 210 appropriately within the display regions and by entering information with the keyboard or other input device.

The computer 100 also includes some sort of communications card or device 145 (for example, a modem or network adapter) for exchanging data with a network 150 via a communication link 155 (for example, a telephone line). The network 150 may be, for example, a local area network (LAN), an intranet, or the Internet. A service provider provides access to the network and may additionally provide various utilities or services (such as electronic mail) associated with the network. Examples of service providers include Internet service providers (ISPs) such as AT&T WorldNet or online service providers (OSPs) such as America Online and CompuServe.

Developers need to know programming concepts to implement the application program. Therefore, a description of the implementation of the application (and not only the operation of the application) would be helpful.

Most computer applications provide an online help/documentation facility which aids in the use of the application. A typical online help system such as shown in FIG. 3A is accessed through a GUI in which screens of textual and graphical information are displayed to the user in a help window 300. The user can then read the screens of help text to get a better understanding of the application and its various features.

The user invokes the help system with a key sequence (for example, pressing the F1 key on the keyboard) or by clicking the mouse on an appropriate graphical icon or menu item. In response, the help system may display a table of contents 305 listing the available help topics and subtopics which can be accessed and viewed by the user as desired. The user can browse through the table of contents 305 and click a help topic of interest to cause its corresponding body of information to be displayed in a help window. In the help window 300 shown in FIG. 3A, the user has clicked the "Programming with Microsoft Word" topic 310 to cause the corresponding help screen 315 to be displayed in window 300 as shown in FIG. 3B.

The "Programming with Microsoft Word" topic 310 shown in FIG. 3B includes several subtopics 320, each represented by a separate "link." When the user clicks the mouse on one of these links—for example, the "Error Messages" link 325—the text for the corresponding help topic is displayed automatically in the help window 300, as shown in FIG. 3C. In this example, the "Error Messages" topic 330 includes several links to further subtopics relating to specific types of error messages. As shown in FIG. 3D, when the user clicks one of these links, for example, the "Out of memory (stack space)" link 335, a new help window 340 is spawned to display the corresponding help information ("Freeing up memory") for the selected topic. The help information displayed in window 340 includes yet another link 345 for another subtopic, "active window," which when clicked by the user causes corresponding help text to appear in a pop-up dialog box 350. Virtually any level of such nested help displays is possible. The quantity and types of display regions (windows, dialog boxes, etc.) used to display help information is largely a matter of design choice based on the preferences of the help system developer.

A help system may provide "context-sensitive" help information, meaning that the help system automatically displays help information specifically relevant to the application's current task, rather than simply displaying all available help topics and forcing the user to identify and call-up the appropriate help topic manually. A context-sensitive help system decides which help information to display based on factors such as the current state of the application (for example, the particular function being invoked by the user) and the current cursor position.

The information provided by most online help systems relates to the mechanics of using features of an application. In FIG. 4, for example, the text 400 corresponding to the chosen help topic 405, "Cancel printing," describes how to control the print feature provided by the application 410 (Microsoft Word).

A help system also may provide substantive information on how to make use of the application to achieve a desired goal. In FIG. 5A, for example, the online help system provides two types of substantive information: reference material 500 for the WordBasic programming language and practical explanations 505 of how to use WordBasic to write useful programs. The reference material 500 includes textual annotations describing the syntax and meaning of various WordBasic statements, such as the AddAddIn statement, the help text for which is shown in FIG. 5B. The practical explanations 505 can include static examples of program code which the user can study to gain a better understanding of the WordBasic programming language. FIG. 5C shows an example of a program code that makes use of the GetCurValues WordBasic statement.

Online help systems typically are "built" (that is, processed into a form that facilitates run-time operation) by compiling several different help source files containing help information that has been composed by technical writers. In general, these help source files are maintained as a separate body of information apart from the application to which the help system corresponds. Consequently, when the application developers change or update the functionality of the application, the technical writers must make corresponding changes to the help source files to ensure that the online help system accurately describes the operation of the application. In general, however, online help systems fail to describe the implementation of the application.

A help system may be implemented in a network environment using a "browser", which enables users to access and view electronic content stored in the network environment. A browser typically is used for displaying documents described in Hyper-Text Markup Language (HTML) and stored on servers connected to a network such as the Internet. FIG. 6 is a screen shot of a browser application 600 (in this case, Internet Explorer) displaying a typical HTML document, or web page 605. A user instructs the browser 600 to access the web page 605 by specifying a network address 610—or Uniform Resource Locator (URL)—at which a desired document resides. In response, the browser 600 contacts the corresponding server hosting the requested web page, retrieves the one or more files that make up the web page, and then displays the web page in the computer display 140.

A single web page may be composed of several different files potentially of different data types (for example, text 615, images 620, virtual worlds, sounds, or movies). In addition, a web page can include links 625, or pointers, to other resources (for example, web pages, individual files, or downloadable files) available on the network. Each link has an associated URL pointing to a location on the network. When a user clicks on, or otherwise selects a displayed link, the browser will retrieve the web page or other resource corresponding to the link's associated URL and display it to, or execute it for, the user.

Referring to FIG. 7, a web page 605 may provide, in addition to content 700, a site guide 705 that helps the user navigate through all the links associated with that web page. The site guide 705 is similar to a table of contents and typically resembles a tree structure. Likewise, the web page 605 could include a search facility 710 that enables the user to search for particular key words that appear within the links associated with that web page. The web page may provide a "Home" link 715 that sends the user back to a main web page from which all content and links can be accessed. The web page may provide a download link 720 that, when accessed, transmits a file from another web page or computer to the user's computer.

According to one aspect of the invention, a method performed in a web-based environment on a computer system teaches a user to implement an application. The method includes providing predetermined applications and presenting an annotation page that includes one or more annotations descriptive of a source file of a predetermined application. Each annotation includes keyword links, annotation links, and detail of implementation of the application. The method includes permitting the user to select a link in an annotation. If the user selects a keyword link, reference documentation associated with that keyword is presented. If the user selects an annotation link, another annotation descriptive of another source file of a predetermined application is presented.

Embodiments may include one or more of the following features. For example, a predetermined application may be performed and one or more annotations descriptive of the performed application may be presented in coordination with performance of the predetermined application. Performing the predetermined application may include receiving input from the user. Another annotation page may be presented in coordination with performance of the predetermined application based on input from the user.

Presenting the other annotation page may include automatically and simultaneously calling an annotation request module including application, file, class and function names of a program unit for which detail should be displayed. Presenting the other annotation page may also include mapping the request to an annotation, and informing a browser window in the web-based environment to display the other annotation page.

Another annotation page may be presented in coordination with performance of the predetermined application. A global table of contents that includes links to annotations may be automatically generated by parsing structured links in web pages including annotation pages. Generation of links in the global table of contents may be synchronized with presentation of annotations by highlighting links corresponding to a current annotation page. The global table of contents may be presented in a first frame of a first browser window, the annotation page may be presented in a second frame of the first browser window, and the predetermined application may be performed in a second browser window.

Performing the predetermined application may include launching a Java applet or application, which may include calling a Java application program interface to ask a web browser to show the annotation page. Performing the predetermined application may include downloading a hypertext markup language page containing a Java applet.

Performing the predetermined application may include sending a common gateway interface request to a web server that launches the application in a window in the web-based environment. The application may return a hyper-text markup language page that includes JavaScript to ask a web browser to display the one or more annotations.

The annotation page may be presented in a first browser window and the predetermined application may be performed in a second browser window. The application implementation detail may include text descriptive of the application, fragments of source code from the application, or both. The source code fragments may be imported directly from the source code file of the presented application.

The annotation page may be automatically generated. This generation may include receiving a source code file that has embedded text marked up with instructions. Additionally, the source code may be parsed to determine a structure of the predetermined application, and one or more annotations may be generated based on the predetermined application structure and instructions. Generation of the annotation page may include generating one or more annotation links for navigating the annotations of the predetermined application. Additionally, application implementation detail may be generated based on the embedded information, and one or more keyword links may be generated for reference documentation. Generating the annotation page may also include highlighting the keyword links and the annotation links in the annotation page. The annotation page may be automatically updated when an updated source code file is received.

A global table of contents may be automatically generated by parsing the one or more annotations for annotation links. The global table of contents may be provided, and may include links to annotations. Alternatively, the global table of contents may be generated, and may include links to web page including annotation pages relating to an application. The local table of contents may be provided when a local link in the global table of contents is selected.

The presented annotation page may be descriptive of the performed application, and the annotation page may be presented in coordination with performance of the predetermined application.

A source code file, which is stripped of annotation mark up and includes source code of the application but does not include text from the annotations, may be generated. The stripped source code file may be presented and the user may be permitted to edit the stripped source code file.

According to another aspect of the invention, a method, performed in a web-based environment on a computer system, of teaching a user to implement an application includes providing a predetermined plurality of applications. A predetermined application is performed, and an annotation page descriptive of the performed application is presented in coordination with performance of the predetermined application. The annotation page includes detail of application implementation and links to annotations and reference documentation.

According to another aspect of the invention, a method, performed in a web-based environment on a computer system, of teaching a user to implement an application includes automatically assembling and providing a global table of contents based on content in the environment. The global table of contents includes a plurality of links to content within the environment. A local table of contents that includes links to content that orient the user within a local topic, is generated. The user is permitted to select links from the local table of contents to access local topics.

According to a further aspect of the invention, a method, performed in a web-based environment on a computer system, of teaching a user to implement an application includes providing a plurality of predefined interactive examples. One or more of the predefined interactive examples is performed in response to user selection, and one or more annotations descriptive of the performed interactive example are presented in coordination with performance of the predefined interactive example. The user is permitted to selectively explore different aspects of the performed interactive example, the annotations, or both.

According to another aspect of the invention, a web-based computer system for teaching a user to implement an application includes one or more predefined interactive applications, and an annotation page including one or more annotations. A predefined interactive application is selectively executable by the user of the web-based computer system. The annotation page describes a predefined interactive application. The annotation page also includes one or more links, and detail of implementation of the application. Different annotations are automatically provided in the annotation page in response to selective execution of a predefined interactive application.

According to a further aspect of the invention, a web-based computer system for teaching a user to implement an application includes a web-browser window that includes a content frame, a framework applet, and a table of contents frame that displays a global table of contents hierarchy of links related to content in the content frame. The system also includes one or more annotations displayed in the content frame, where each annotation describes a predefined interactive application and includes links to other content. The system includes a table of contents window that displays a local table of contents hierarchy of links related to local content in the displayed annotation.

The details of one or more embodiments are set forth in the accompanying drawings and the description below. Other features, objects and advantages will be apparent from the description, the drawings, and the claims.

DESCRIPTION OF THE DRAWINGS

FIG. 12 is a sample of NewEra™ source code.

FIGS. 14A-15A, 15C, 17A-17D, 18A, 18B, 19A and 19C-19F are screen shots from the Informix® by Example web-based application.

FIGS. 15B, 15D and 19B show content in a display region of the Informix® by Example web-based application.

FIG. 15E and 18C are source code files with embedded annotations.

DETAILED DESCRIPTION

The help information provided by conventional online help systems has proven useful in aiding users to make effective use of application programs. However, because these conventional online help systems essentially are limited to providing static textual or graphical information, their effectiveness is diminished considerably. Users of conventional online help systems gain instruction by reading and carefully studying the textual and graphical information provided by the help system and then applying its teachings to the problem to be solved. As a result, learning to use applications of any complexity often is a painstaking and time consuming process.

An online help and instruction system developed by Informix® Software, Inc., known as NewEra™ by Example, dramatically enhances the ease with which users can absorb information and learn to use new applications. NewEra™ by Example is an online documentation facility for NewEra™, an object-oriented application development environment from Informix® Software, Inc. which runs under the Windows 95/NT operating systems. A copy of NewEra™ by Example's online description of its use and operation is attached as Appendix A.

NewEra™ by Example (or more generally, Informix® by Example, which covers the example-based instruction systems provided for the NewEra™, Visual Basic and Java development environments) is a specific implementation of a more general concept referred to as "documentation by example" in which users are provided with dynamic, interactive examples demonstrating how to accomplish a given task. Annotations describing various aspects of the examples accompany the examples as they are being executed. Documentation by example is based in part on the premise that users learn best by doing something (for example, participating in an activity and observing or influencing its outcome) rather than by merely reading about the topic.

Figure 1:
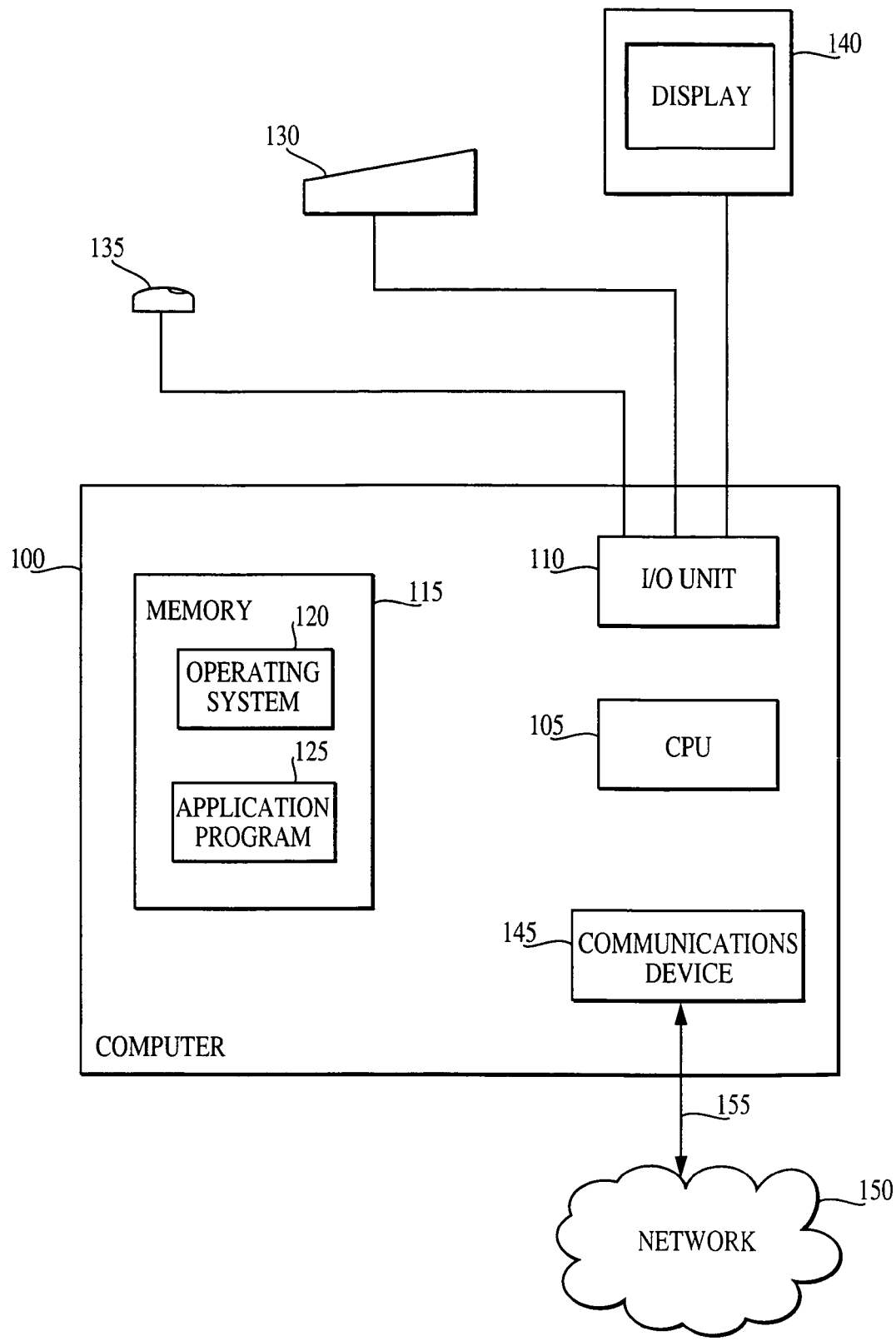
FIG. 1 is a block diagram of a prior art computer system.
Figure 2:
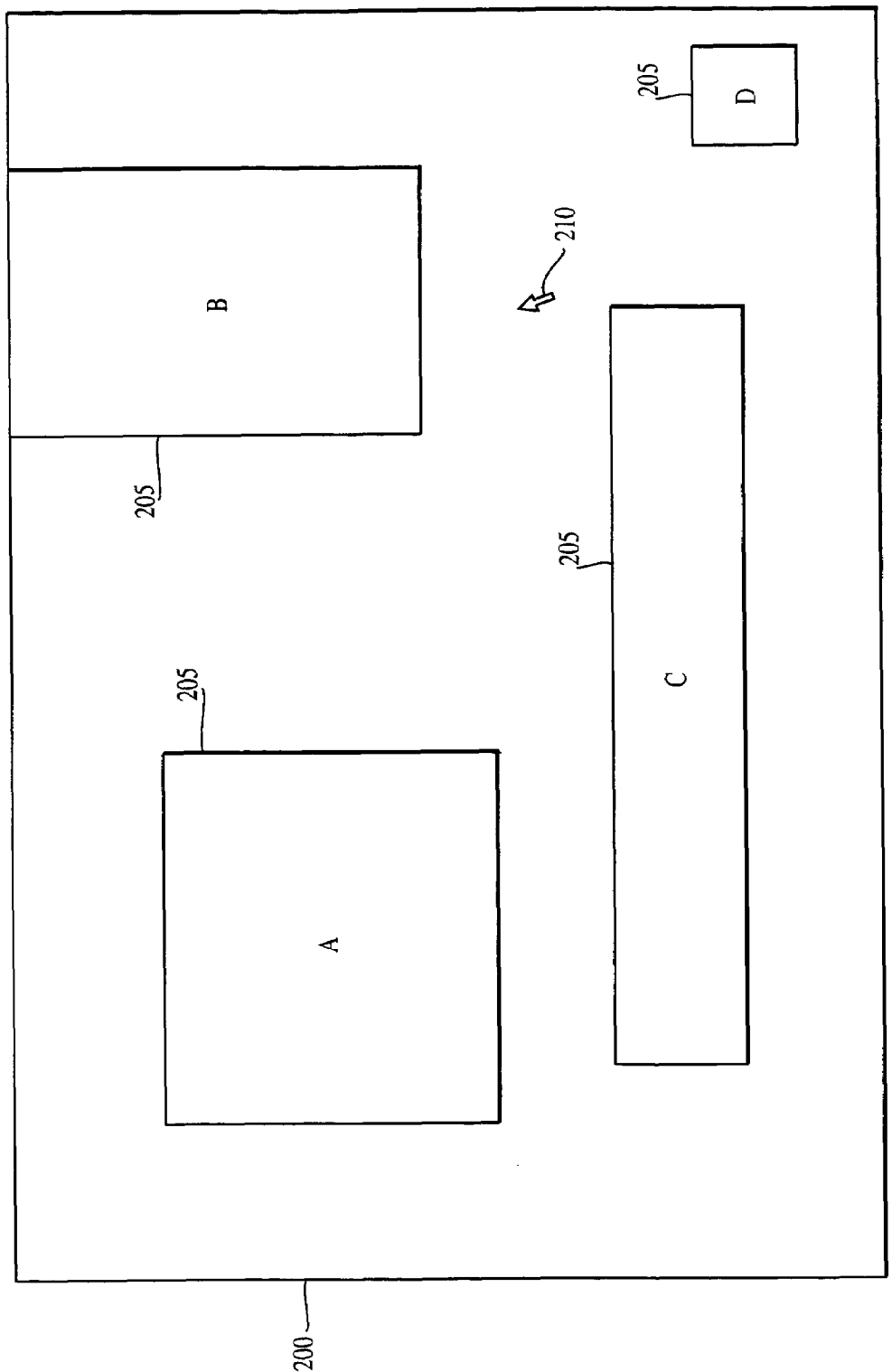
FIG. 2 shows display regions in a graphical user interface as used in the computer system of FIG. 1.
Figure 3A:
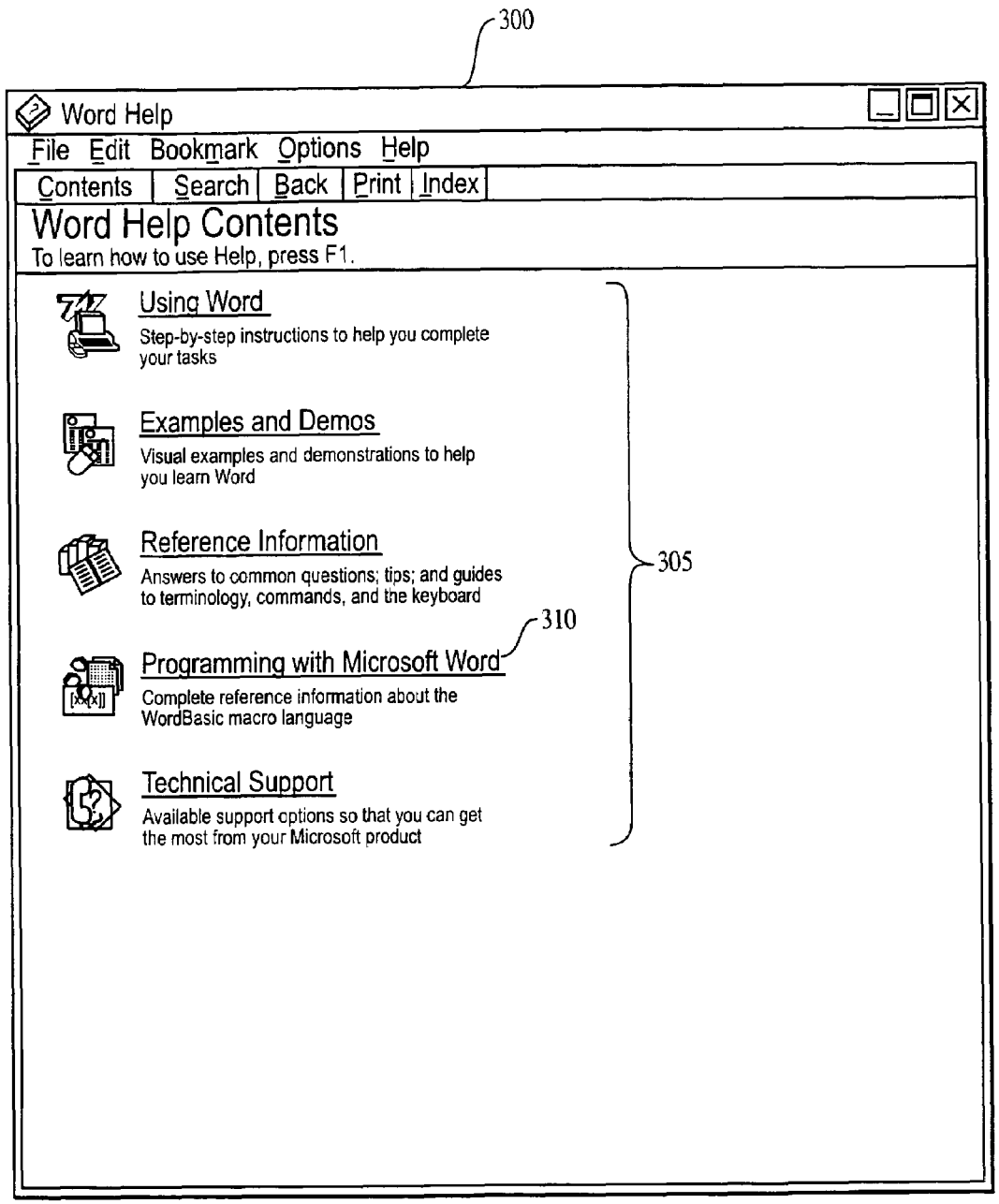
FIGS. 3A-5C are screen shots from a prior art online help and documentation system.
Figure 3B:
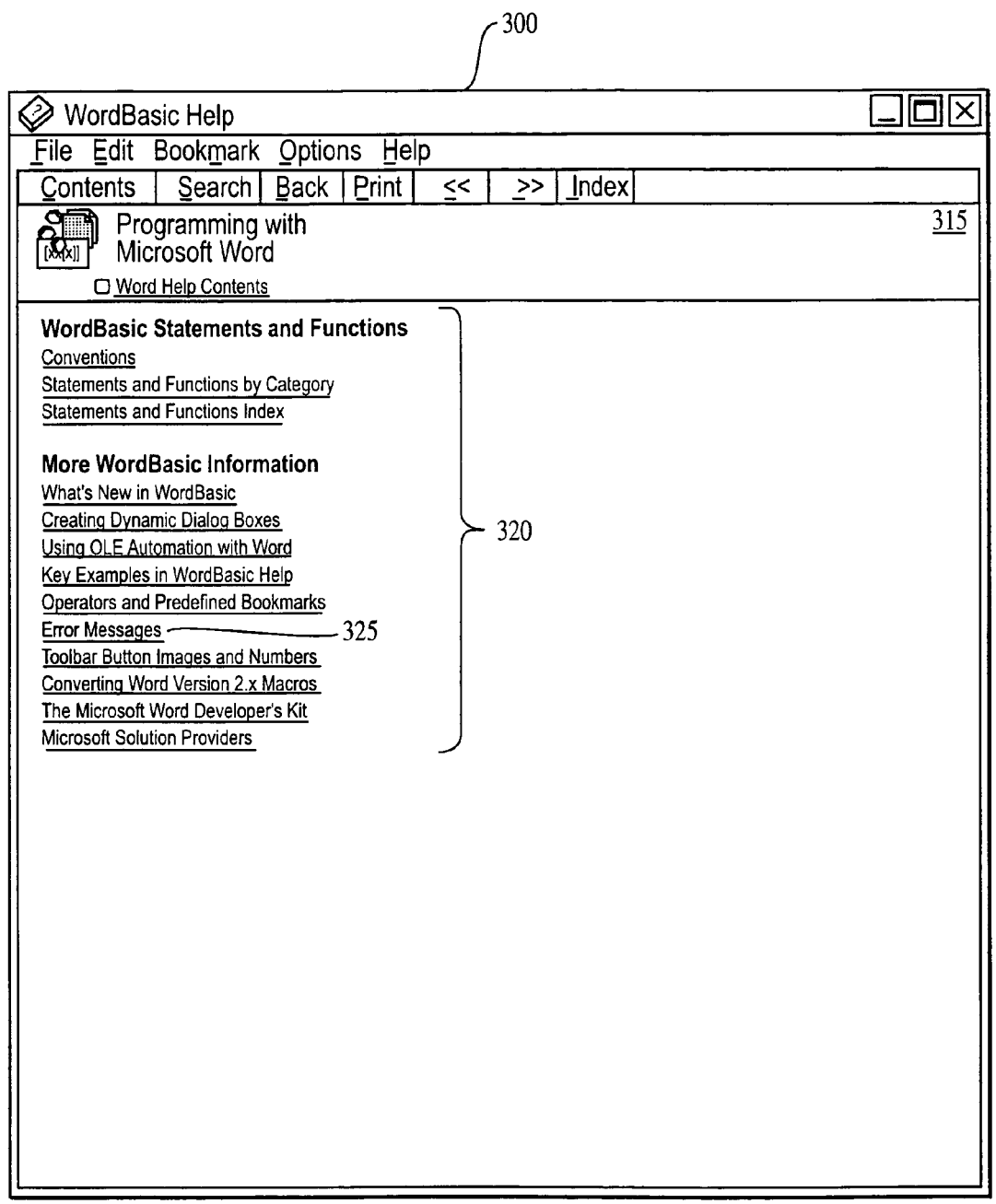
Figure 3C:
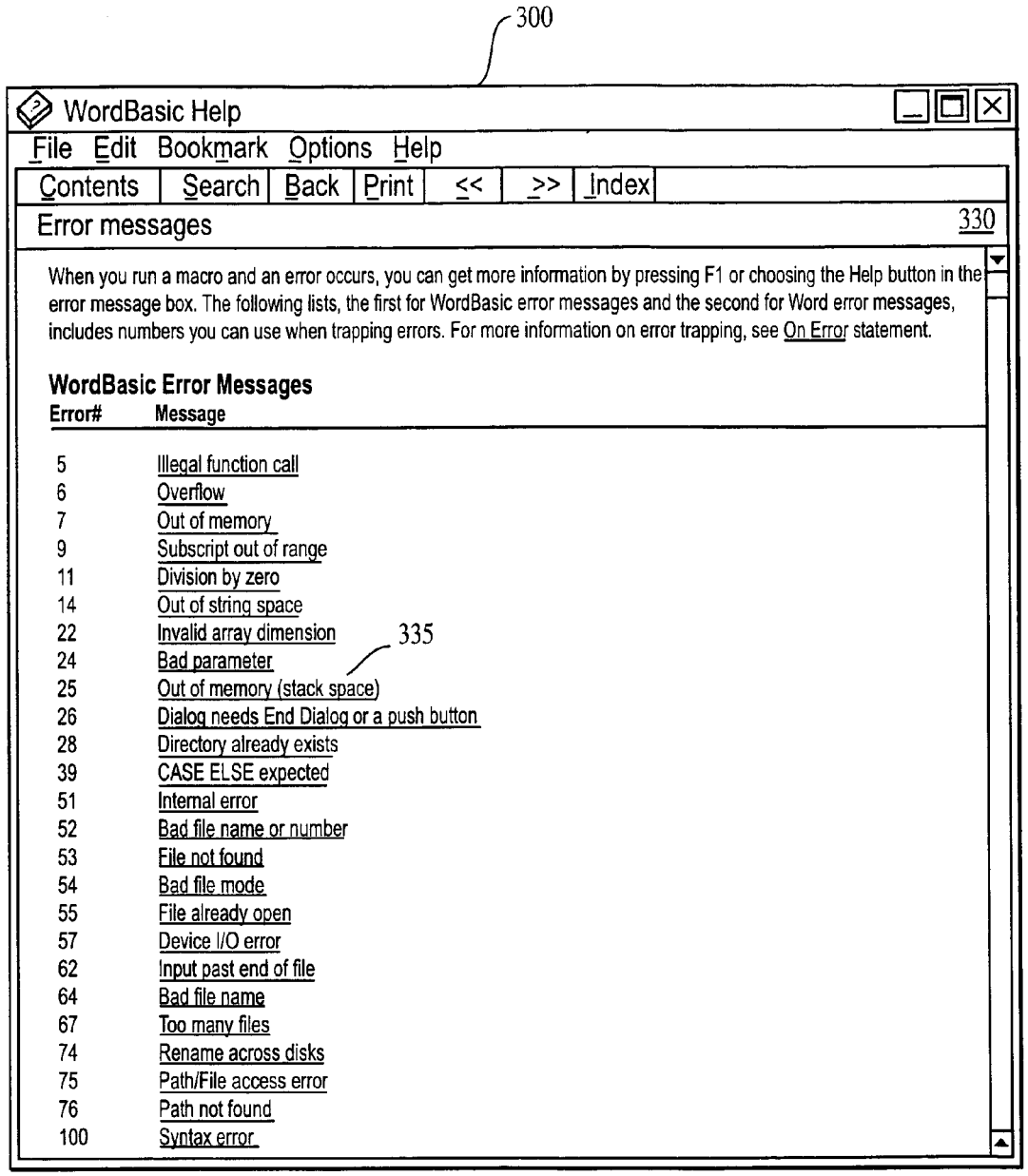
Figure 3D:
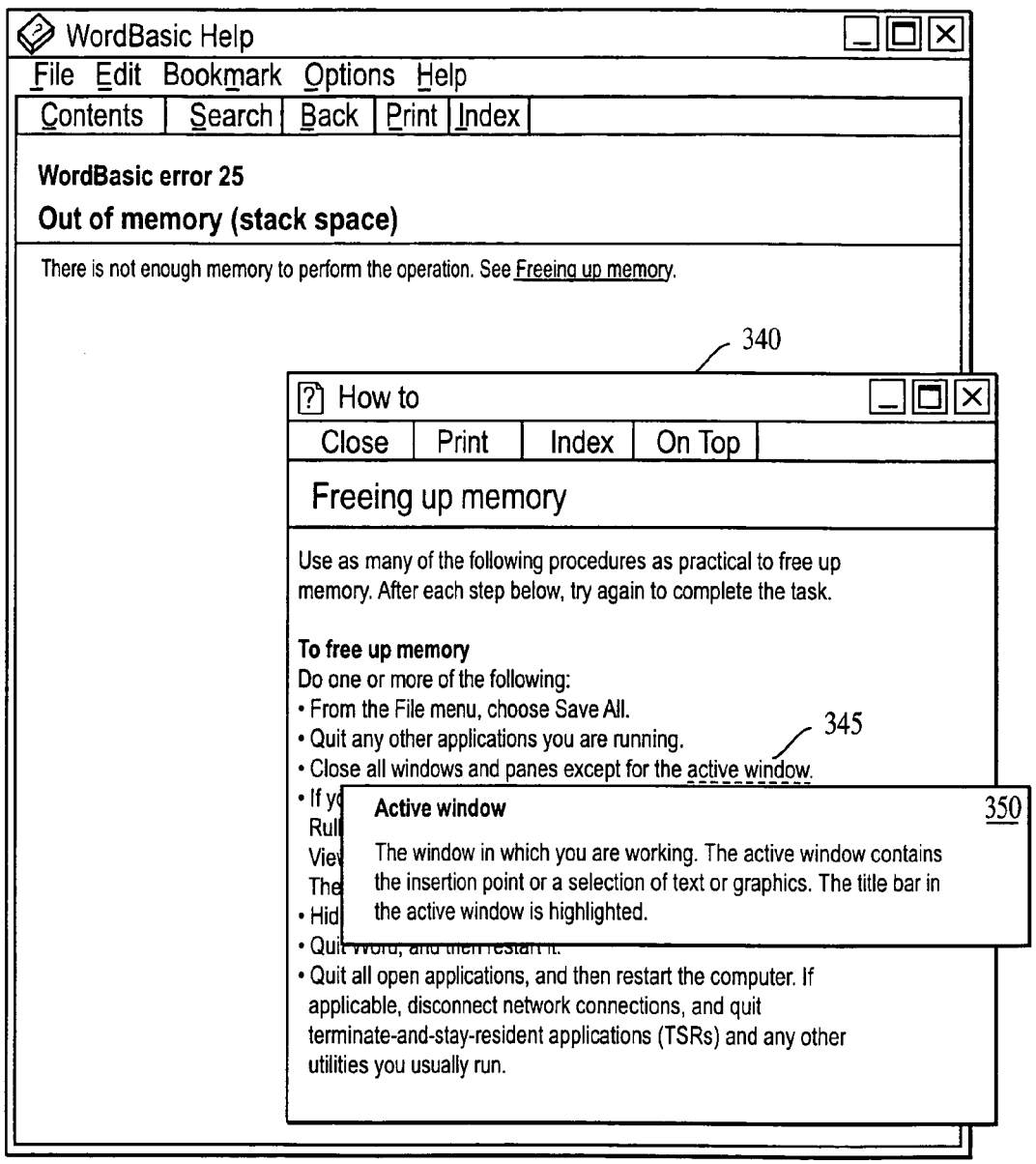
Figure 4:
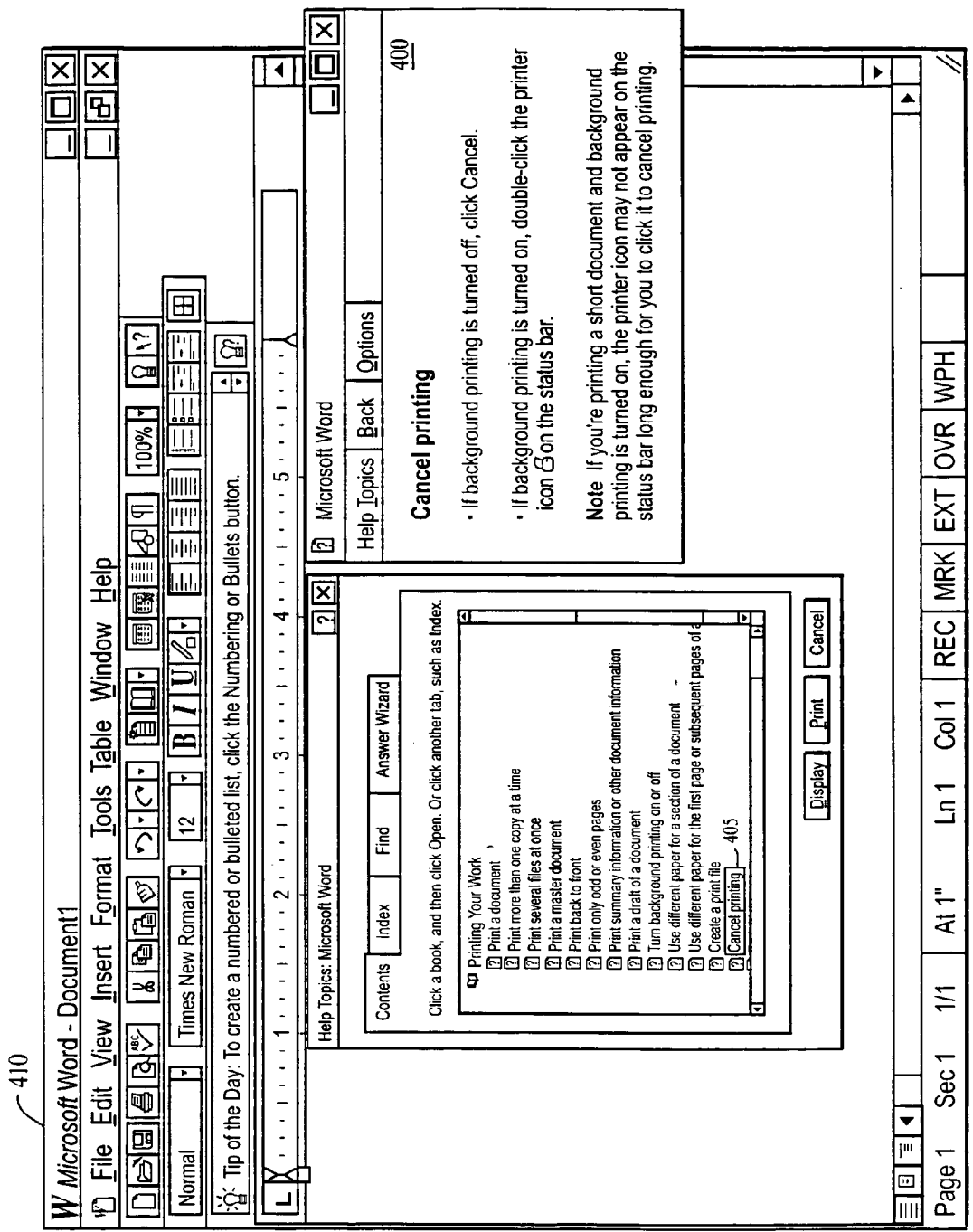
Figure 5A:
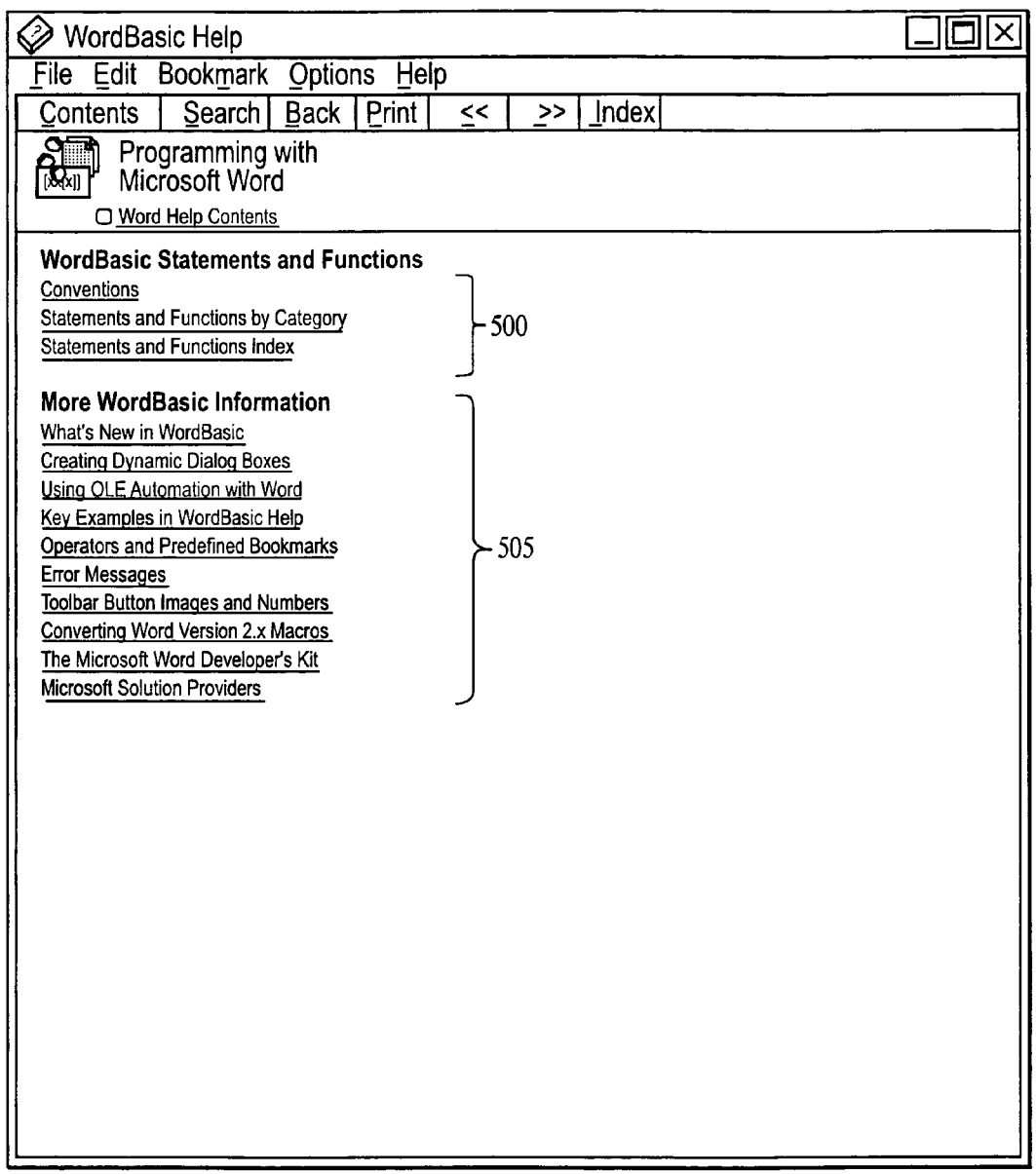
Figure 5C:
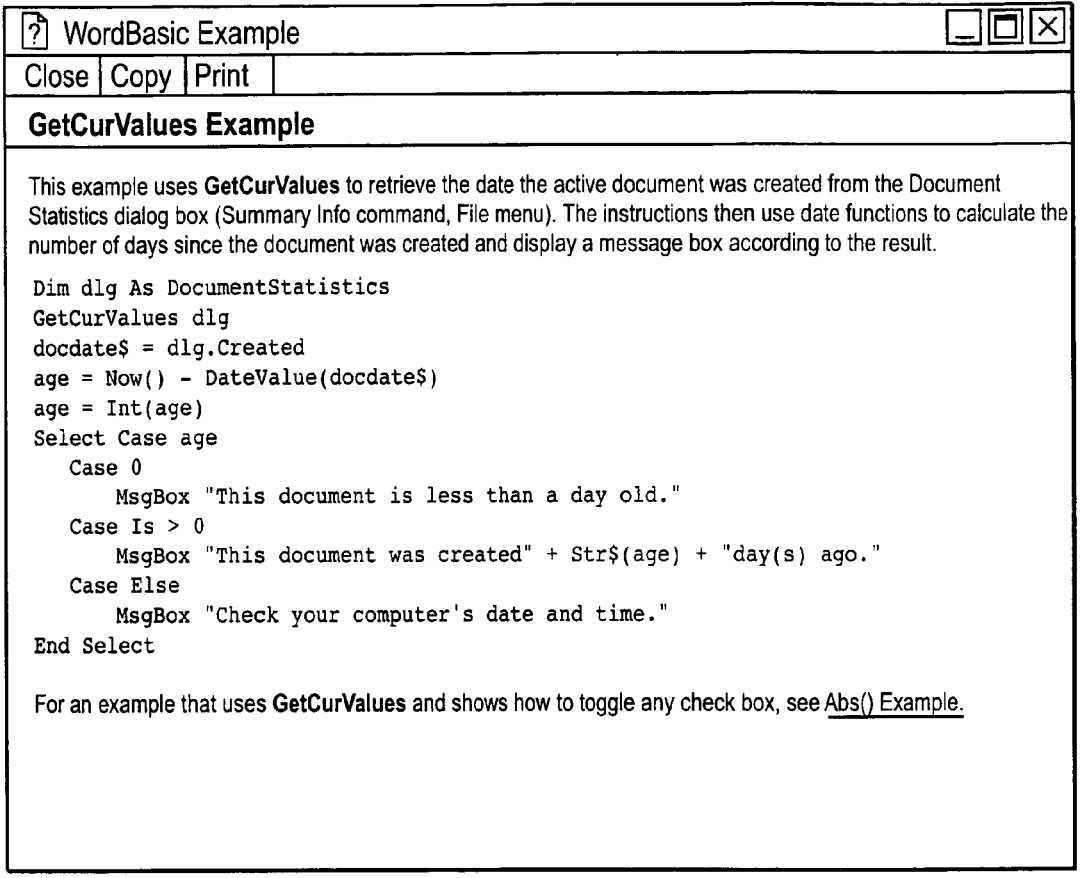
Figure 6:
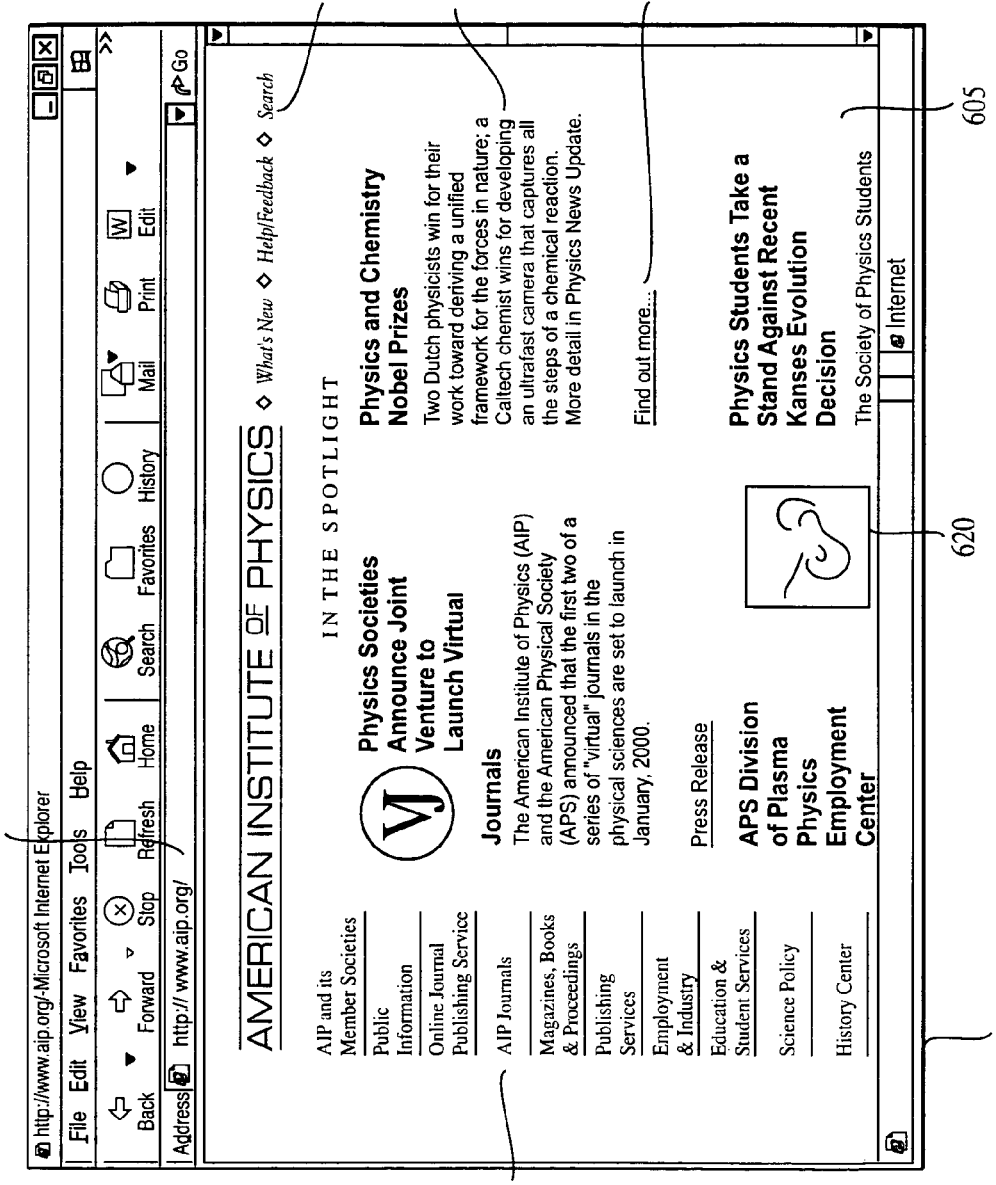
FIG. 6 is a screen shot of a browser application.
Figure 7:
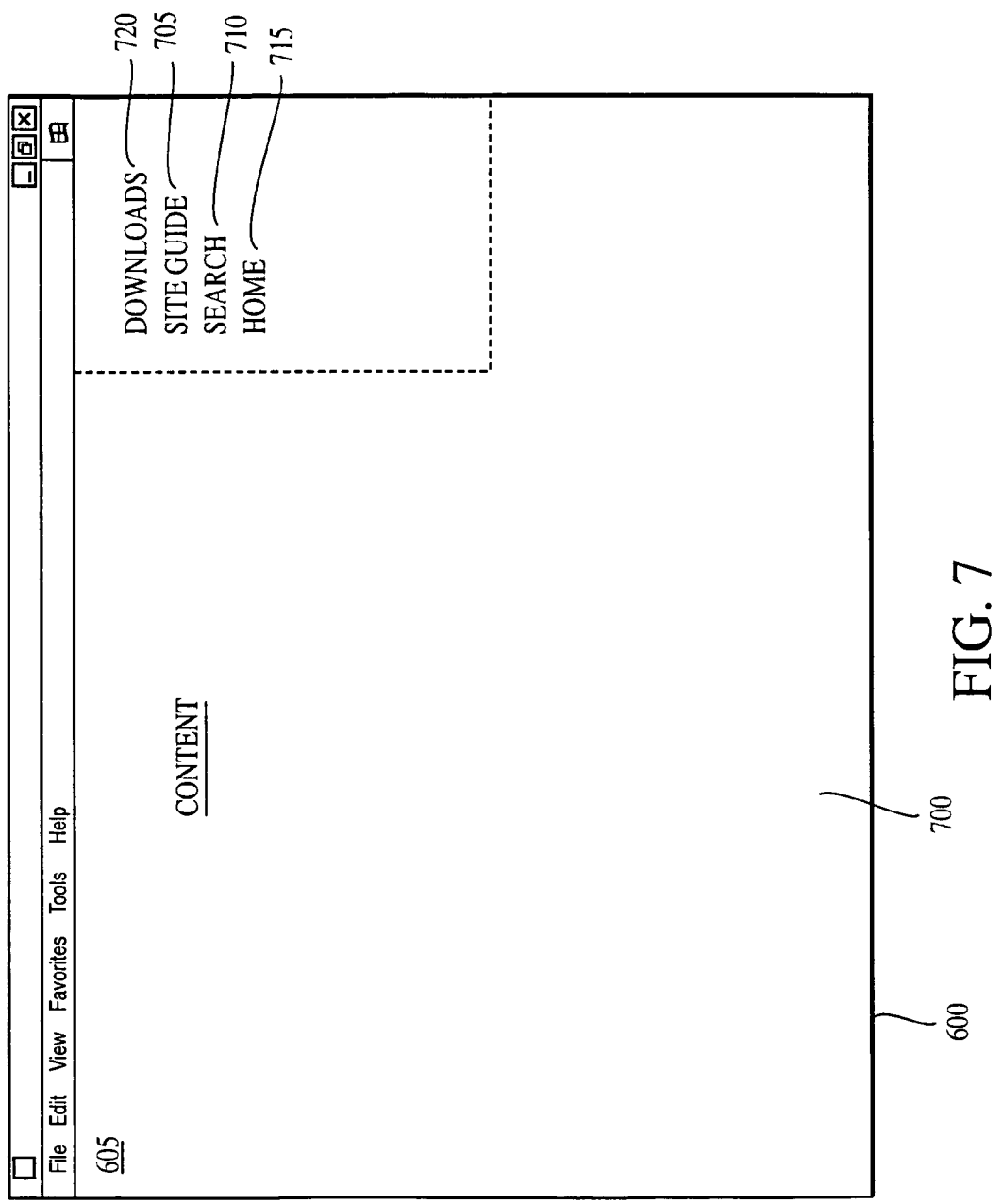
FIG. 7 shows a display region in a browser application.
Figure 8:
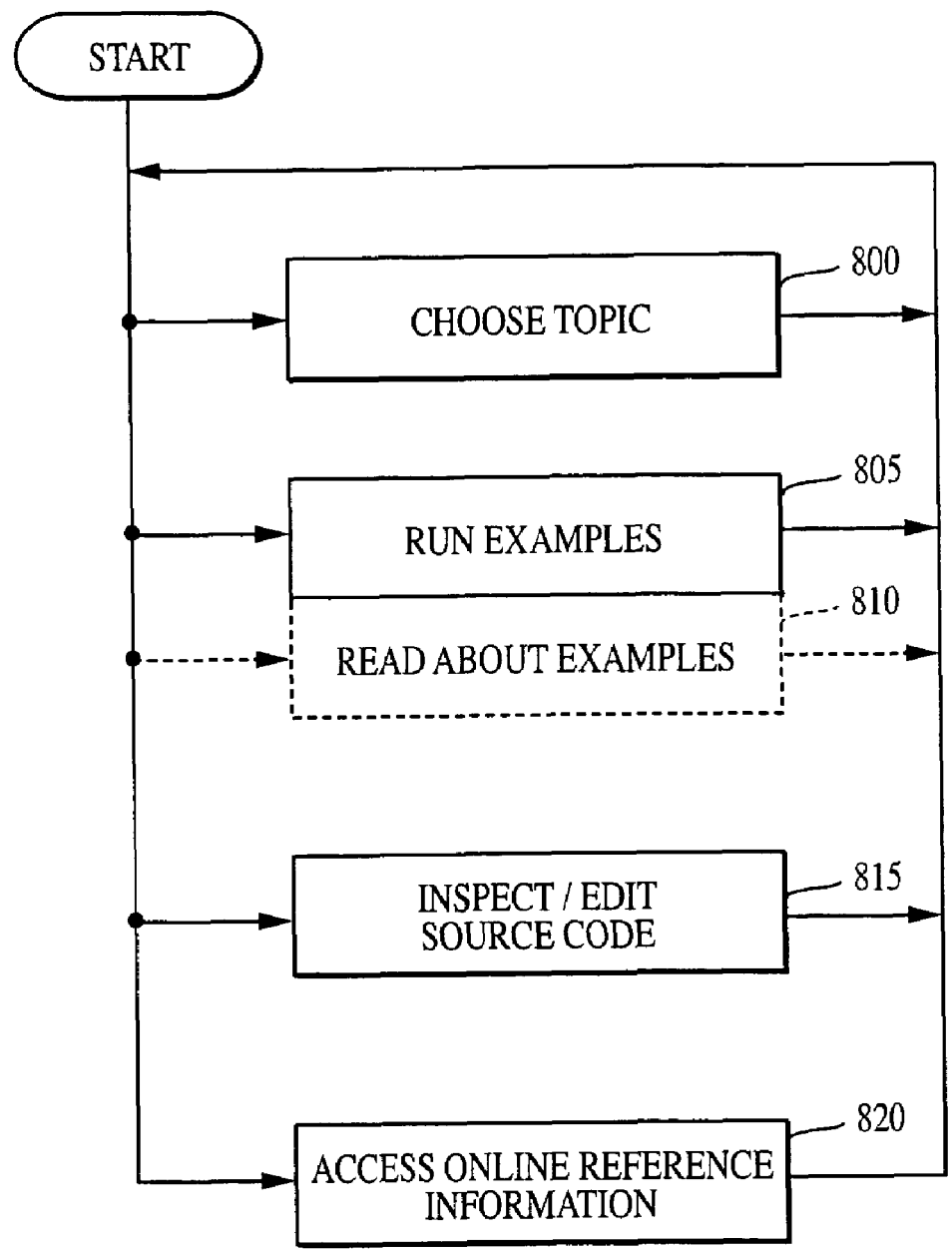
FIG. 8 is a flow diagram showing the options available to a user of the Informix® by Example application.

As illustrated in the flow diagram of FIG. 8, an Informix® by Example user has several different options for obtaining information including selecting among various different topics (step 800); running examples while the application for which help is sought remains active (step 805); reading about the examples, either concurrently while running the example or independent of the example (step 810); inspecting the examples' source code in different editor utilities (step 815); and accessing online background reference materials that help the user to understand the examples (step 820)—all without leaving the help environment. While in step 815, the source code for the examples can be used as sample program code which can be cut-and-pasted for use as a template in the NewEra™ development environment in creating new applications. Moreover, Informix® by Example enables users to learn through experimentation, for example, by selectively changing the examples or their parameters and observing how the changes affect the examples' outcomes.

Specific features of Informix® by Example are described in detail with reference to FIGS. 9A-9P, which are exemplary screen shots taken from the Informix® by Example application.

When a user first launches Informix® by Example, the default screen configuration shown in FIG. 9A is displayed. This initial screen includes two separate display windows, a list (or "table-of-contents") window 900 showing the subtopics presently available to the user under the current topic 902, and a text window 904 which displays the help information corresponding to the topic or subtopic selected from the list window 900. As the user clicks different ones of the eight subtopics 906 displayed in the list window 900, the information in the text window 904 is updated automatically to correspond to the chosen subtopic 906. The user can move to different pages within the current topic by clicking the forward (">>") button 908 or the backward ("<<") button 910 as desired.

Figure 9B:
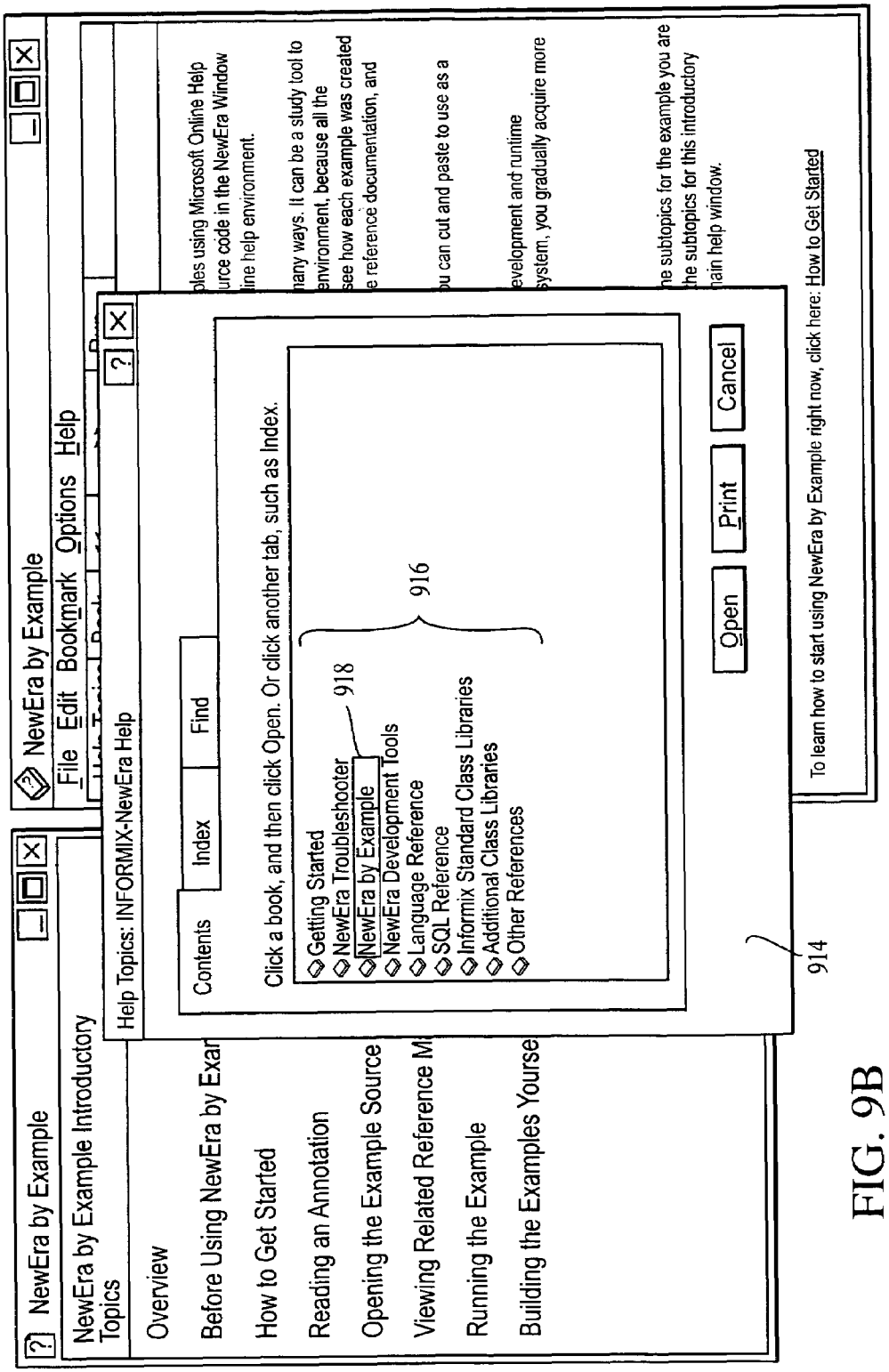
FIGS. 9A-9P are screen shots from the Informix® by Example application and from the NewEra™ development environment.

In the example of FIG. 9A, the subtopics shown in the list window 904 relate to the topic "NewEra™ by Example Introductory Topics." To switch to another help topic, and thereby make available a different subset of the online help documentation, the user clicks the Help Topics button 912 which brings up a window containing the Help Topics menu 914 with a list 916 of nine different help topics, as shown in FIG. 9B. At any point in the Informix® by Example application, the user can jump to any other portion of the online help system by bringing up the Help Topics menu 914 and clicking the desired topic. The user can return to a previous topic by pressing the Back button 916 an appropriate number of times.

Figure 9C:
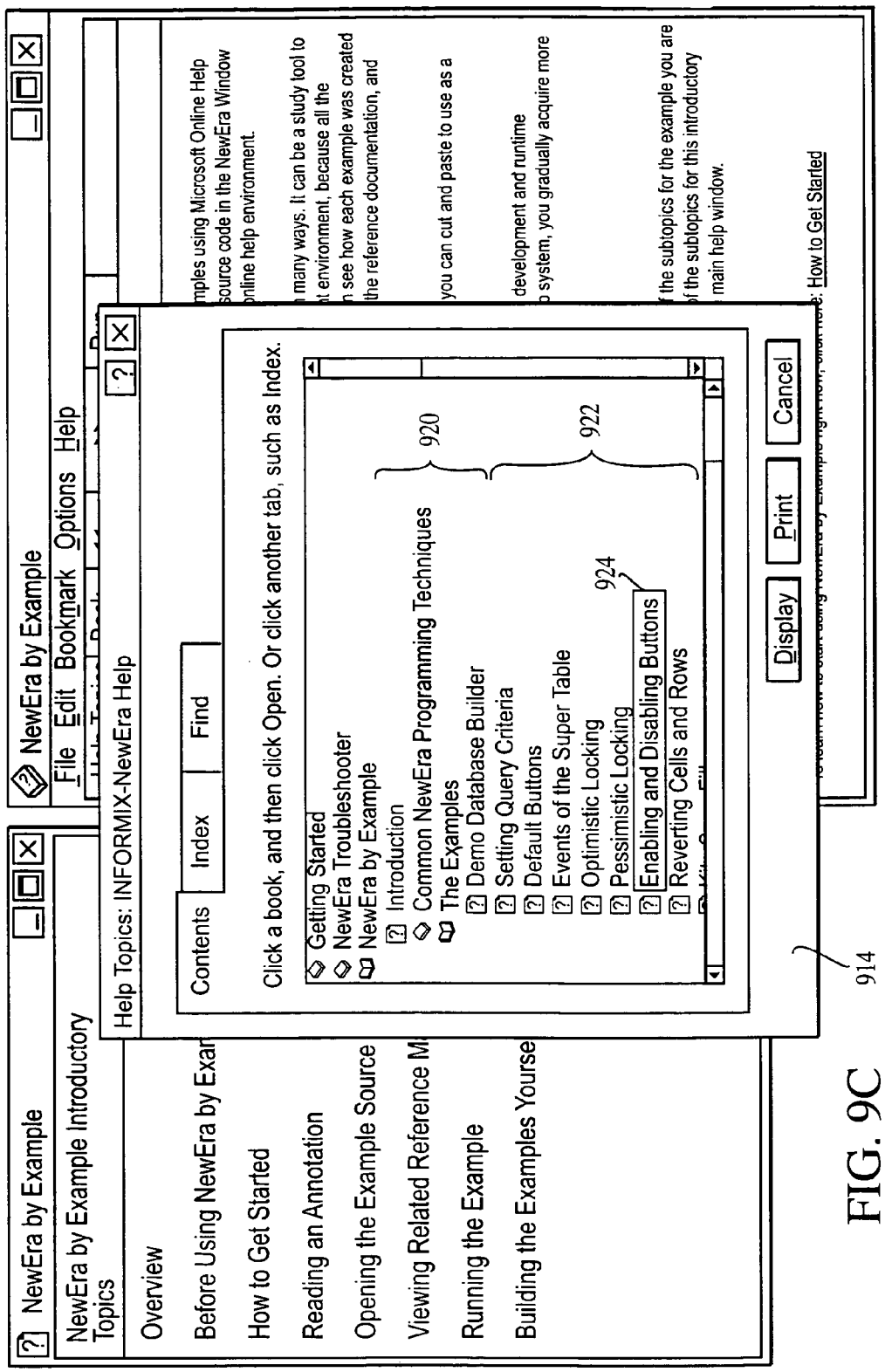

Each of the help topics in the list 916 in FIG. 9B can be expanded to reveal a hierarchy of multiple levels of subtopics. When the user clicks, for example, on topic 918 ("NewEra™ by Example"), it expands to reveal two additional levels of subtopics as shown in FIG. 9C—a first level 920 including the subtopics "Introduction," "Common NewEra™ Programming Techniques," and "The Examples," and a second level 922 under "The Examples" subtopic which includes the 43 interactive examples.

Figure 9D:
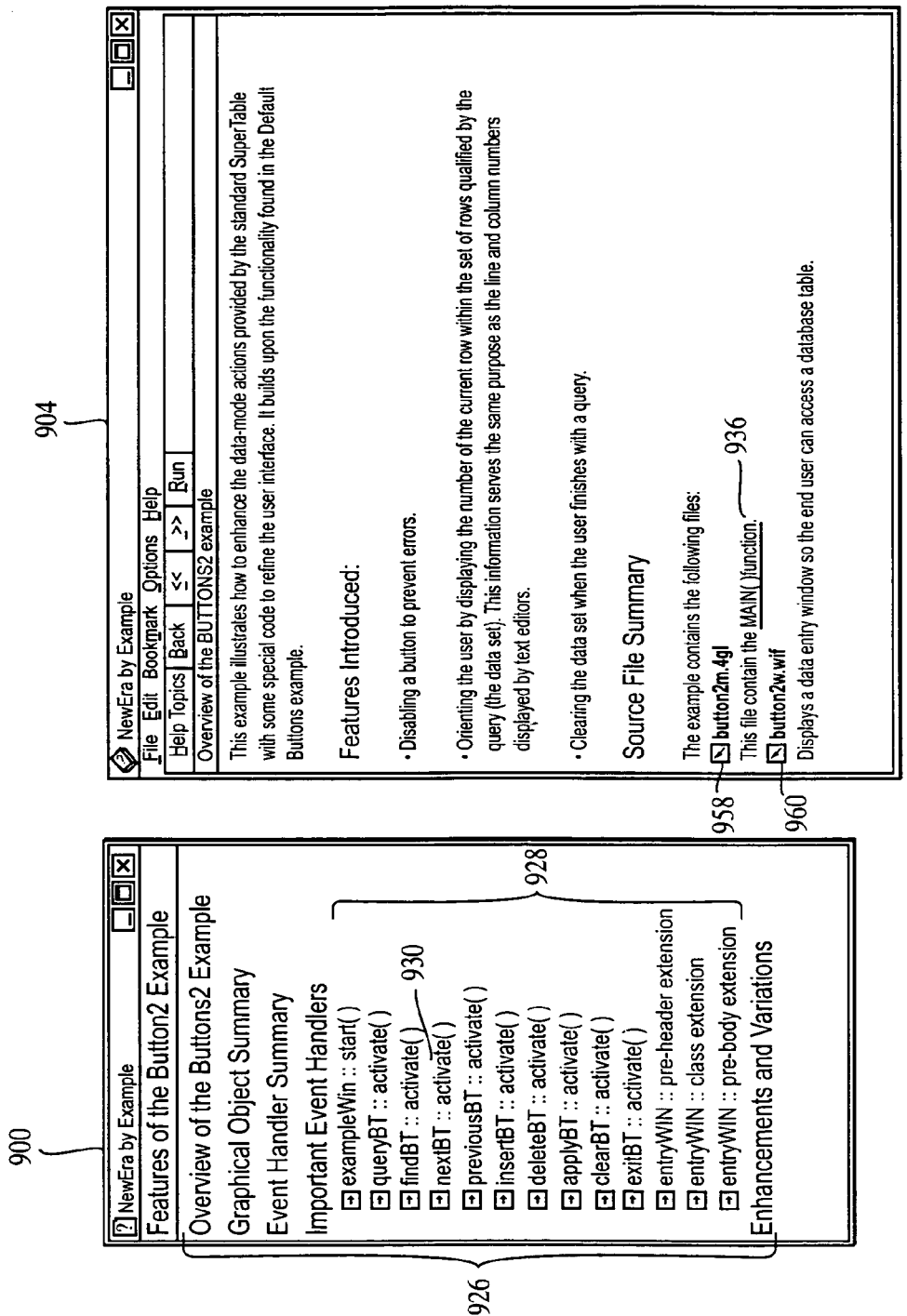

When the user clicks one of the examples, for example, the "Enabling and Disabling Buttons" example 924, the list window 900 is updated as shown in FIG. 9D to display the annotation segments 926 ("Overview of Buttons2 Example," "Graphical Object Summary," "Event Handler Summary," "Important Event Handlers," and "Enhancements and Variations") associated with the selected example. The annotation segments 926 collectively describe the corresponding example and include descriptions of the example's window, its graphical objects, and its event handlers. In addition to the prose descriptions of the example, an annotation segment usually also includes a source code fragment of particular interest which has been imported directly from the source code of the example under consideration.

As shown in FIG. 9D, one of the annotation segments ("Important Event Handlers") includes 13 topics 928—a list of the primary event handlers used in the BUTTONS2 example. Each event handler topic 928 includes source code fragments and prose explanations describing the event handler to which the topic corresponds. For example, when the user clicks event handler topic 930, the text window 904 displays source code fragments 932 relating to the corresponding event handler (nextBT:: activate( )) along with annotations 934 describing the code's operation, as shown in FIG. 9E.

The text window also may contain one or more links to related information, for example, background reference material, which in turn may include still further links to additional background information and so on in hierarchical fashion, each successive level in the hierarchy providing information about the example in greater detail and at a lower level of abstraction. By providing a hierarchy of links to increasingly detailed documentation in this manner, Informix® by Example supplies context-appropriate information in a helpful and efficient manner to all users, regardless of their varying levels of experience and sophistication. A user can traverse down the hierarchical links of descriptive information selectively until a level of understanding is reached that is commensurate with the user's needs and background. This arrangement provides novice users with easy access to detailed descriptive information while, at the same time, experienced users seeking help on a specific point are protected from having to navigate through large volumes of unneeded information.

Figure 9G:
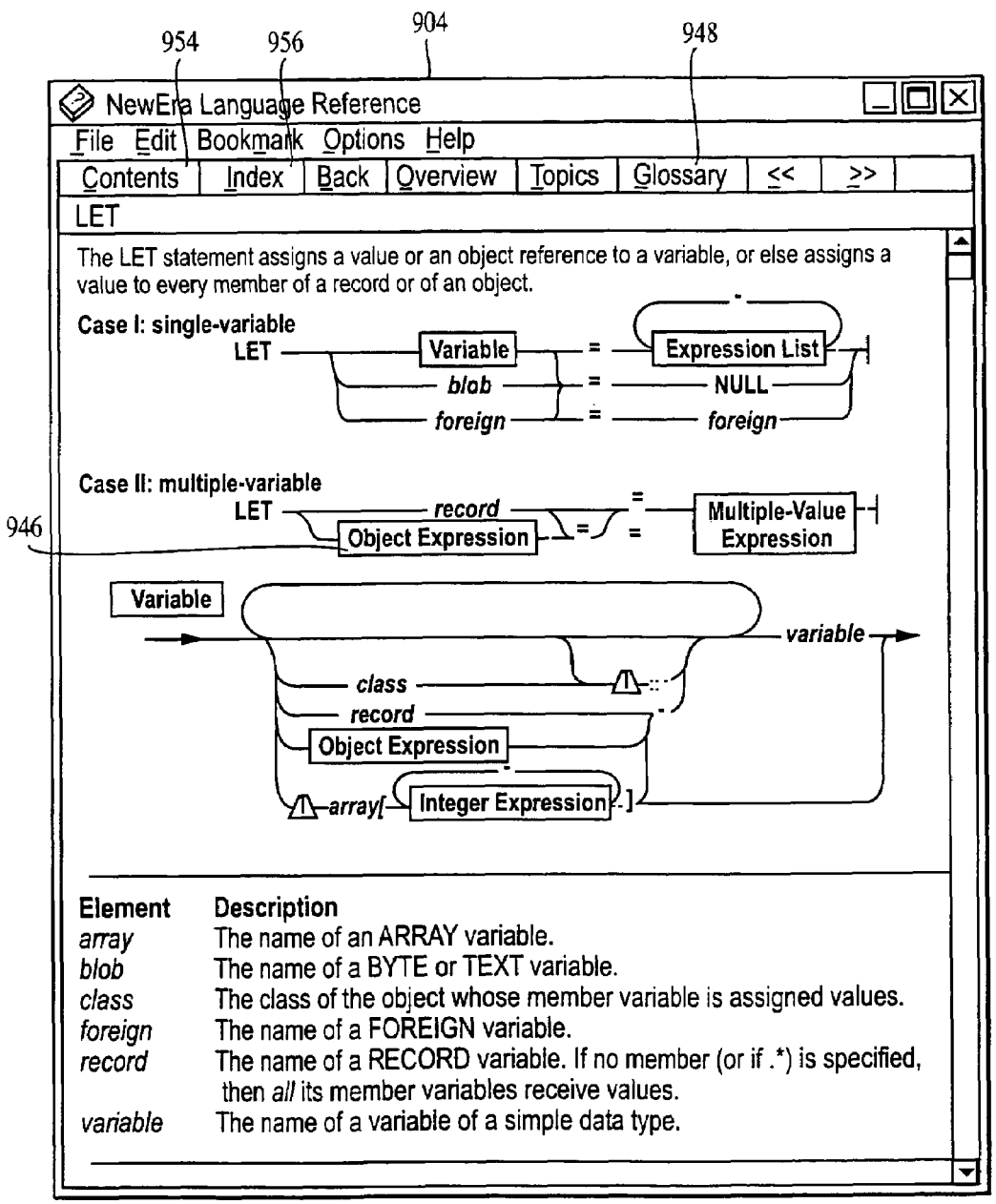
Figure 9H:
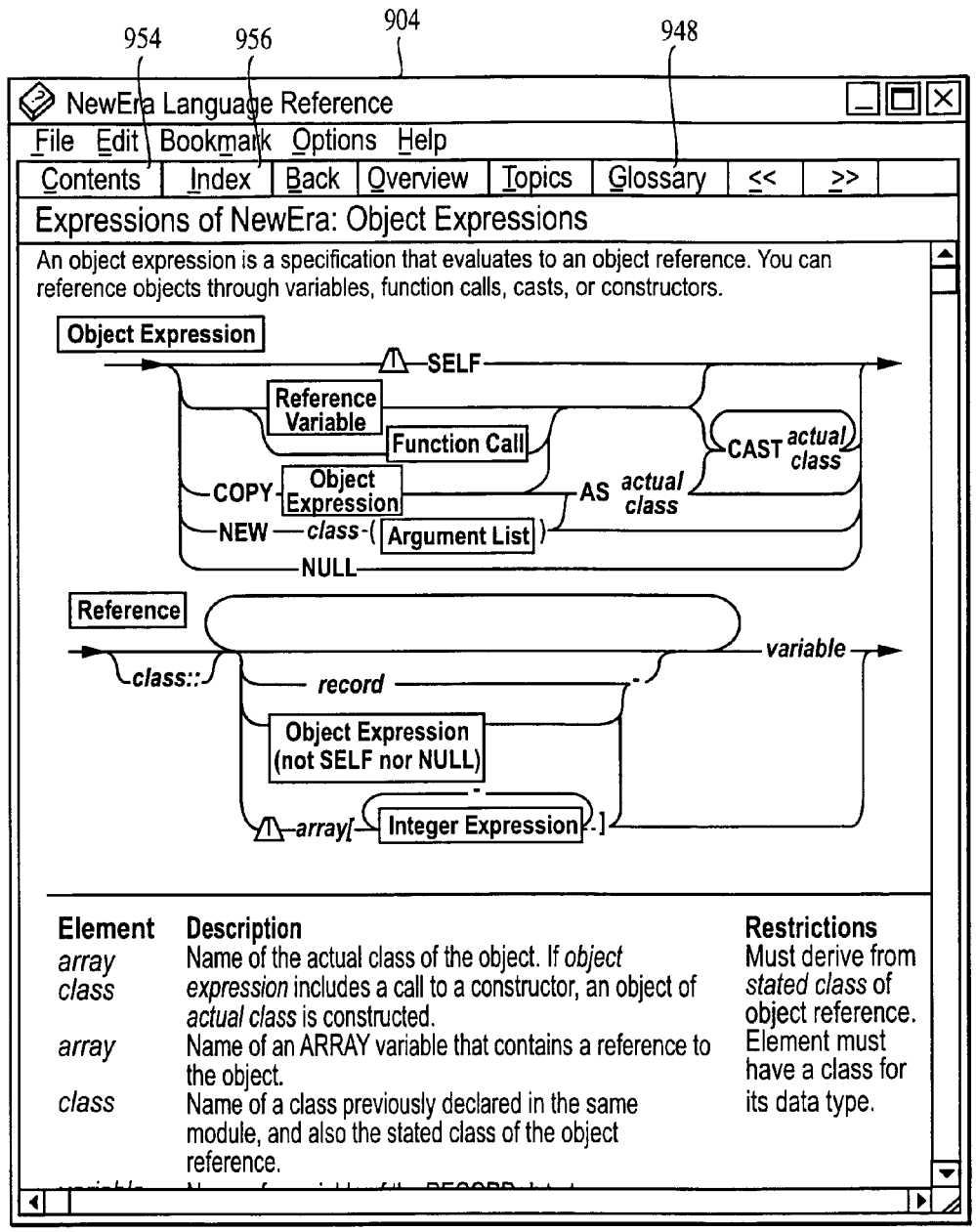
Figure 9I:
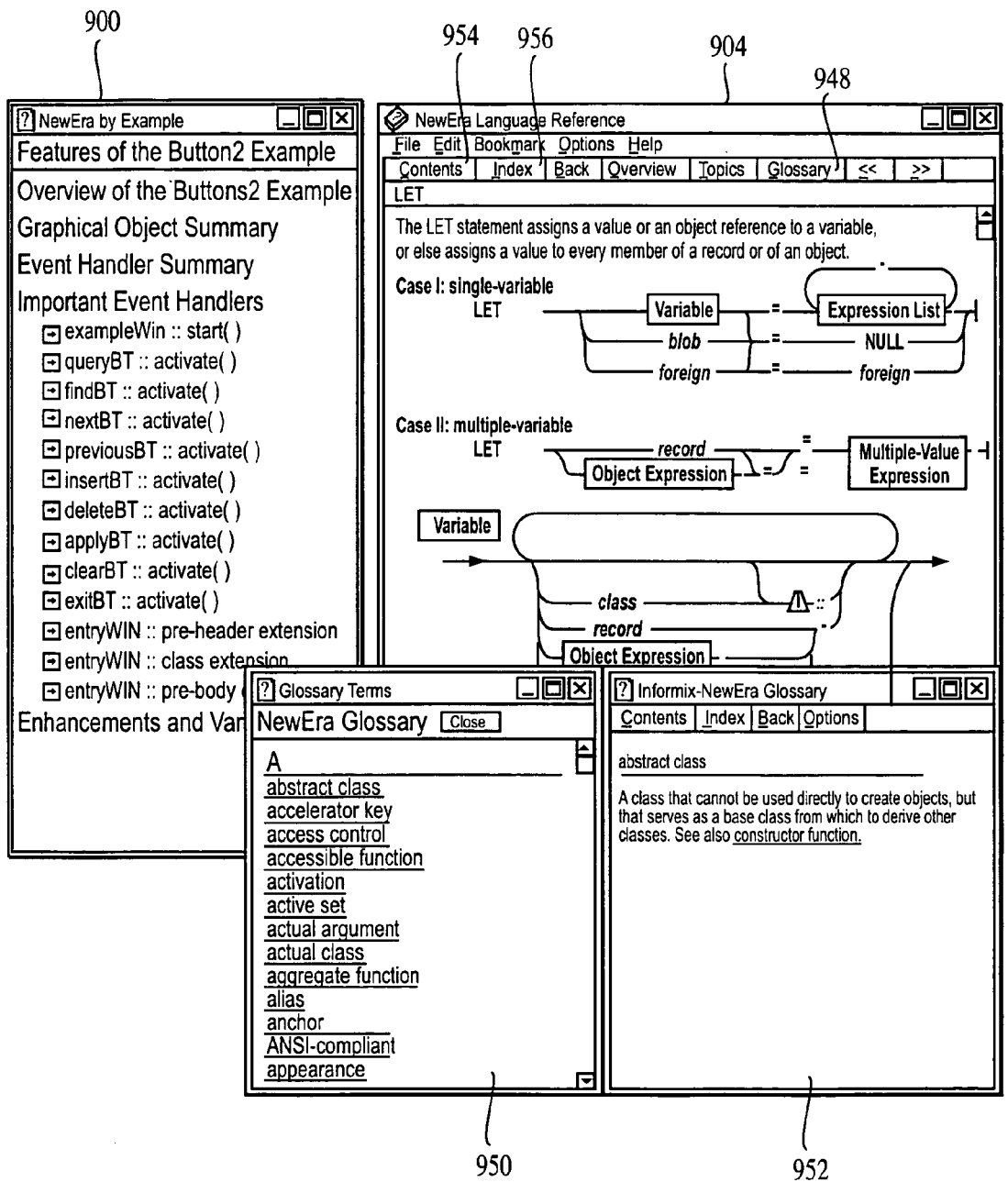

An example of hierarchical linking is shown in FIG. 9D in which text window 904 includes a link 936 (displayed as green, underlined text) to the MAIN( ) function, one of functions in the BUTTONS2 example. When the user clicks the MAIN( ) function link 936, the text window 904 displays the source code 940 for that function, as shown in FIG. 9F. The source code 940 includes further links to related information such as an online language reference manual containing descriptions of keywords and object classes. When the user clicks one of these links—for example, the keyword link 942 for the LET statement—the text window 904 changes to display the corresponding online language reference entry as shown in FIG. 9G. Similarly, if the user had clicked the object class link 944, the text window 904 would have displayed information about the ixSQLConnect class. In FIG. 9G, the user can follow links to still further background information, for example, by clicking the Object Expression box 946 to cause the text window 904 to appear as in FIG. 9H. Subsequently, or alternatively, the user can click the Glossary button 948 to bring up an online glossary in a pair of windows—a glossary table of contents window 950 and a glossary text window 952—as shown in FIG. 9I. Clicking a term in the glossary table of contents window 950 causes its definition to appear in the glossary text window 952.

After studying an example's annotation, its source code fragments, corresponding language reference entries, the glossary, or a combination thereof, the user can jump selectively to any other location in the help system by clicking the Contents button 954, which brings up the Help Topics menu 914 shown in FIG. 9B (or the Index button 956, which presents the available help topics in a searchable-indexed form), and then selecting the desired topic in the manner described in connection with FIGS. 9B and 9C.

Keyword links and class name links, such as the LET statement link 942 and the ixSQLConnect class link 944, respectively, in FIG. 9F are represented in visually unique manners (for example, blue uppercase text for keywords, blue upper and lowercase text for class names) so that they may be distinguished easily from each other and from other types of links such as the MAIN( ) function link 936 in FIG. 9D (green, underlined text). By using different styles for different types of links, Informix® by Example provides the user with intuitive and useful information concerning the nature of the online information available and the interrelationships between the different components (annotations, source code fragments, language references, etc.) of the examples. Virtually any number of different link types may be represented by different styles according to the preferences of the system designer.

For each of the source code fragments included in an example's annotation, a user can invoke an appropriate editing utility from within Informix® by Example to inspect, edit or copy the example's source code. This allows users to view a source code fragment in the context of the larger program from which it was taken.

Figure 9J:
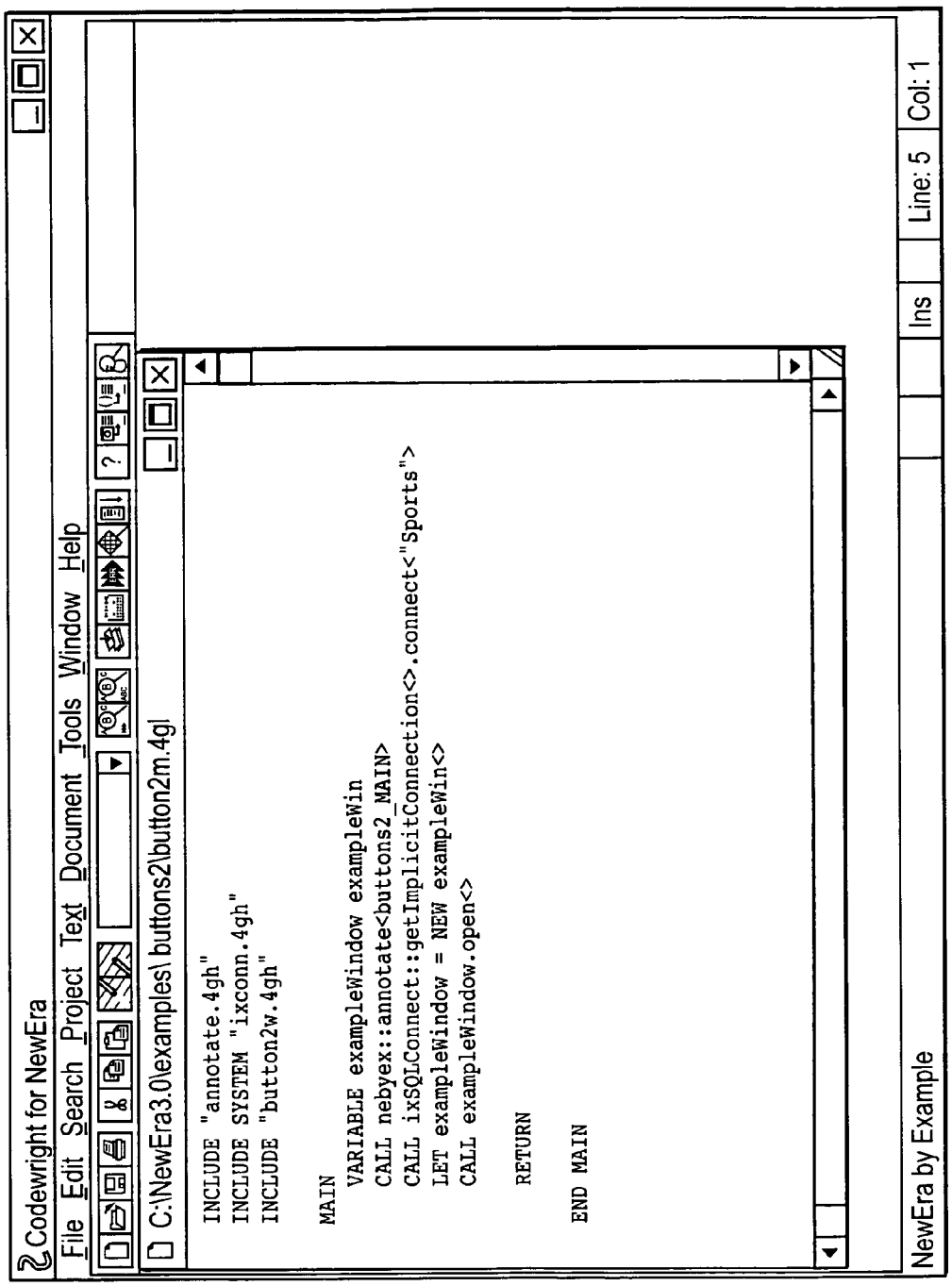
Figure 9K:
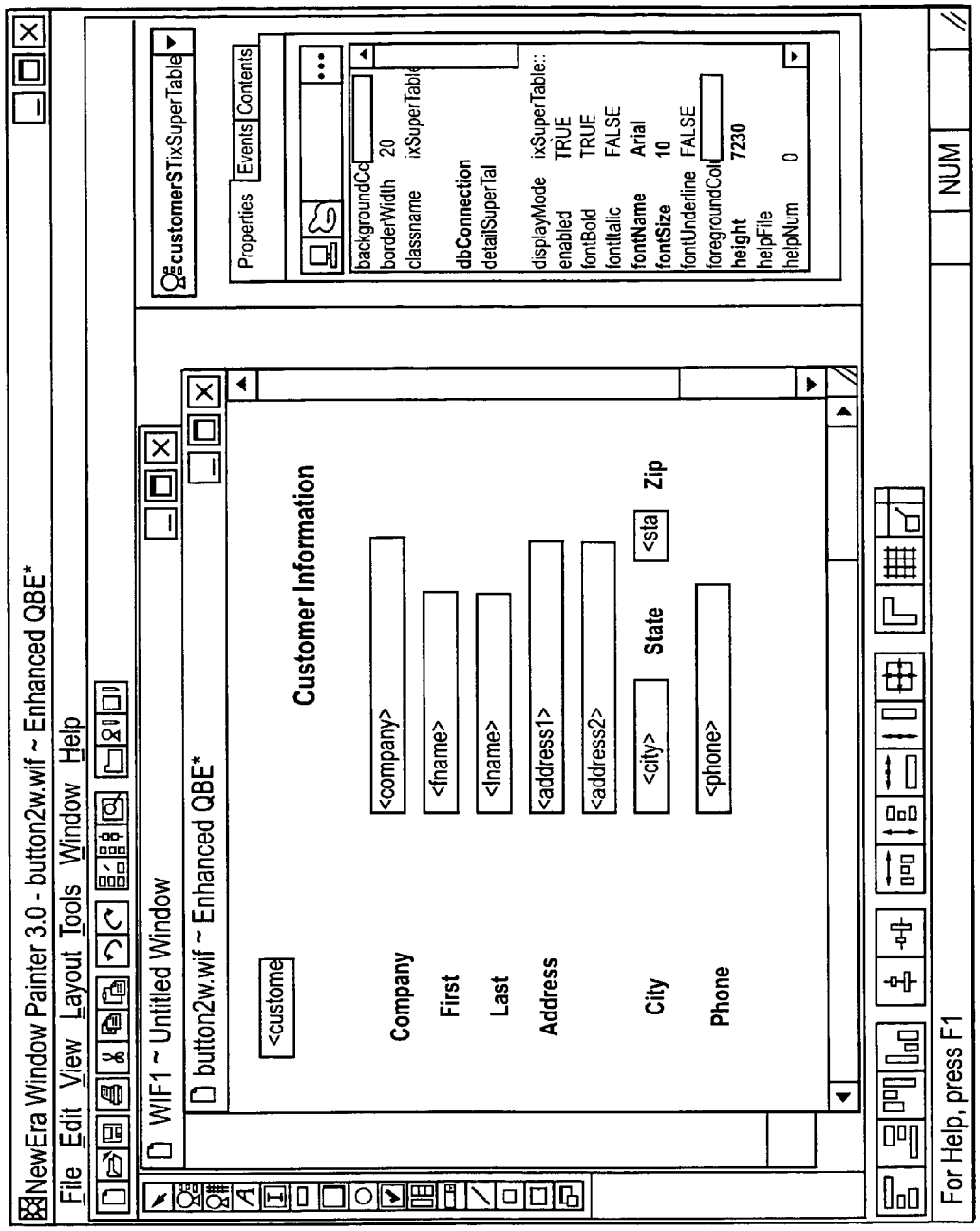

Informix® by Example includes source code fragments from two different types of source code—textual program code in the NewEra™ programming language (as indicated by a 4GL or 4GH file suffix), and windows interface definition files (files having the suffix WIF) which define how the GUI will appear to, and interact with, the end-user of the application undergoing development. To view either type of source code fragment, the user clicks a short-cut arrow next to a code fragment, for example, one of the short-cut arrows 958 and 960 shown in FIGS. 9D-9F, and Informix® by Example responds by launching an editor that corresponds to the type of source code under consideration. When the user clicks a short-cut arrow next to a 4GH or 4GL file, such as short-cut arrow 958 in FIGS. 9D and 9F, Informix® by Example automatically launches the appropriate editor—NewEra™ Codewright—to view the source code file from which the code fragment was taken, as shown in FIG. 9J. Similarly, when the user clicks a short-cut arrow next to a WIF file, such as shortcut arrow 960 in FIGS. 9D and 9E, Informix® by Example automatically launches the appropriate editor—NewEra™ Window Painter 3.0—to view the WIF file from which the code fragment was taken, as shown in FIG. 9K.

Selectively launching an appropriate one of multiple different editors in this manner reflects the standard editing behavior of the NewEra™ development environment. Both the NewEra™ development environment and the Informix® by Example documentation system make use of the same editors in the same manner. As a result, users gain familiarity with the application for which help is sought (that is, the NewEra™ development environment) through normal interaction with the online help system (that is, Informix® by Example).

Once the user has opened up the source code for an example, the user simply can study the code or can cut-and-paste portions of the code, whether visual objects from a WIF file or program statements in a 4GH or 4GL file, into the user's own source files. Alternatively, the user can perform a "Save As . . . " operation and thereby save the source code for the example under a new file name. The user then can edit or otherwise manipulate the new file as desired. In this manner, the examples provided by Informix® by Example can serve as templates for use in developing new applications in the NewEra™ development environment.

Users also may execute any or all of the 43 interactive examples provided with Informix® by Example to observe first hand how they operate. The examples are prebuilt and can be launched directly from their corresponding Informix® by Example annotations. To do so, a user first selects an example of interest from the Help Topics window 914 shown in FIG. 9C and, when the corresponding annotation appears in the text window, clicks the Run button appearing near the top of the text window. In response, the example executes and, based on the input received from the user, displays various screens to the user as if the example were a standalone application. At the same time, the text window automatically updates to display descriptive information that is pertinent to the portion of the example that was just executed by the user. With each successive operation that the user performs on the running example, the text window is updated simultaneously (or nearly so) to maintain synchronization with the state of the interactive example by displaying corresponding sections of the annotations which explain to the user what just happened in the example. By coordinating the help display with the current state of the examples, users consistently are provided with timely and useful information (for example, the particular source code being executed by the example) that is directly relevant to the user's current topic of interest. As a result, the user's ability to comprehend and absorb information is enhanced dramatically. An example of Informix® by Example's automatically coordinated help display is illustrated in FIGS. 9L-9P.

FIG. 9L shows the initial list window 900 and text window 904 that are displayed when the user selects the "Displaying an Edit Menu" example from the Help Topics menu. To run this example, the user clicks the Run button 962 which, as shown in FIG. 9M, spawns an example window 964 illustrating the basics of an edit window. At the same time, the text window 904 is updated to display information on the MAIN( ) function for the "Displaying an Edit Window" example.

Figure 90:
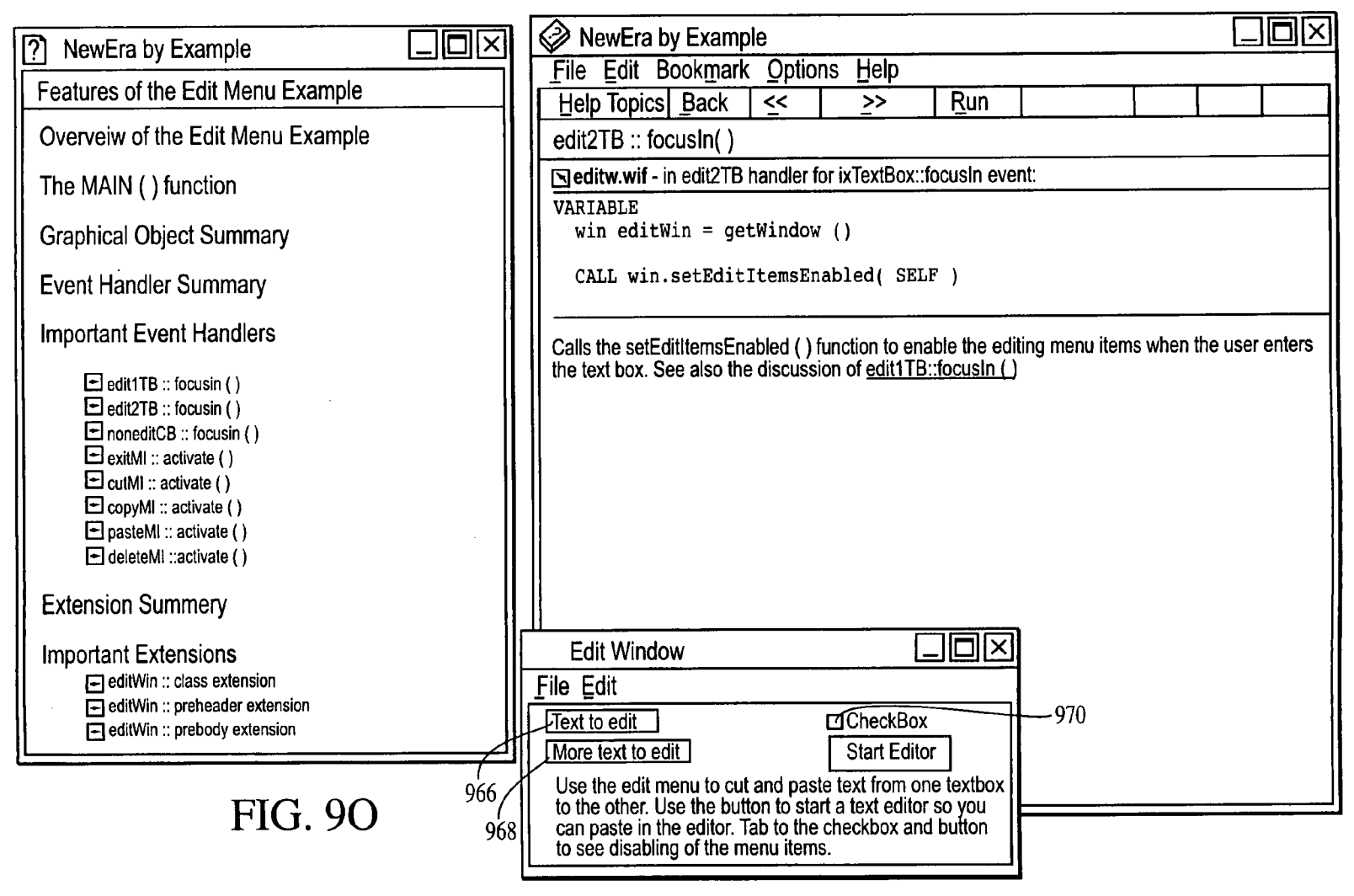

As the user selectively manipulates the GUI controls in the example window 964, the information displayed in the text window 904 is updated automatically in a corresponding manner. In FIG. 9N, the user has clicked in text box 966 which causes the text window 904 to display information relating to editlTB::focusIn( ). Similarly, when the user clicks text box 968, text window 904 displays information relating to edit2TB::focusIn( ) as shown in FIG. 90. When the user clicks the CheckBox 970, text window 904 displays information relating to noneditCB::focusIn( ) as shown in FIG. 9P.

Users can experiment with an example by changing its source code or modifying its parameters and observing how these changes affect the example. To do so, the user edits the desired source code file, saves it a separate working directory so as not to disturb the predefined examples, and then rebuilds the example using mechanisms provided with the NewEra™ development environment. The number and types of such experiments that can be created and performed are limited only by the imagination of the user.

Other options in running the examples are possible. For example, users can run an example without concurrently viewing annotations. Additionally, the Debugger provided with NewEra™ can be used to set breakpoints in the example source code before running the example, thereby giving the user even further insight into how an example works.

Figure 10:
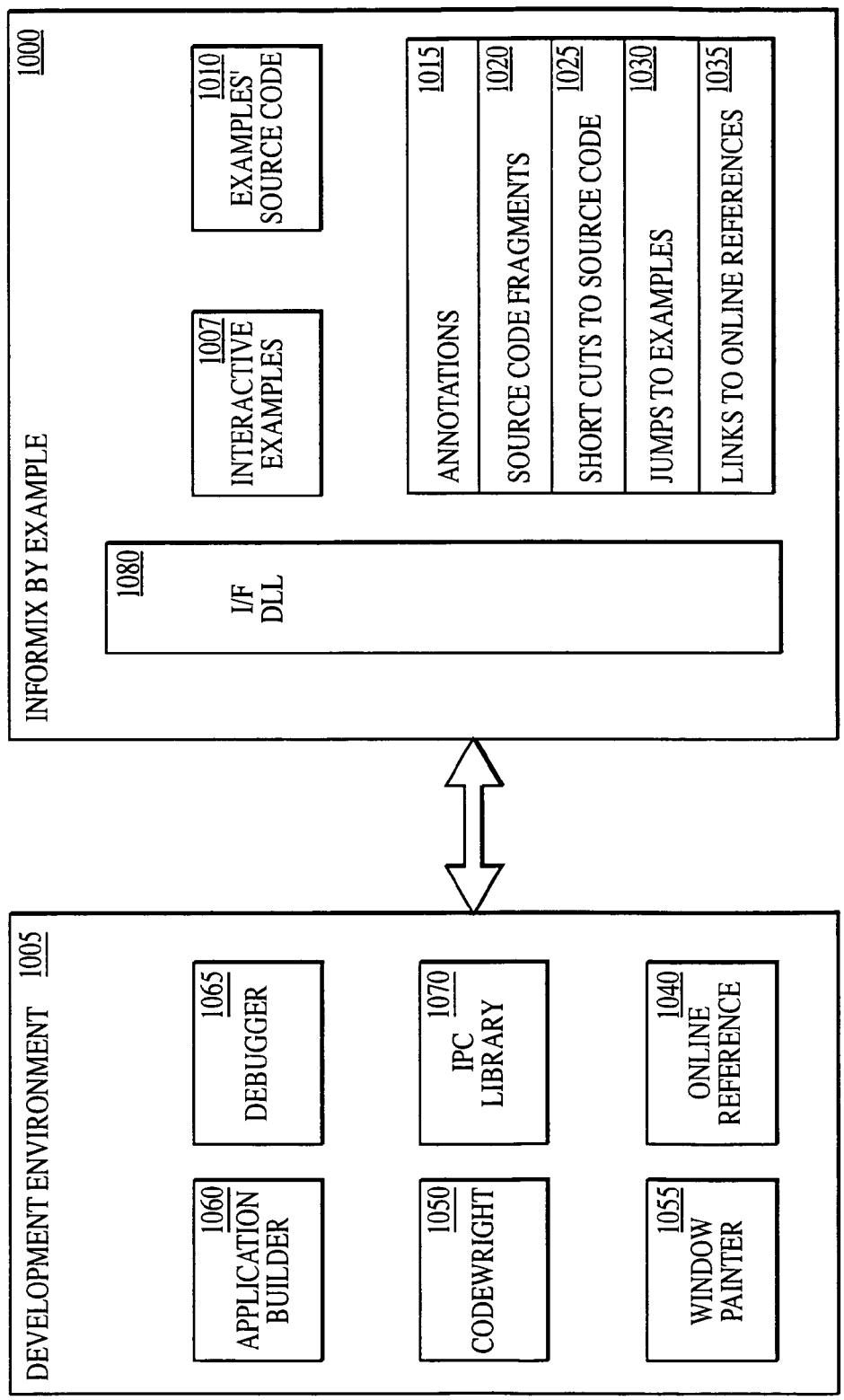
FIG. 10 is a block diagram of the NewEra™ architecture.
Figure 11:
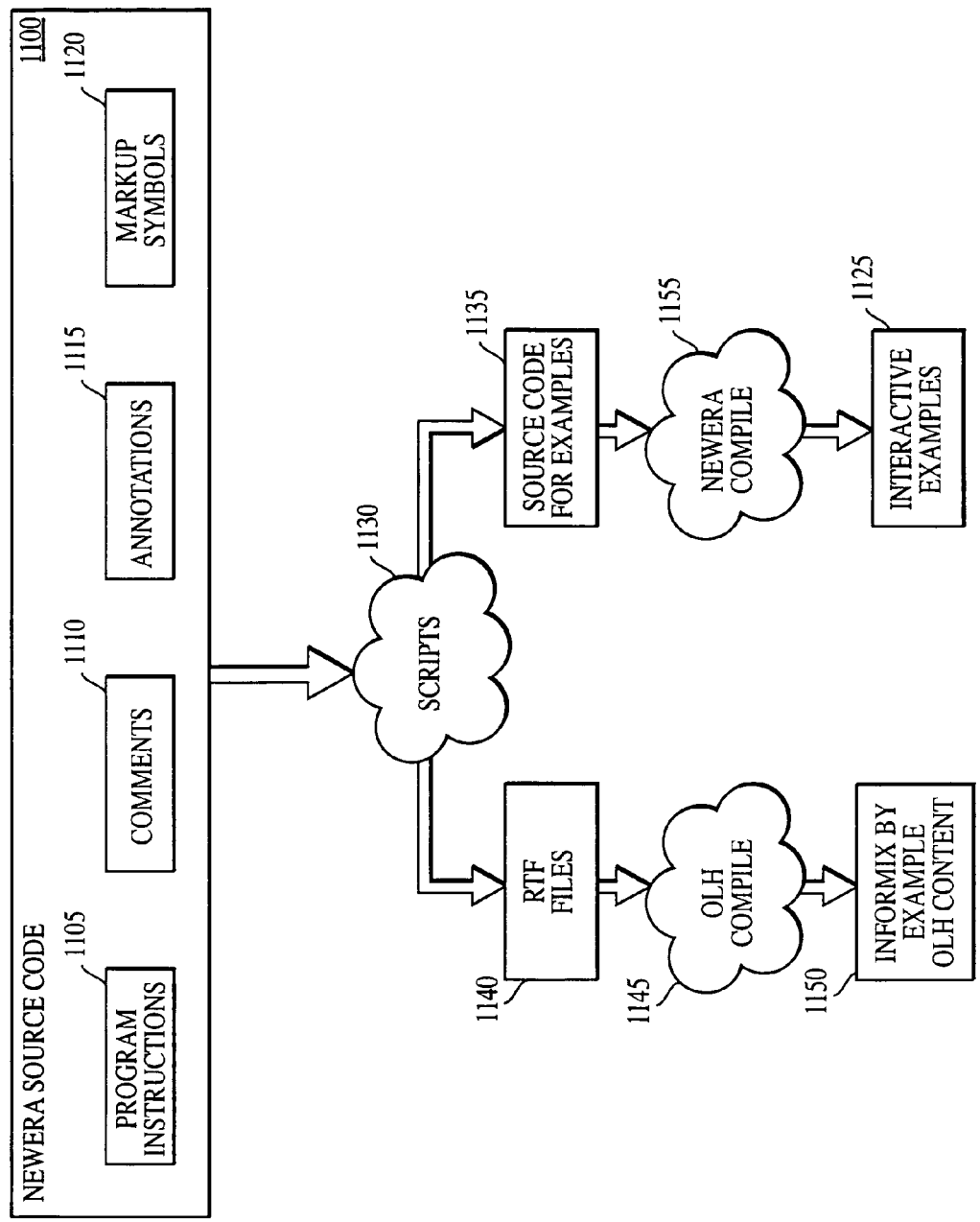
FIG. 11 is a block diagram showing how the Informix® by Example application is built.

A description of the Informix® by Example architecture, and the manner in which the NewEra™ development environment and the Informix® by Example application are built, is provided with reference to FIGS. 10-12.

Informix® by Example builds upon the Online Help (OLH) facility provided with the Windows 95/NT operating systems. As shown in FIG. 10, the Informix® by Example application 1000 draws both upon resources created specifically for Informix® by Example as well as resources that are native to the NewEra™ development environment 1005. The components specific to the Informix® by Example application 1000 include the interactive examples 1007, source code 1010 for the examples, and annotations 1015 describing the examples. The annotations 1015 include several different subcomponents including representative fragments 1020 of the examples' source code, short-cuts 1025 that launch an appropriate editor (for example, NewEra™ Codewright or NewEra™ Window Painter) for viewing the examples' source code, jumps 1030 to the interactive examples, and links 1035 to descriptions of specified keywords and class names contained in the NewEra™ online reference 1040.

As indicated in FIG. 10, the online reference 1040, the Codewright editor 1050 and the Window Painter editor 1055—along with other components such as Application Builder 1060, Debugger 1065 and Interprocess Communications (IPC) library 1070—exist as part of the development environment 1005 and thus are logically separated from the Informix® by Example application 1000. Consequently, when a user of the Informix® by Example application 1000 requests a resource residing in the NewEra™ development environment—either by clicking a link 1035 for a keyword or class name or by clicking a shortcut 1025 to view source code—Informix® by Example 1000 first must communicate with the NewEra™ development environment 1005 via an interface dynamic linked library (DLL) 1080 to access the requested resources. The interface DLL 1080 is a compiled library of routines that enable the Informix® by Example application 1000 to communicate with other applications such as the components of the development environment. Informix® by Example 1000 calls the appropriate DLL routines to display the requested online reference information or to launch the appropriate source code editor, depending on the nature of the request made by the user.

More specifically, when an Informix® by Example user clicks on a shortcut 1025 to a location in an example's source code 1010, the Informix® by Example application 1000 calls a function in the DLL, which in turn calls a function in the IPC library 1070 which launches the appropriate editor. As part of this function call (which is generated automatically by processing source code fragments during the build of Informix® by Example, discussed below), the Informix® by Example application 1000 passes parameters that designate the editor to be launched (Codewright 1050 or Window Painter 1055), and that identify the line number at which the examples' source code 1010 is to be opened by the designated editor. When an Informix® by Example user clicks on a link 1025 for a keyword or class name, the Informix® by Example application 1000 calls a function in the DLL, which in turn uses the Windows OLH facility to display the corresponding definition in the online reference 1040.

Other functions provided by the interface DLL 1080 control execution of the interactive examples 1007 and coordinate the list window and the text window displays to ensure that they maintain correspondence. Further details on the interface DLL 1080 and the runtime operation of the Informix® by Example application 1000 are set forth in Appendix B.

The manner in which the Informix® by Example application 1000 and its components (for example, examples 1007, examples' source code 1010 and annotations 1015) are generated realizes a high degree of code "maintainability"—a measure of the efficiency and ease with which an application can be modified. The high degree of code maintainability is achieved by incorporating all of the information used to generate both the interactive examples and the corresponding annotative components of Informix® by Example into a unified logical entity—namely, the source code for the interactive examples themselves. As a result, only one central source of information need be maintained. Any changes or updates made to that central information source will be incorporated automatically both into the examples and into the documentation/instruction/help facility (Informix® by Example) for the examples. This automated build procedure ensures that the examples and the corresponding Informix® by Example annotations are kept in synchronization regardless of the number and frequency of modifications made to the underlying source code.

As shown in FIG. 11, the NewEra™ by Example source code 1100 can be thought of as a single logical entity, although physically it is formed of a collection of interdependent files. The source code 1100 contains three basic types of text—program instructions 1105, program comments 1110 and annotations 1115—intermixed throughout the source code. The different text types are distinguished from each other by programming conventions and by strategically placing various different markup symbols 1120 throughout the source code.

Some of the text in the source code 1100 can serve multiple purposes. For example, the program instructions 1105 in the source code 1100 are compiled into the examples' binary executable files 1125. These program instructions include calls to the OLH facility to display the corresponding annotation at the appropriate point during execution of the example. When an example is run by the end-user, these OLH calls cause the text window to display the appropriate annotation automatically to describe what just happened in the example.

Portions of these same program instructions 1105 also will be extracted to serve as a clean copy of the examples' source code, which can be displayed to the user in an editing environment. Similarly, descriptive text that serves as program comments 1110 (unprocessed programming explanations directed at the Informix® by Example project developers) also can serve as annotations 1115 (programming explanations displayed to endusers of Informix® by Example at runtime).

The markup symbols 1120 delineate the various types of text in the source code and specify how they are to be handled when the interactive examples and the Informix® by Example annotations are built. FIG. 12 shows a sample of NewEra™ source code which includes several markup symbols including two instances of the "normal" symbol 1200 and 1205, an "[edit" symbol 1210 and a "] file" symbol 1215. Each of these markup symbols, along with their respective arguments, are bounded by a pair of brackets ("{ . . . }")

indicating that they reside in comment fields and are not to be treated as NewEra™ program instructions. Programming languages other than NewEra™ may use different conventions to delineate comment fields. In the Java programming language, for example, a start of a comment field is designated by a "/*" symbol and terminated by a "*/" symbol. In any event, the corresponding programming language compiler will ignore any text that has been designated as residing in a comment field.

The ".normal" markup symbol indicates that the text following that symbol (for example, "Since objects . . . ," following symbol 1200) is to be treated as explanatory comments, and thus to be displayed to the end-user in a text window as part of the annotation text at an appropriate point during execution of a corresponding interactive example. Other markup symbols specify the name of output files, portions of the source code that are to serve as representative fragments of the examples' source code, hotspots and destinations for jumps and links, or GUI-related information concerning display characteristics and objects (windows, popups, buttons, etc.). A detailed description of the markup language is set forth in Appendix C.

Once the source code 1100 has been modified as desired, it is used to build the interactive examples and the descriptive content of the Informix® by Example application through a number of different steps. First, the source code 1100 is processed by two different scripts 1130—a PERL script (Practical Extraction and Report Language, a general purpose interpreted language often used for parsing text) and a WordBasic script. The scripts 1130 generate two basic types of output: source code files 1135 for the interactive examples, and RTF files 1140 (Rich Text Format, the format expected by the OLH compiler) which represent the descriptive and visual content (for example, annotations, source code fragments, shortcuts to source code editors, links to online reference, jumps to executable examples) of the Informix® by Example application.

The PERL script parses the source code 1100 searching for markup symbols and, based on the particular markup symbols encountered, produces several RTF file fragments and several source code files 1135, which represent various subsets of the overall source code 1100. The WordBasic Script then merges the RTF file fragments into complete RTF files 1140 which are processed by the Windows OLH compiler 1145 to produce OLH files 1150 containing the descriptive and visual content for the Informix® by Example application. At the same time, the examples' source code 1135 is compiled by the NewEra™ compiler 1155 to generate the binary executable corresponding to the interactive examples 1125.

The RTF file fragments generated by PERL script contain several different components in addition to the annotations 1115 appearing in the source code 1100. The PERL script identifies each instance of a keyword or a class name appearing in the source code extracted for the examples. For each keyword and class name detected, the PERL script creates a link in the RTF file to the corresponding entry in the online reference materials.

The PERL script also extracts fragments of representative source code for inclusion in the RTF files as text that appears along with the explanatory comments. The source code fragments are formatted as monospace unwrapped text delineated by leading and trailing blank lines whereas the explanatory comments are formatted as proportionally spaced wrapped text. For each source code fragment included in the RTF file, the PERL script also inserts in the RTF file a corresponding short-cut button which enables the end-user to launch the source code editors and view the source code at the line where the fragment starts. The PERL script also strips all of the markup symbols 1120 from the source code extracted for the examples. This provides end-users with a clean version of the source code for viewing in the associated editor.

Other functions performed by the PERL script include automatically guaranteeing that the identifier for an annotation topic is the same in an interactive example as it is in the Windows OLH facility. That is, the PERL script reads the help topic identifiers for the Windows OLH facility and generates corresponding NewEra™ constants. The PERL script also generates modified versions of the NewEra™ makefiles (files that include computer-readable instructions for building an application) which are used to build the examples. Further details of the PERL script and its operation are set forth in Appendix B.

Although the PERL and WordBasic scripts described above operate on source code written in the NewEra™ programming language, different scripts can be used to parse other types of source code, for example, Java or Visual Basic. Generally, appropriate PERL and WordBasic scripts can be written to process virtually any type of programming language provided the programming language utilizes ASCII source code (required by PERL) and provides some sort of source code comment mechanism. Other programming language attributes that facilitate use of the Informix® by Example techniques include a mechanism for invoking the Windows OLH facility with a topic identifier (so the example can display its annotations), a mechanism for invoking the editing functions of the development environment (so the annotation can open source code files, assuming the programming language under consideration provides or requires a development environment), and an online reference in Windows OLH format (so keywords in the source code can have jumps to the online reference). Many of the Informix® by Example features described above can be implemented even if the underlying programming language lacks one or more of these other attributes, however.

PERL scripts can be modified to output files in formats other than RTF. For example, a modified PERL script can output hypertext markup language (HTML) files, which can be viewed using any available web browser (for example, Netscape Navigator).

Other variations of documentation by example are possible. For example, the annotations describing the interactive examples could be presented in a manner other than textual. Sounds, graphical symbols, pictures, movies or any other means of communication could be used as desired. Further, the selection of which interactive examples to perform could be based on factors other than, or in addition to, designation by the user. For example, an interactive example could be launched automatically at certain points during execution of the underlying application, or at certain execution points in the help system. When the user clicks a keyword, class name or other link, an example could be launched automatically either in addition to, or instead of, displaying the textual reference information pointed to by the link.

The documentation by example methods and techniques described above are not limited to aiding users of software development systems but rather may find application as a general training and education tool for any computer-based application or utility. Moreover, the techniques described here may be implemented in hardware or software, or a combination of the two. Preferably, the techniques are implemented in computer programs executing on programmable computers that each includes a processor, a storage medium readable by the processor (including volatile and non-volatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (for example, CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

For example, the documentation by example method and techniques may be applied in a network or web-based environment such as a local area network (LAN), an intranet, or the Internet. A web-based instruction system developed by Informix® Software, Inc., known as Informix® by Example, dramatically enhances the ease with which developers can effectively and efficiently implement database applications. The web-based instruction system provides users with examples and instructions in web pages to teach users how to implement applications. The applications themselves may or may not be web-based applications. The web-based instruction system enables users to read formatted source code, and navigate program structure (for example, the hierarchy of file, class, and function) to access details of the application program's implementation. The web-based system also permits users to jump from a language keyword (that may be indicated as such in code fragments) to a full reference documentation pertaining to that keyword. Users are able to open source code in an editor and run programs directly from the web browser at the click of a run button in a toolbar. As the example runs, an annotation page for the current method or function in the program displays. Therefore, the user is able to view the annotation as the function or method executes to more quickly understand how to implement such an application program.

This is in contrast to prior online help systems that simply show a user how to use an application. Because some implementation changes do not alter the operation of the application, but all implementation changes, by definition, affect the implementation, this makes maintenance of the implementation documentation even more important. The web-based instruction and help system solves this problem with prior online help systems by maintaining the annotations as embedded comments within the source code and generating the annotation pages automatically whenever the source file changes.

The web-based system also provides the users with how-to documentation for accomplishing a particular task. The how-to documentation provides clear step-by-step instructions, and presents a flexible interface for experts and "newbies" alike. The how-to documentation includes useful graphics, and provides links to needed software and related demos and other technical information. Additionally, the how-to documentation helps the user to determine which products to use to accomplish a goal.

Figure 13:
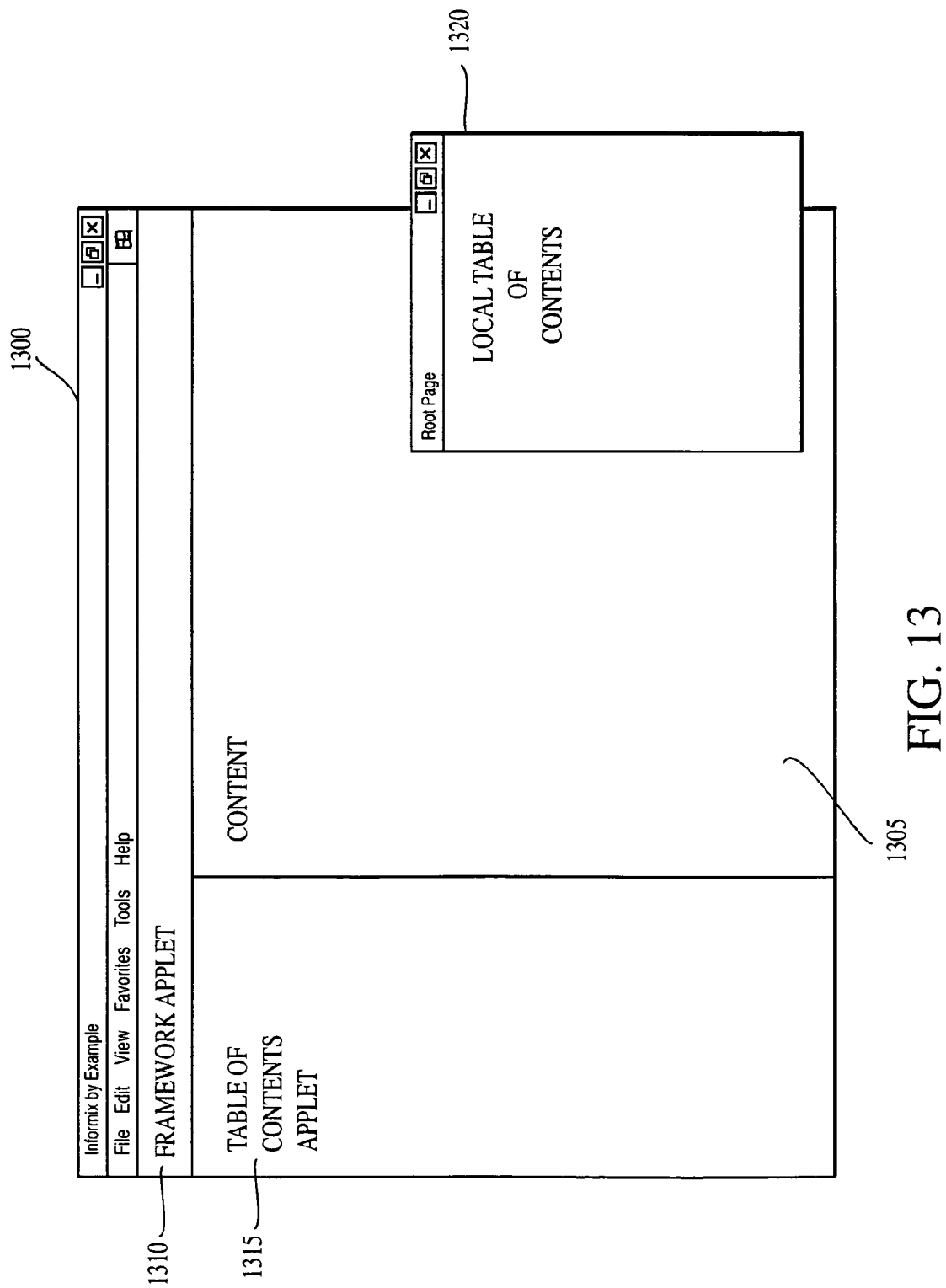
FIG. 13 shows display regions in a web-based instruction system.

As illustrated in FIG. 13, when a user first accesses a web browser providing the web-based instruction system, a default browser configuration 1300 is displayed. The initial browser includes a framework of three separate display frames: a content frame 1305 that typically displays a web page, but may also display other relevant content such as annotation pages (which are a specific type of web page), a top frame 1310 that includes a framework applet (for example, a Java applet) that displays a tool or navigation bar in addition to providing other services, and a table of contents (TOC) frame 1315 which may be implemented using, for example, a Java applet.

When the browser displays a by Example® HTML page, the page uses JavaScript to automatically check for the presence of the framework. If the framework is present, the JavaScript notifies the framework applet in the top frame 1310 about the name of the new page and the type of content it provides. If the framework is absent from the page, the JavaScript opens the framework with the page as the initial page (that is, the page on which the notification occurs).

Figure 14A:
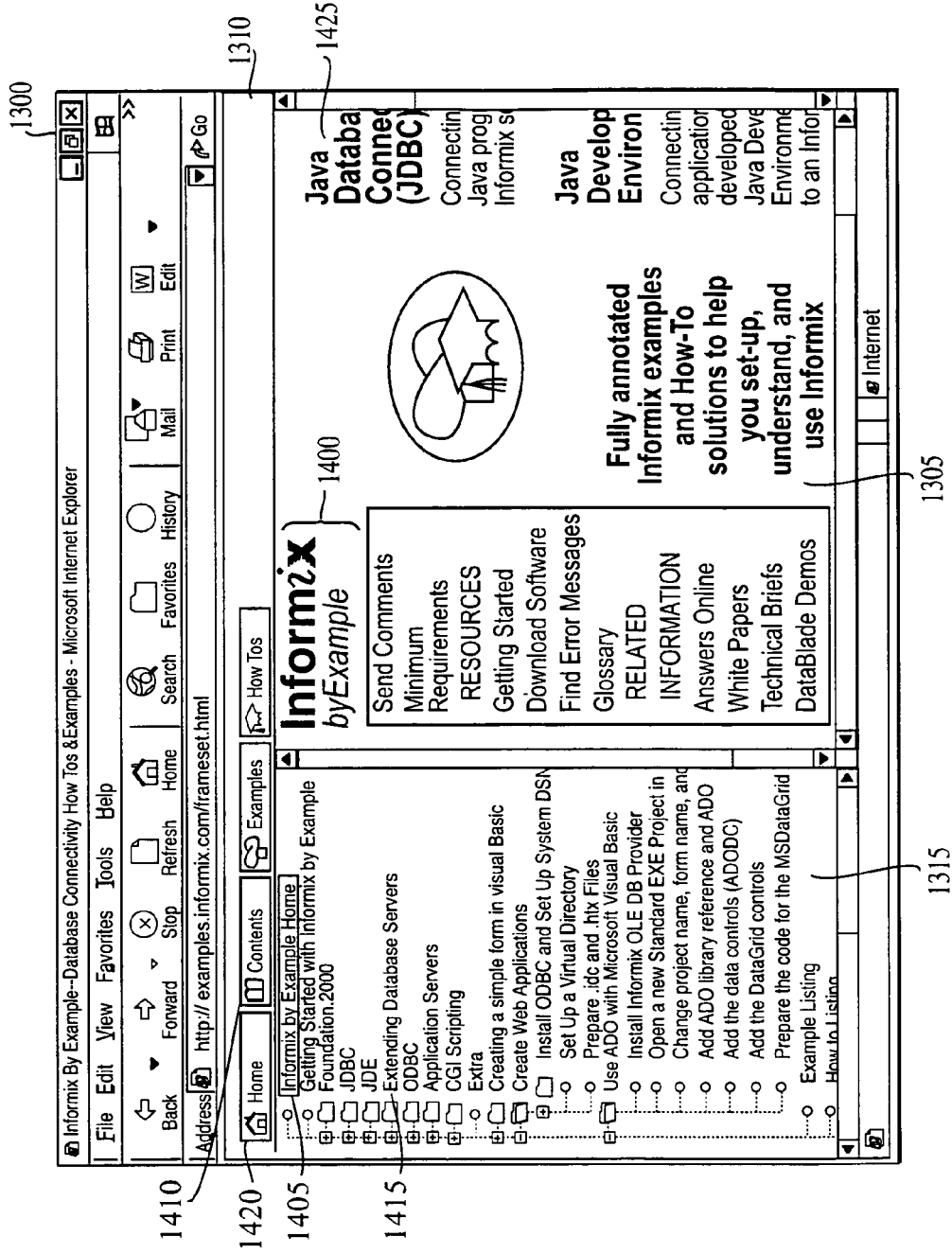
Figure 14B:
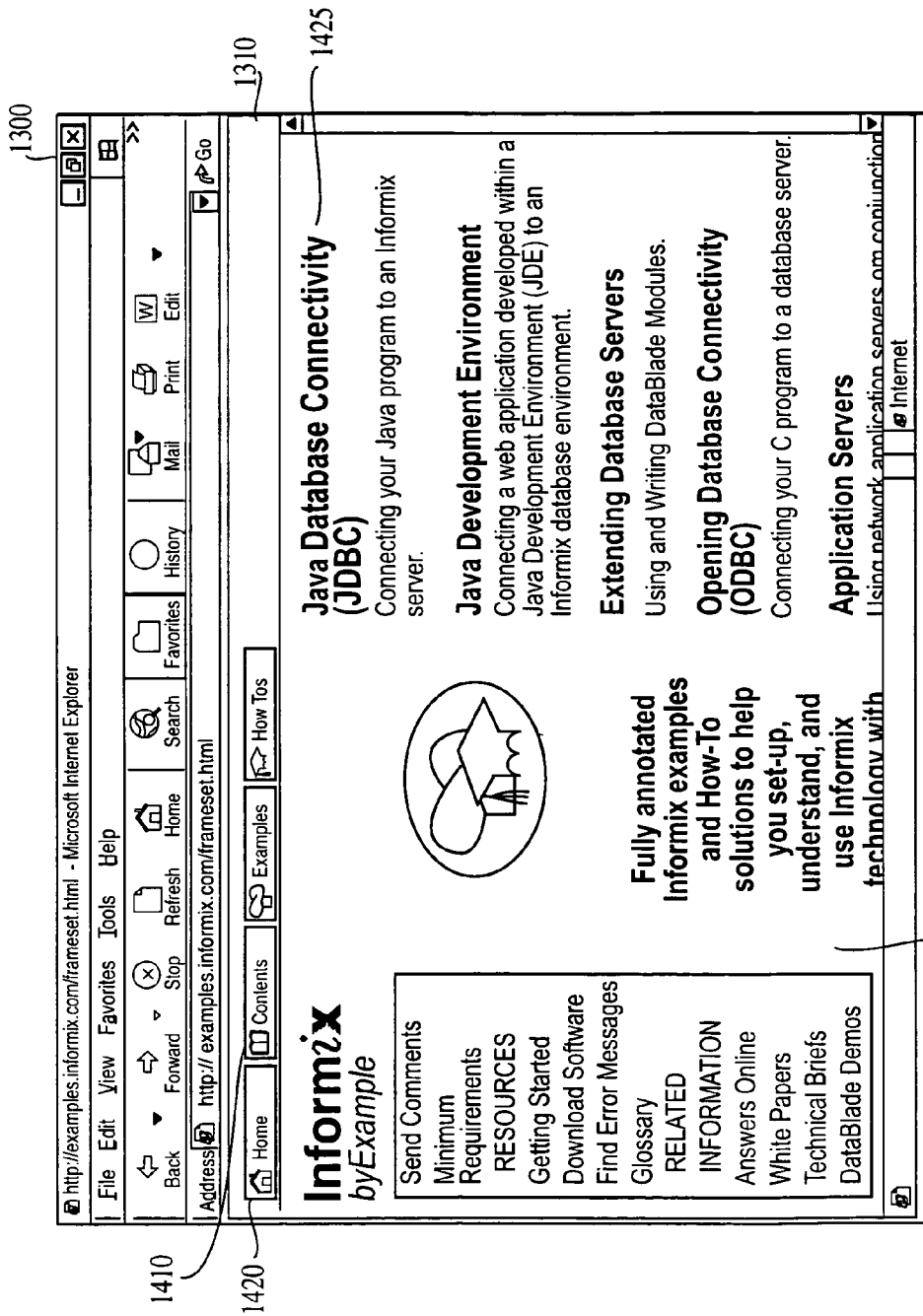

Referring also to FIGS. 14A and 14B, based on the name of the page 1400, the table of contents 1315 automatically selects the corresponding title 1405. The table of contents 1315 tests the available Java libraries on the client and automatically displays the table of contents hierarchy with a tree control if available. The table of contents frame 1315 is user-resizable and dismissible using a contents button 1410 in the top frame 1310: for example, in FIG. 14A, the table of contents frame 1315 takes up around 40% of the browser, while in FIG. 14B, the table of contents frame 1315 is dismissed and therefore not visible. The contents button 1410 automatically indicates the status of the TOC by displaying a dismissed icon (for example, in FIG. 14B) or an opened icon (for example, in FIG. 14A).

Figure 14C:
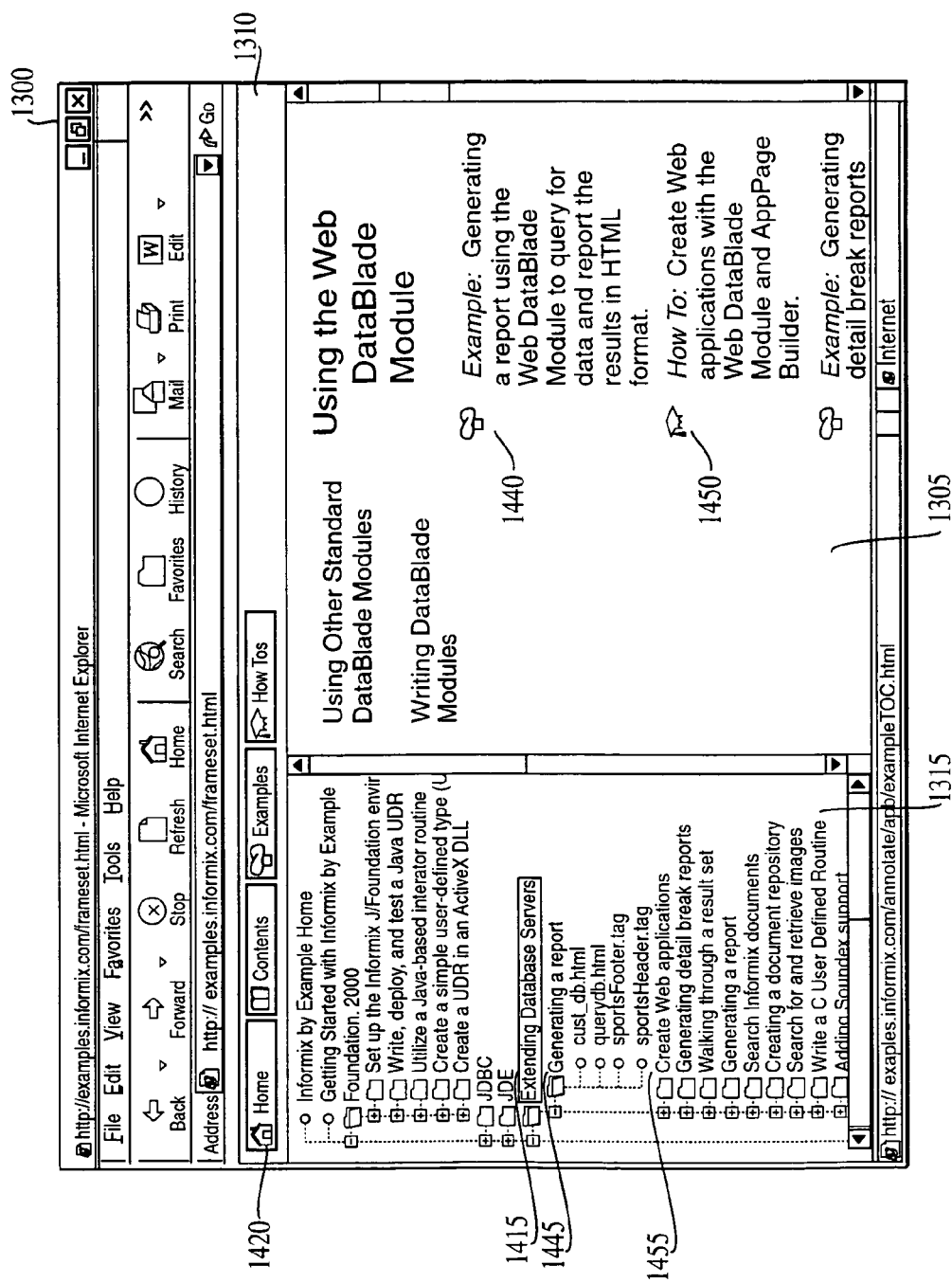

The user may access other links in the content frame 1305 from the TOC frame 1315 by clicking on a corresponding subtopic in the TOC tree, for example, the subtopic "Extending Database Servers" 1415. In response, as shown in FIG. 14C, the content frame 1305 displays content corresponding to that subtopic and the TOC frame 1315 highlights the selected subtopic 1415. Also evident in this particular example is that the top frame 1310 includes a home button 1420 that automatically changes its appearance (like the contents button) depending on whether the browser is displaying a home page or not.

Figure 14D:
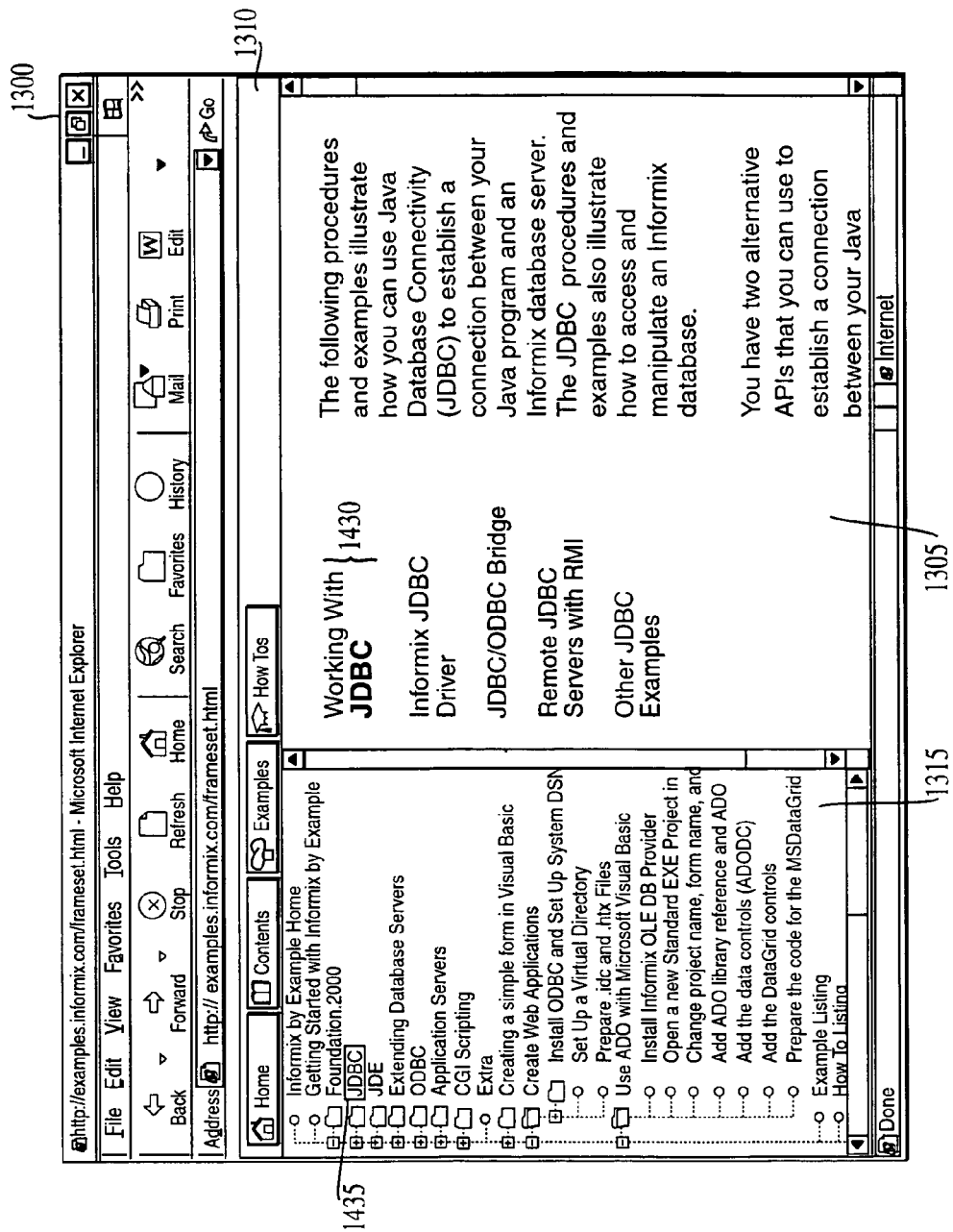

Alternatively, the user may access links in the content frame 1305 by clicking on the corresponding link in the content frame, for example, subtopic link "Java Database Connectivity (JDBC)" 1425 shown in FIG. 14B. In response, as shown in FIG. 14D, the content frame 1305 displays content corresponding to that subtopic, including a title 1430 representing that subtopic. Furthermore, the TOC frame 1315 automatically highlights the selected subtopic 1435 in the TOC tree to indicate to the user which content is displayed in the content frame 1305. Such synchronization between the TOC and the content helps the user to effectively and efficiently navigate through the many subtopics and topics of an application.

Figure 15A:
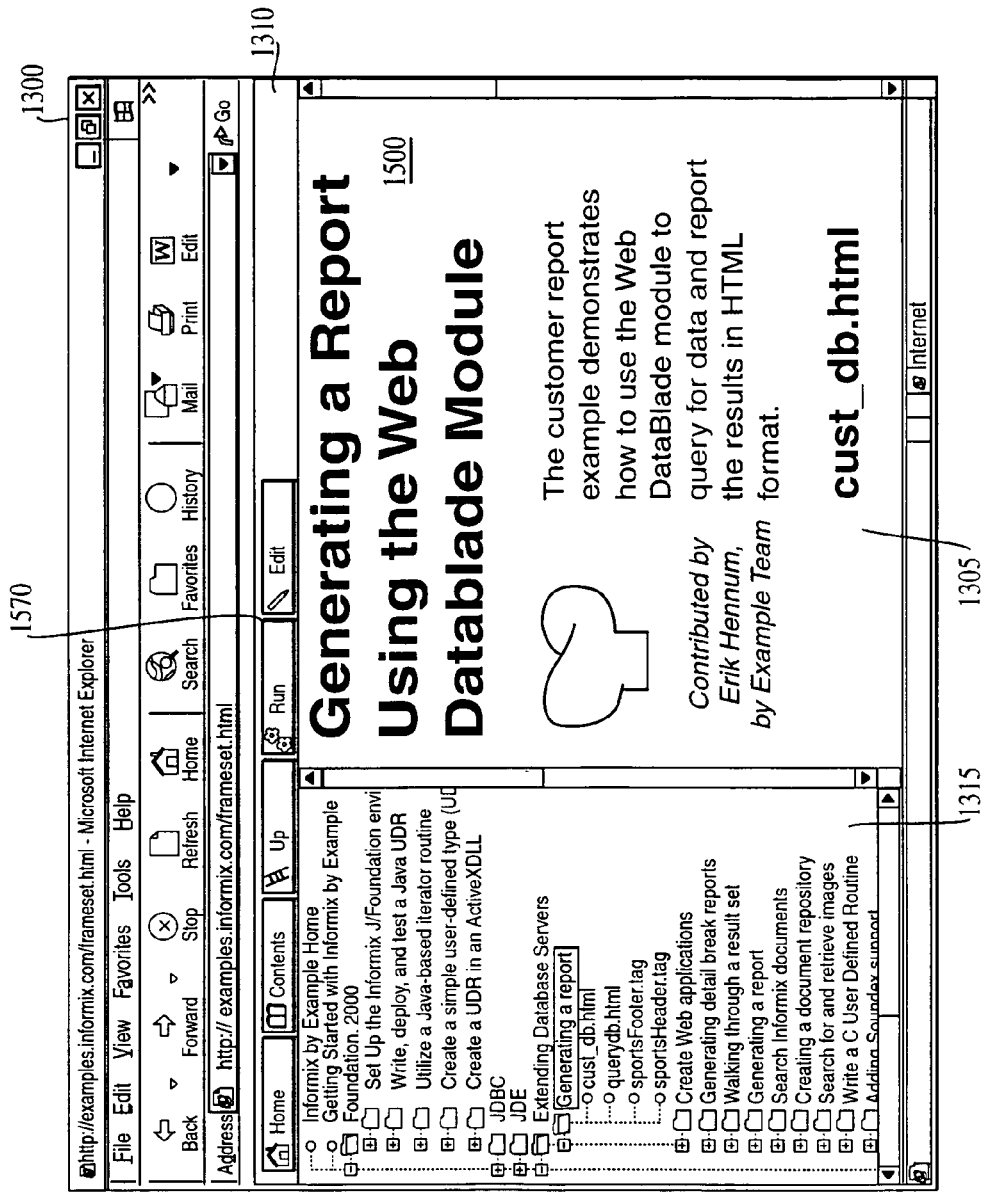

Referring again to FIG. 14C, when the user selects an example using either an example icon or link 1440 in the content frame 1305 or a subtopic icon or link 1445 in the TOC frame 1315, the browser displays in the content frame 1305 an annotation page 1500 that describes the corresponding example as shown in FIG. 15A. Referring also to FIG. 15B, the annotation page 1500 includes annotations 1505 descriptive of the example (also called prose), and at least one link to another annotation page 1510.

Figure 15C:
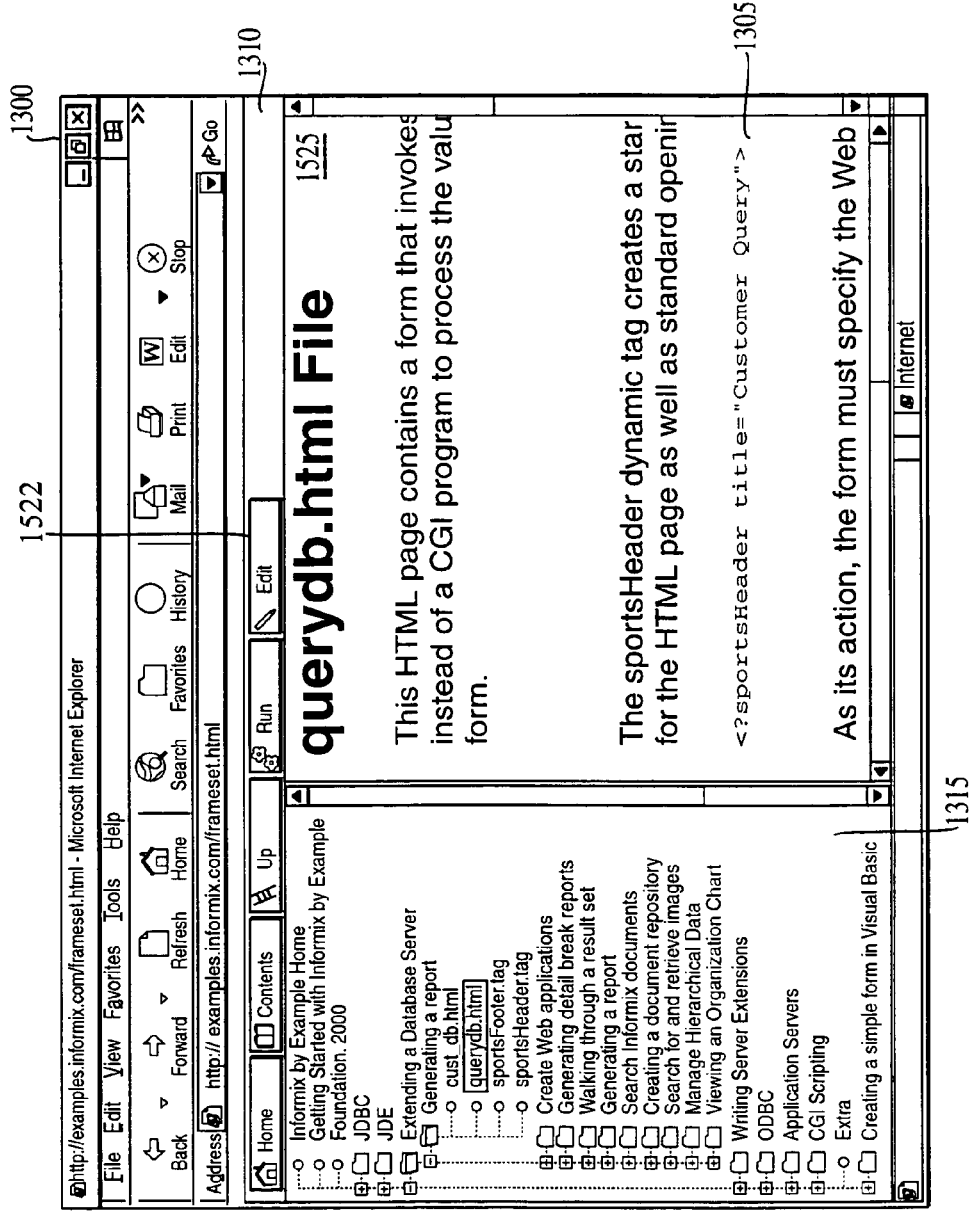

For example, when the user clicks the link for the source file "querydb.html", the content frame 1305 displays the source code file annotation page "querydb.html" 1525 as shown in the browser of FIG. 15C. The content frame displays source code fragments 1530 relating to the corresponding source code file querydb.html, as shown in FIG. 15D. The source code fragments 1530 have been imported directly from the source code files of the example under consideration. The source code file annotation page in the content frame also displays annotations 1535 describing the source code file to which the topic corresponds; such annotations 1535 may be referred to as prose.

Source code is marked up with standard HTML. Annotations 1535 are easy to maintain because the annotation comments are embedded within source code comments in the source code files. For example, referring to FIG. 15E, the source code file 1560 is shown for the querydb.html source code 1525. Annotation pages, containing the source code fragments, are generated automatically from the marked up source code files.

Figure 16A:
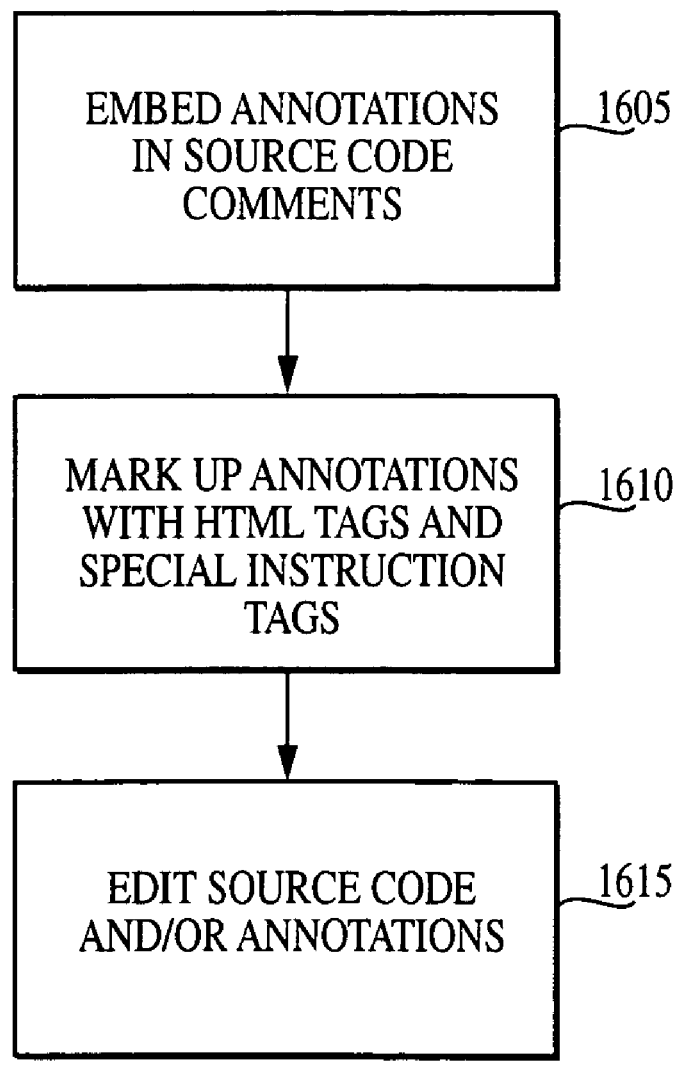
FIG. 16A is a flow diagram showing steps taken by an author of annotation pages.
Figure 16B:
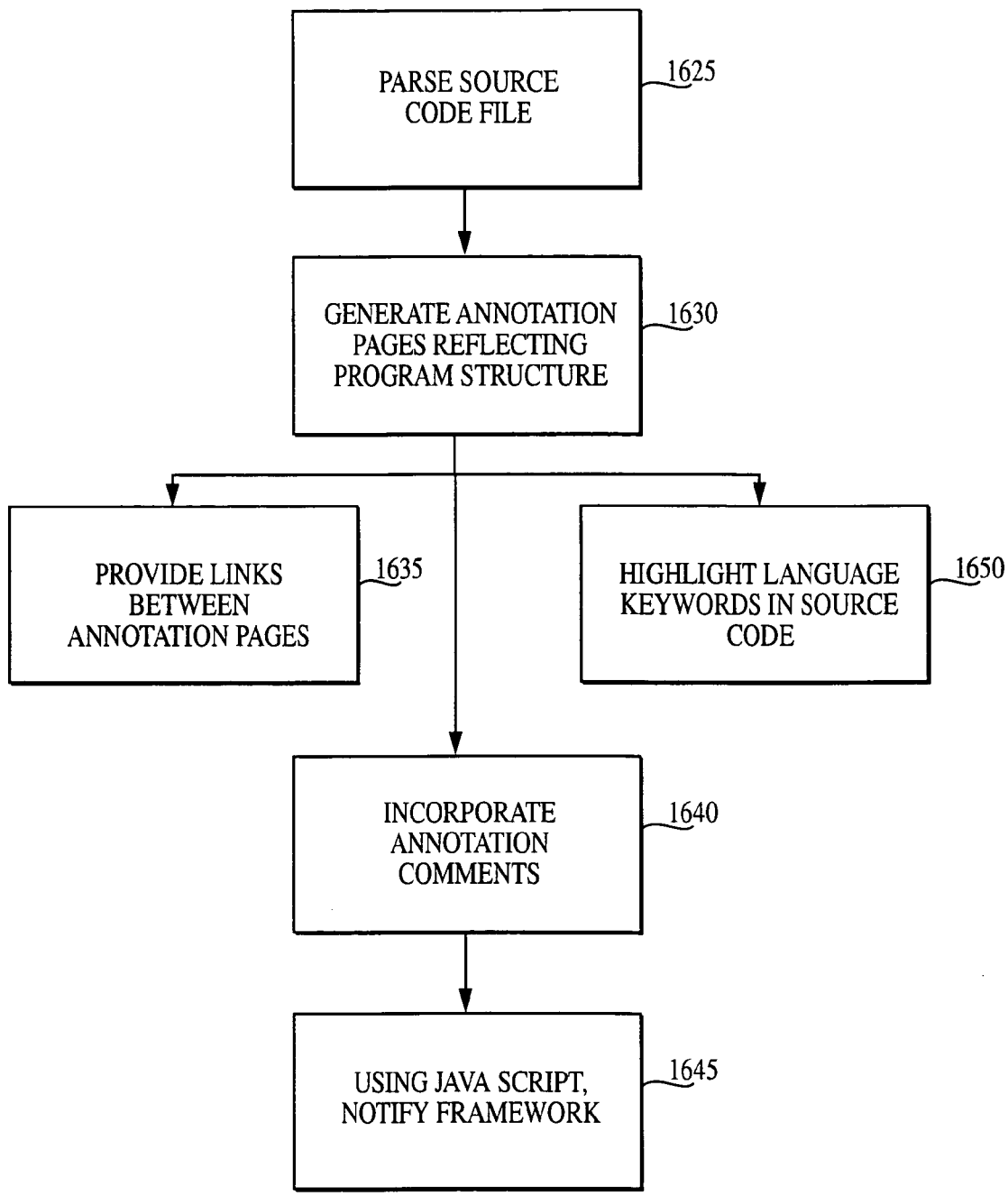
FIG. 16B is a flow diagram showing steps taken by a scripting program to automatically generate links in the annotation pages.

Referring to the flow chart 1600 of FIG. 16A, an author of an example annotates the source code file by embedding annotations in source code comments (step 1605). The author also marks up the embedded annotations with HTML tags and one or more special instruction tags for the web-based system (step 1610). Once the source code files are marked up, as shown in the flow chart 1620 of FIG. 16B, a scripting programming language such as PERL parses the source code file to determine the program structure from the programming language, and reads the annotations and special instruction tags (step 1625). The PERL script generates annotation pages that reflect the program structure of the source code file (step 1630). Moreover, the PERL script provides links between annotation pages for navigating the program structure (step 1635), incorporates the annotation comments (step 1640), while using Java Script to notify the framework (step 1645), and highlights language keywords in source code as links to related information (step 1650). Annotations are therefore easily maintained. Referring again to FIG. 16A, the author of the example may adjust or edit the source code and the annotations at the same time and at the same location (step 1615). Therefore, annotations are regenerated automatically.

Figure 17A:
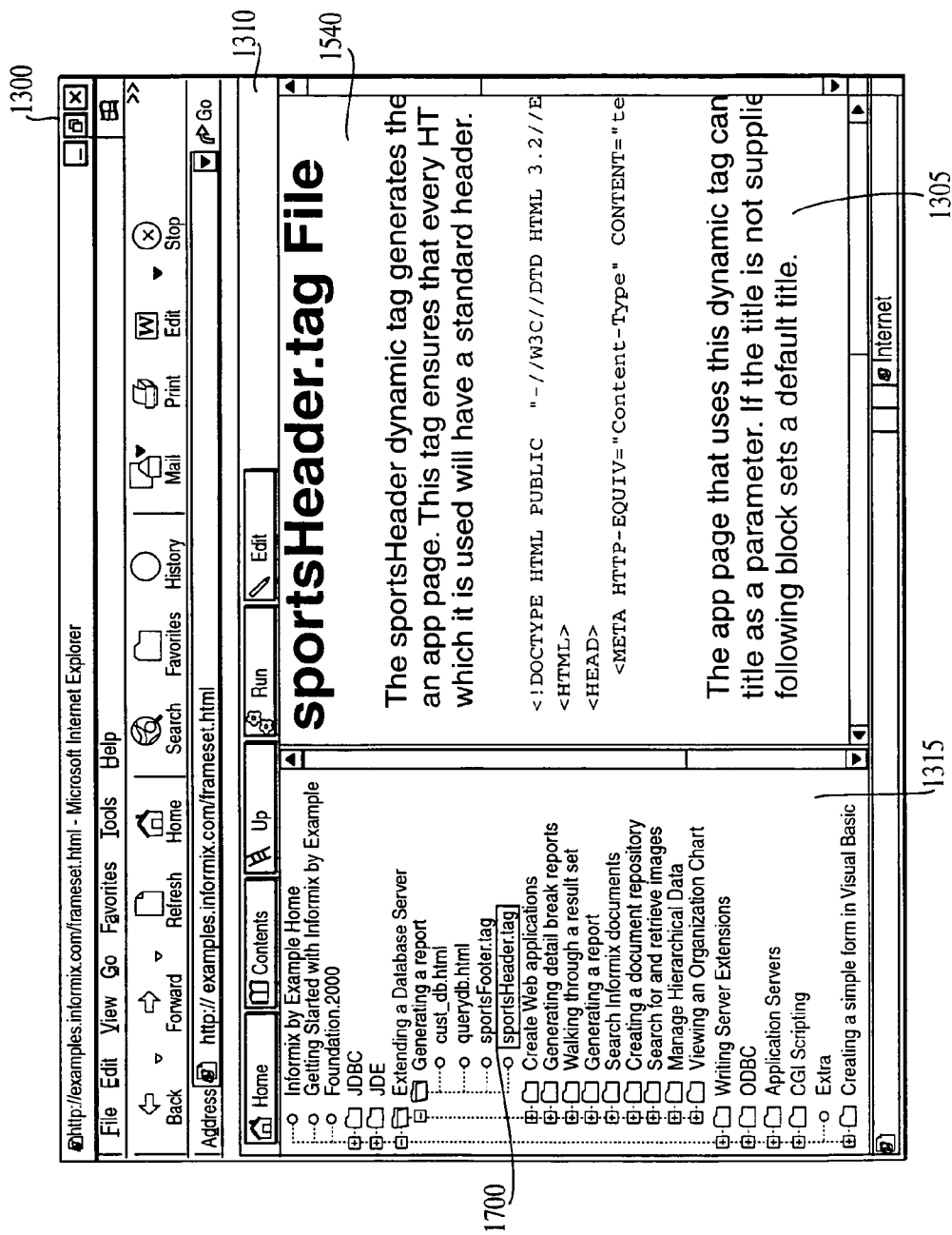

The annotation page in the content frame also may contain one or more links to related information or from one annotation page to another annotation page. Such flexibility is due to the automatic generation of annotation pages discussed above because the PERL script determines the program structure and formats references to other parts of the program as links. For example, when the user selects the "sportsHeader.tag" link in the querydb.html file 1525, the content frame 1305 displays the sportsHeader.tag source code annotation page 1540, and the TOC frame 1315 automatically highlights the corresponding subtopic link 1700, as shown in FIG. 17A.

Figure 17B:
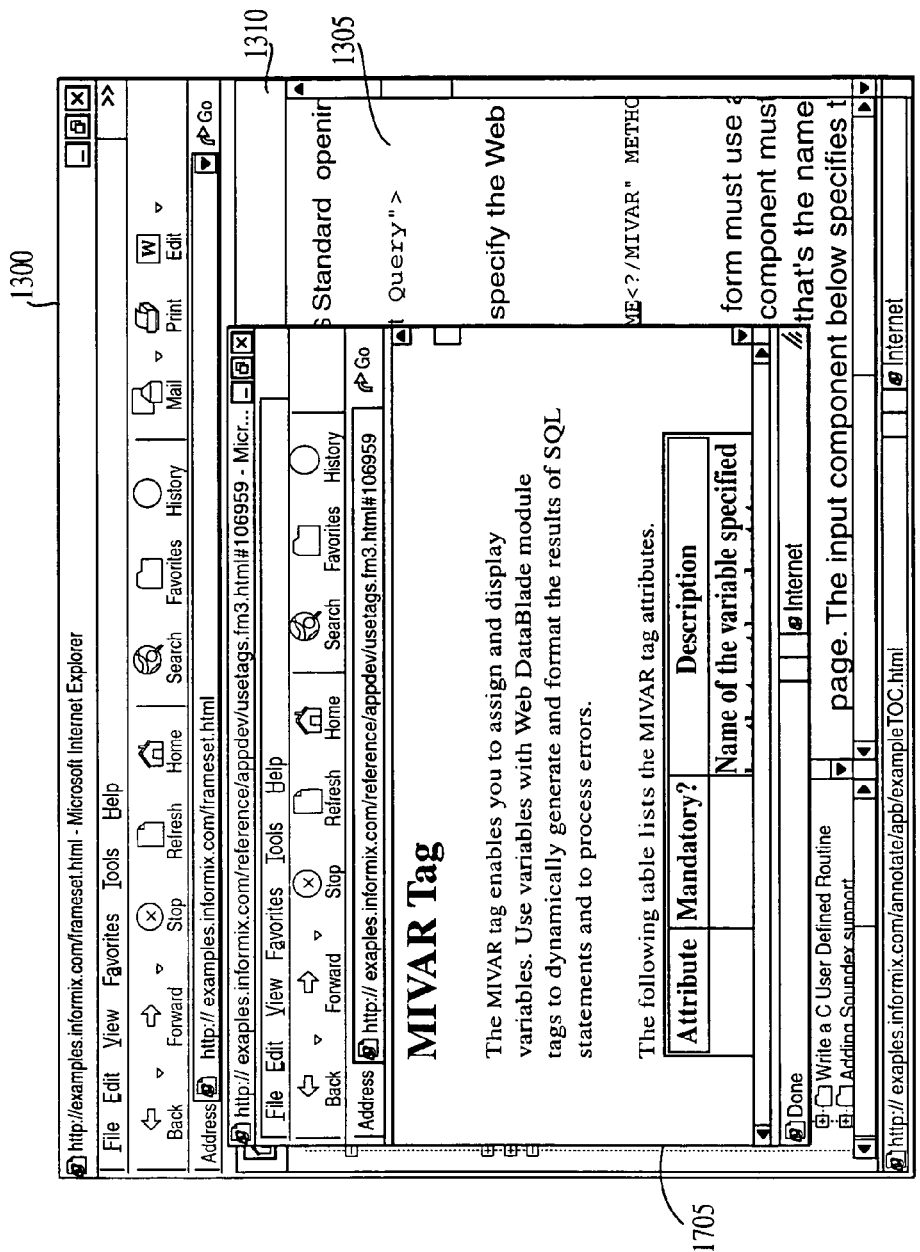
Figure 17C:
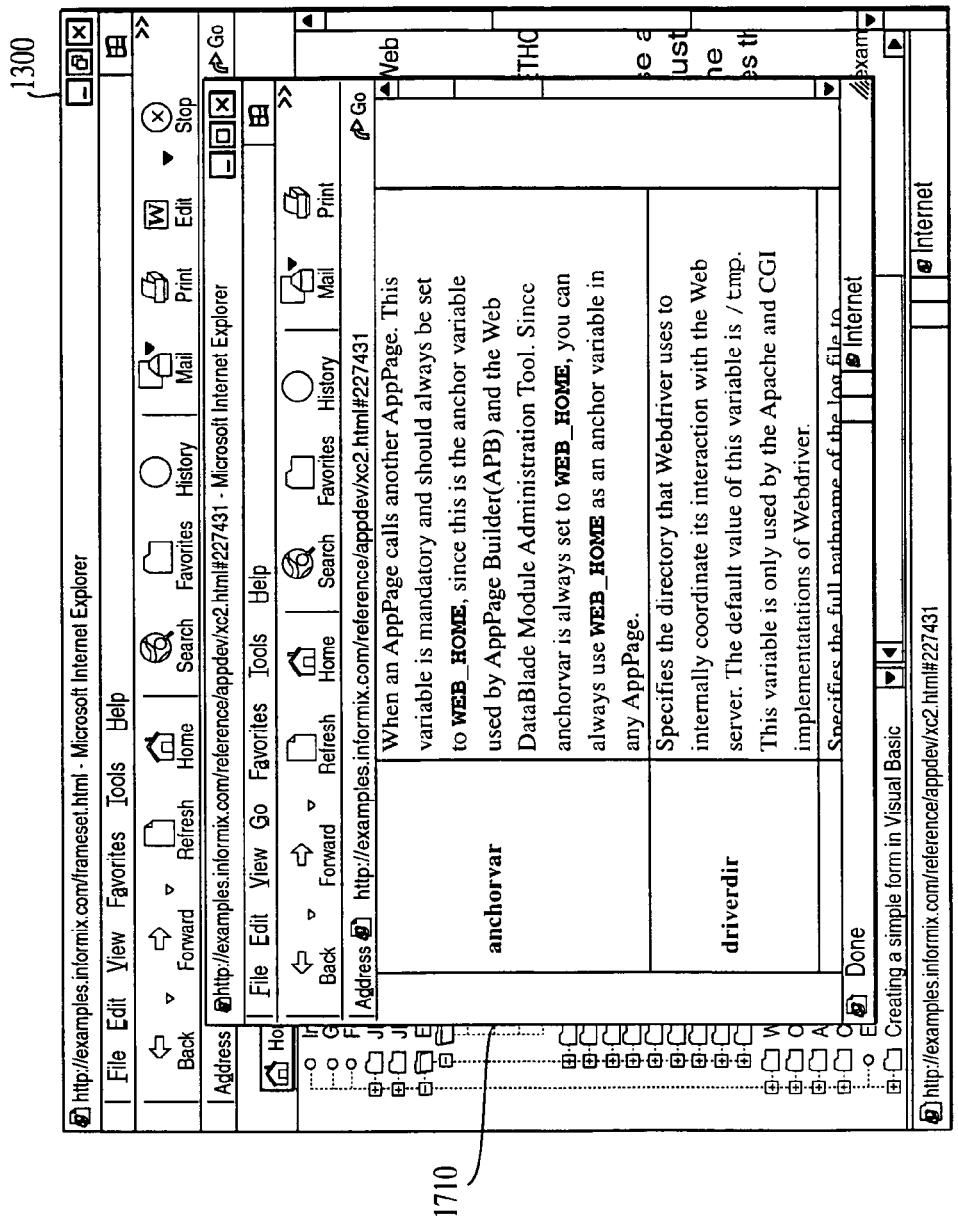

The selectable link in the content frame annotation page may correspond to background reference material. For example, when the "MIVAR" link is selected, a separate browser 1705 is spawned that displays information about the MIVAR tag, as shown in FIG. 17B. In this case, the PERL script finds keywords in the source code and formats them as links to the reference documentation. If the user selects the "WEB HOME" link in the content window, a browser 1710 is spawned that includes a glossary, as shown in FIG. 17C.

Figure 17D:
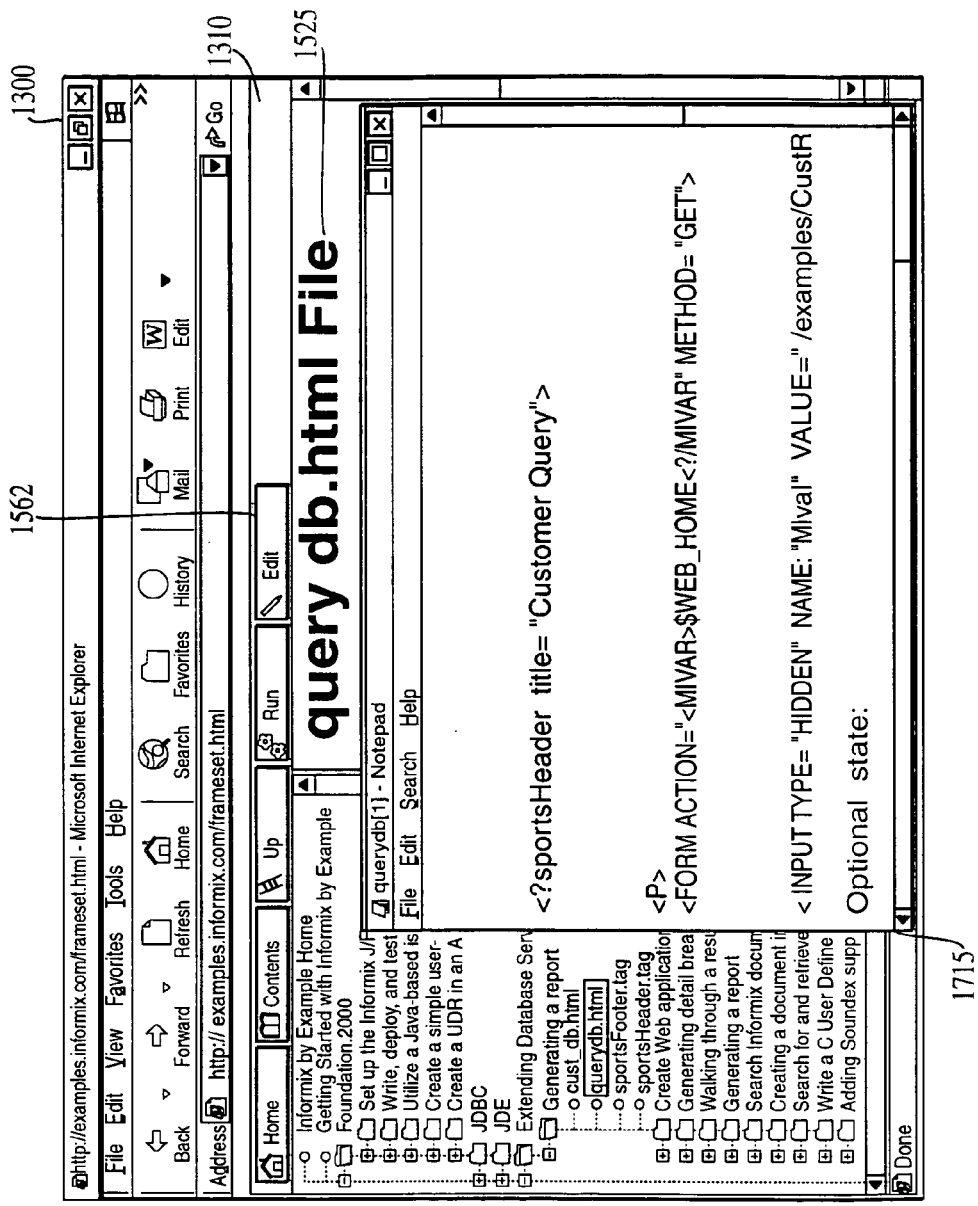

Referring again to FIG. 15C, the user can select an edit button 1562 in the top frame 1310 to open the source file corresponding to the annotation page in the content frame 1305 as plain text in a browser window 1715, as shown in FIG. 17D. In this case, the PERL script automatically strips the annotation comments out of the source file so the user is able to edit a source file that is unencumbered by long explanations. The user could then cut and paste text between this window and another text window that displays the user's own program.

Referring again to FIG. 15A, the user can run an example using the framework applet to launch a Java example applet or application, to download an HTML page containing a Java applet or other embeddable program object, or to send a common gateway interface (CGI) request to the web server to run non-interactive programs with output redirected to a browser window. In the case of Java examples, the running example calls Java application programming interfaces (APIs) to ask the web browser to show the annotation pages. In the case of CGI programs, the example program returns an HTML page that contains JavaScript to ask the web browser to show the annotation pages. Thus, the examples run either on the server or in the restricted sandbox of the web browser. The examples could run on a local client if the framework used the security features of the browser to ask the user for permission to run the example locally.

Figure 16C:
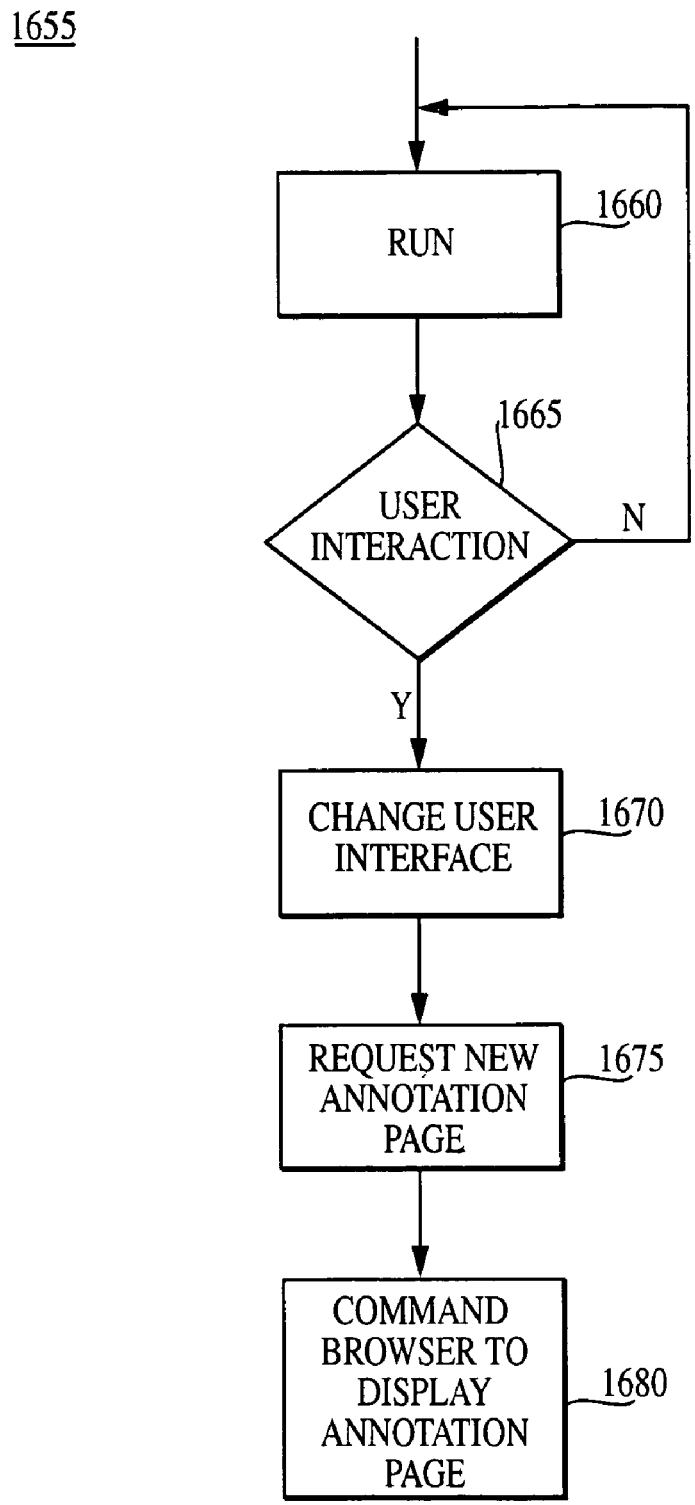
FIG. 16C is a flow diagram showing steps taken by an example program.
Figure 18A:
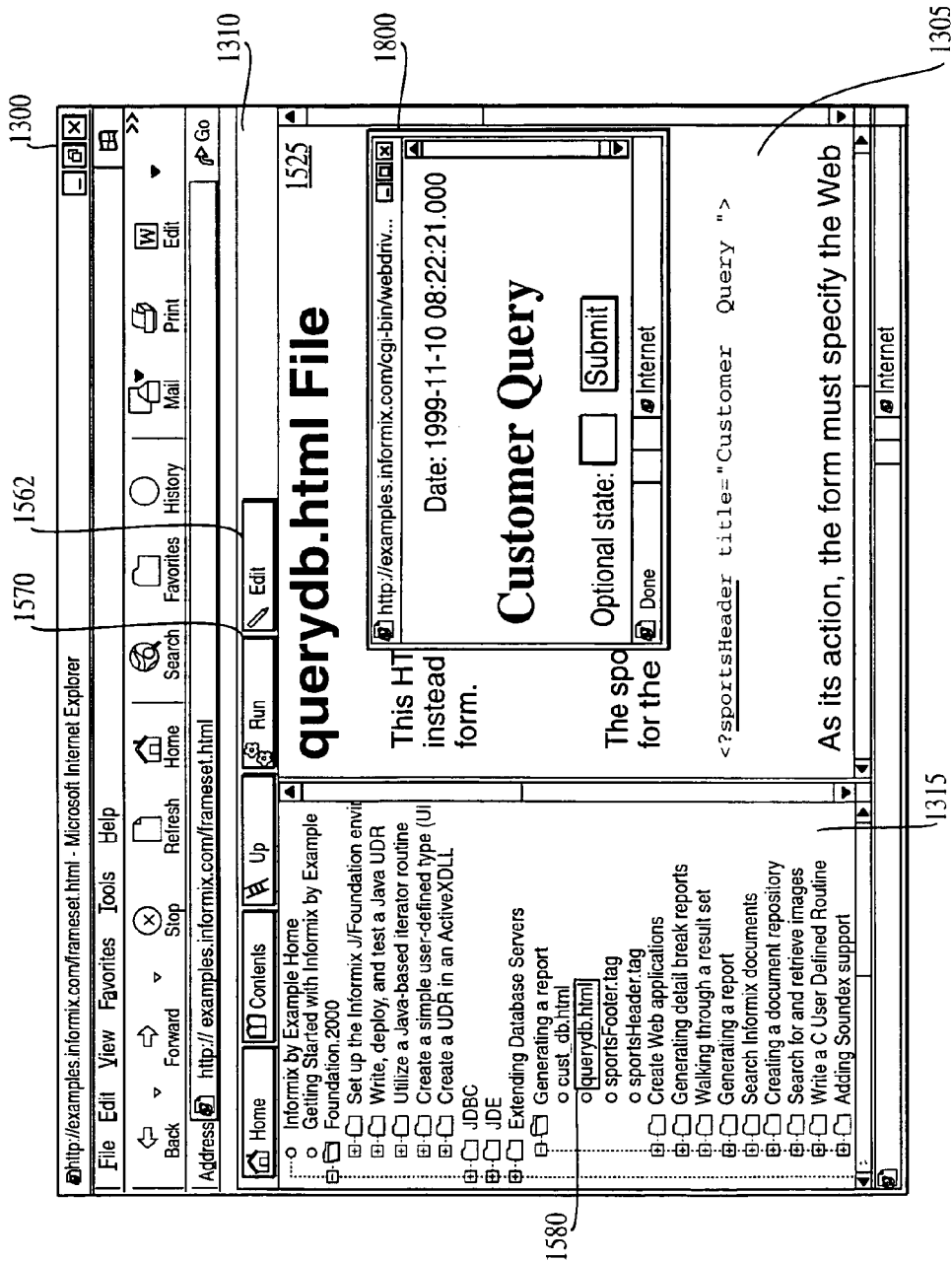

In FIG. 15A, the user can run the example by selecting the Run button 1570. Referring to the flow chart 1655 in FIG. 16C, upon selection of the Run button 1570, the example launches (step 1660), using any of the methods described above, in a browser window 1800, as shown in FIG. 18A. The TOC frame 13 15 simultaneously and automatically synchronizes with the running example by highlighting the current annotation page for the source code that implemented the example. A PERL script generates the TOC automatically by parsing the HTML pages for links that indicate hierarchical structure much like the automatic generation of the annotation pages.

Moreover, the example simultaneously and automatically synchronizes the content frame 1305 with the running example by displaying the current annotation page, in this example, the querydb.html file 1525 discussed above. The user can then view the annotated source code or edit the source file while the example is running, and jump from keywords to the reference documentation for the keywords as described above.

Figure 18B:
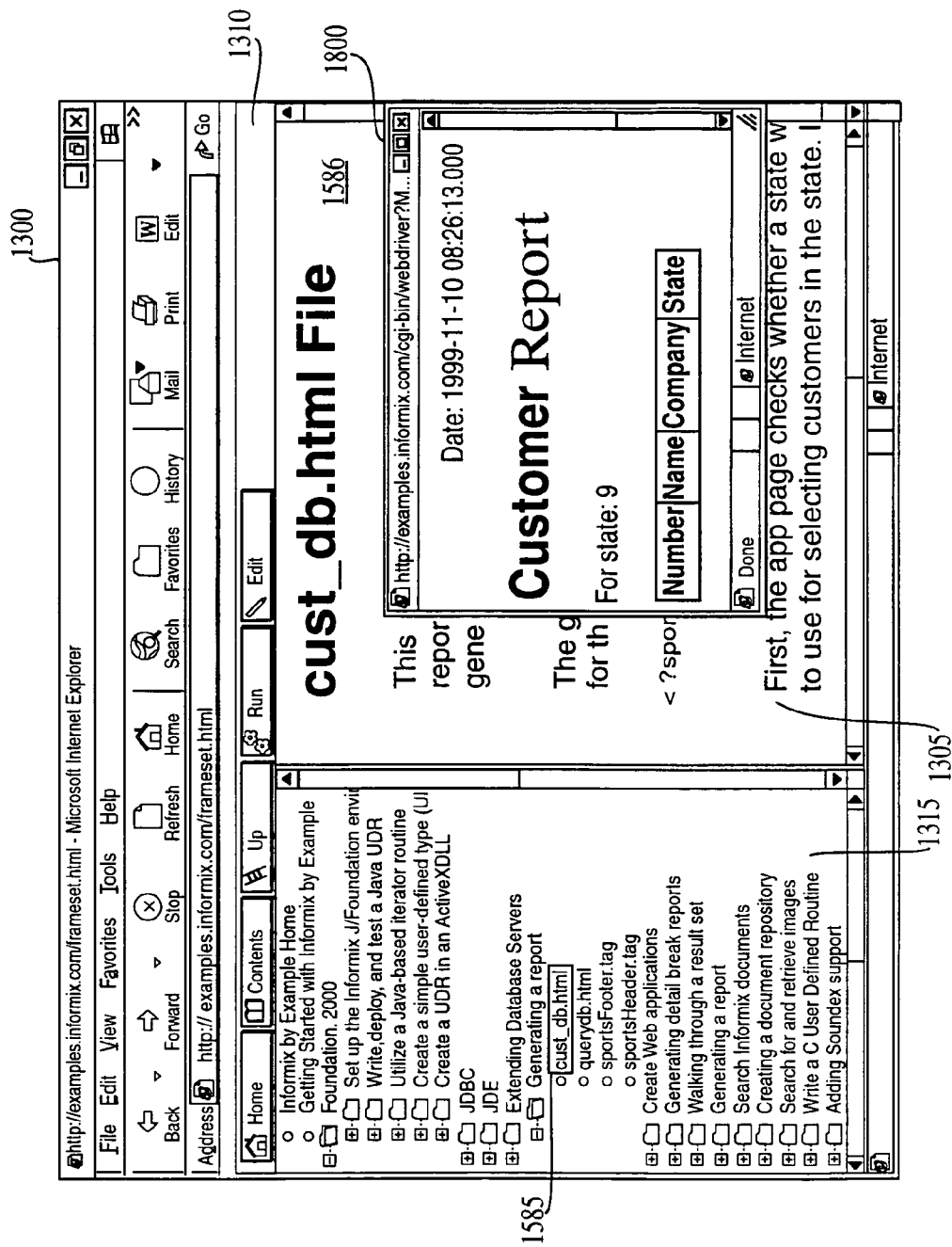

When the user interacts (step 1665) with the example in the browser window 1800, (by, for example, entering a customer number and selecting the "Submit" button in the browser window 1800), the user interface changes (for example, the Customer Report corresponding to the entered customer number) in the browser window 1800, as shown in FIG. 18B (step 1670). The user interface changes correspond to the next annotation page, cust_db.html file, 1586 used in the running example. The running example automatically and simultaneously calls an annotation request module with the example, file, class and function names of the program unit for which annotations should be displayed (step 1675). The annotation request module maps that request to an annotation page and tells the browser to display the annotation page in the content frame (step 1680). For example, in FIG. 18B, the next annotation page is cust_db.html 1586. The cust_db.html subtopic is highlighted 1585 in the TOC frame 1315 and the content frame 1305 displays the cust_db.html annotation page 1586, as shown in FIG. 18B. Embedded annotation markup 1810 are shown in the cust_db.html source code file displayed in FIG. 18C. The embedded markup 1810 is used when generating the annotation page from the source code file.

Figure 19A:
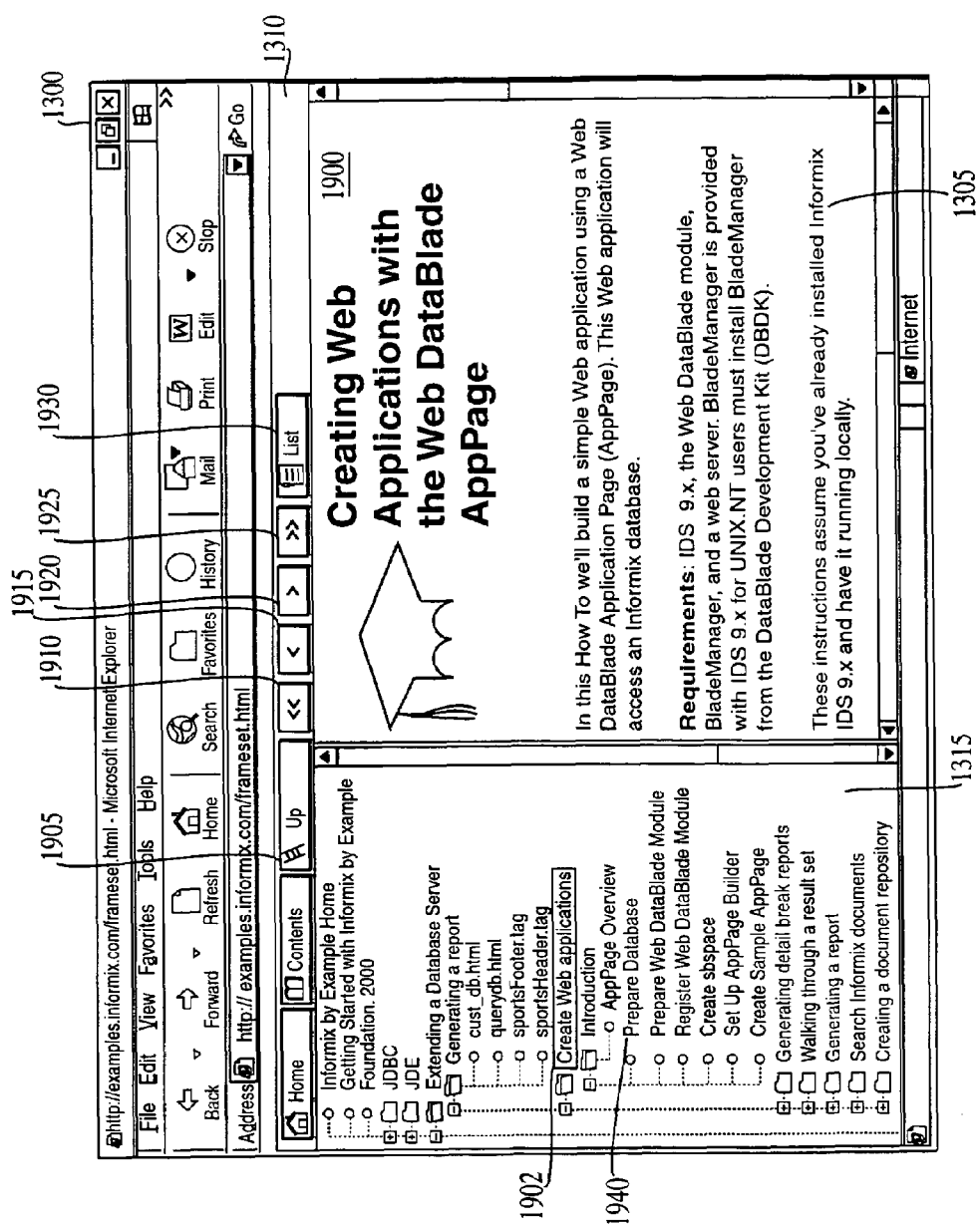

Referring again to FIG. 14C, in addition to selecting an example, the user could also select a how to document icon or link 1450 in the content frame 1305 or a how to document subtopic link 1455 in the TOC frame 1315. In this case, a how to document 1900 is displayed in the content frame 1305, as shown in FIG. 19A. For clarity, the complete document 1900 is shown in FIG. 19B. In synchronization, the TOC frame 1315 highlights the displayed subtopic 1902 corresponding to the how to document 1900.

Also in synchronization, the top frame 1310 dynamically changes to reflect the selected how to document 1900. For example, in the top frame are now displayed an up button 1905, a first page button 1910, a previous page button 1915, a next page button 1920, a last page button 1925, and a list button 1930. The up button 1905, when selected, jumps to the category or subtopic that lists the how to document 1900. For example, the subtopic "Extending a Database Server" lists the "Create Web applications" how to document 1900, and upon selection of the up button 1905, the browser would display all information relating to the "Extending a Database Server" subtopic, as shown in FIG. 14C. Generally, the top frame changes to match the content type which is specified in the Java Script call that notifies the framework that a new content page has displayed.

The document 1900 contains pointers to other documents or pages, the pointers being accessed in one of several ways. The pointers may be selected directly from the content frame 1305 by clicking on a link in the content frame which is indicated by, for example, a different color, font, or style. For example, the user may click on the Application Page link 1930 or the Prepare Database link 1935 in the content frame 1305 as shown in FIG. 19B. Pointers may be selected from the TOC frame 1315 by selecting a subtopic for the Create Web applications document 1902. For example, the subtopic Prepare Database 1940 corresponds to the link Prepare Database 1935, and selection of either of these pointers would take the user to the same document. Upon selection of a pointer, the document or page corresponding to the pointer is then displayed to the user.

Figure 19C:
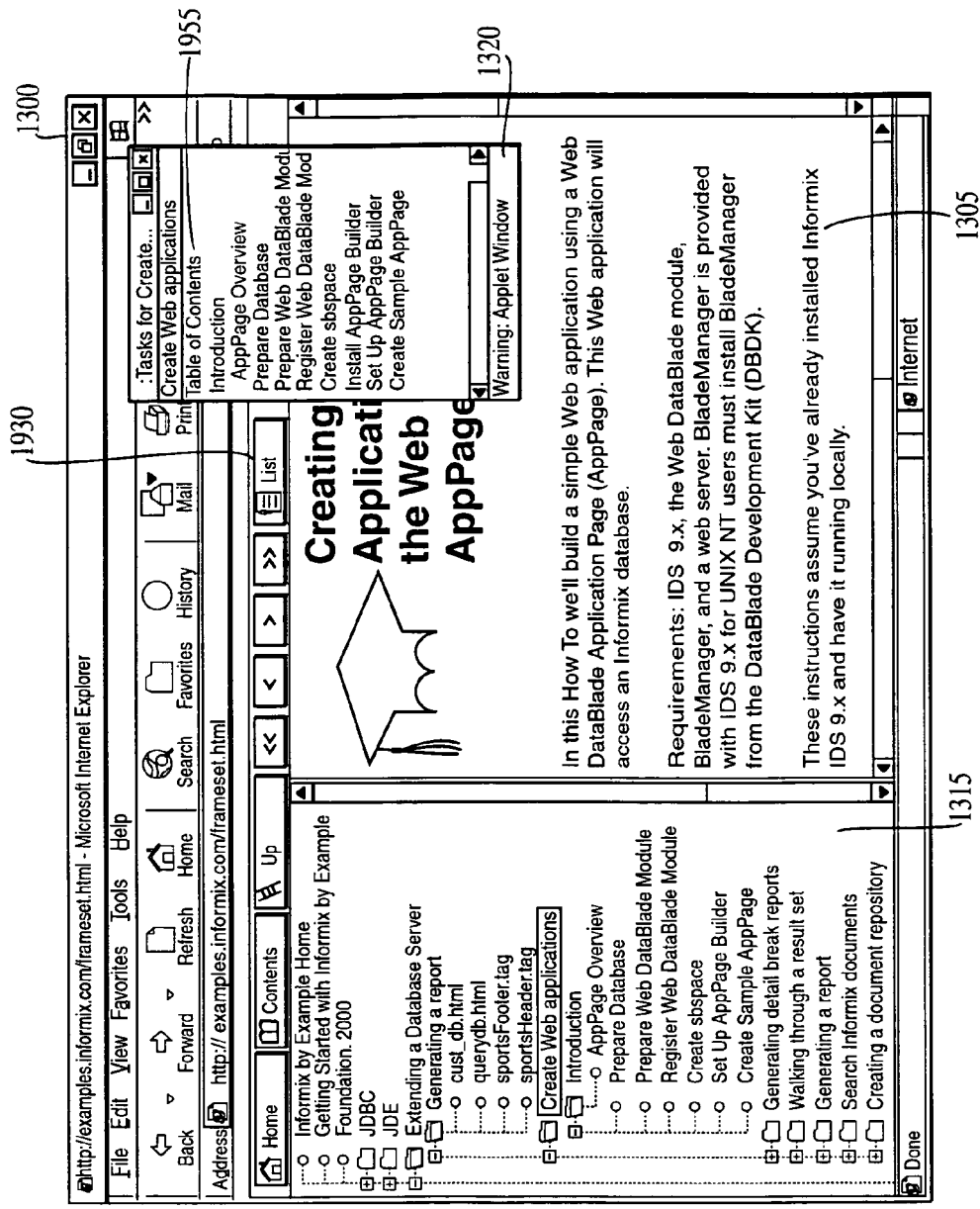

Referring also to FIG. 19C, if the user selects the list button 1930 in the top frame, a local table of contents window 1320 is displayed. For example, if the user selects the list button 1930 in FIG. 19A, the window 1320 is spawned, as shown in FIG. 19C. A traditional model for navigating a document is with a hierarchical table of contents. The TOC model orients the user at all times but restricts the content, which may not fit a hierarchy. A newer model for navigating a document is the hypertext web. The web model links any topic in a document with a more detailed document that expands on the same topic. The web model removes artificial restrictions but quickly disorients the user.

Figure 19D:
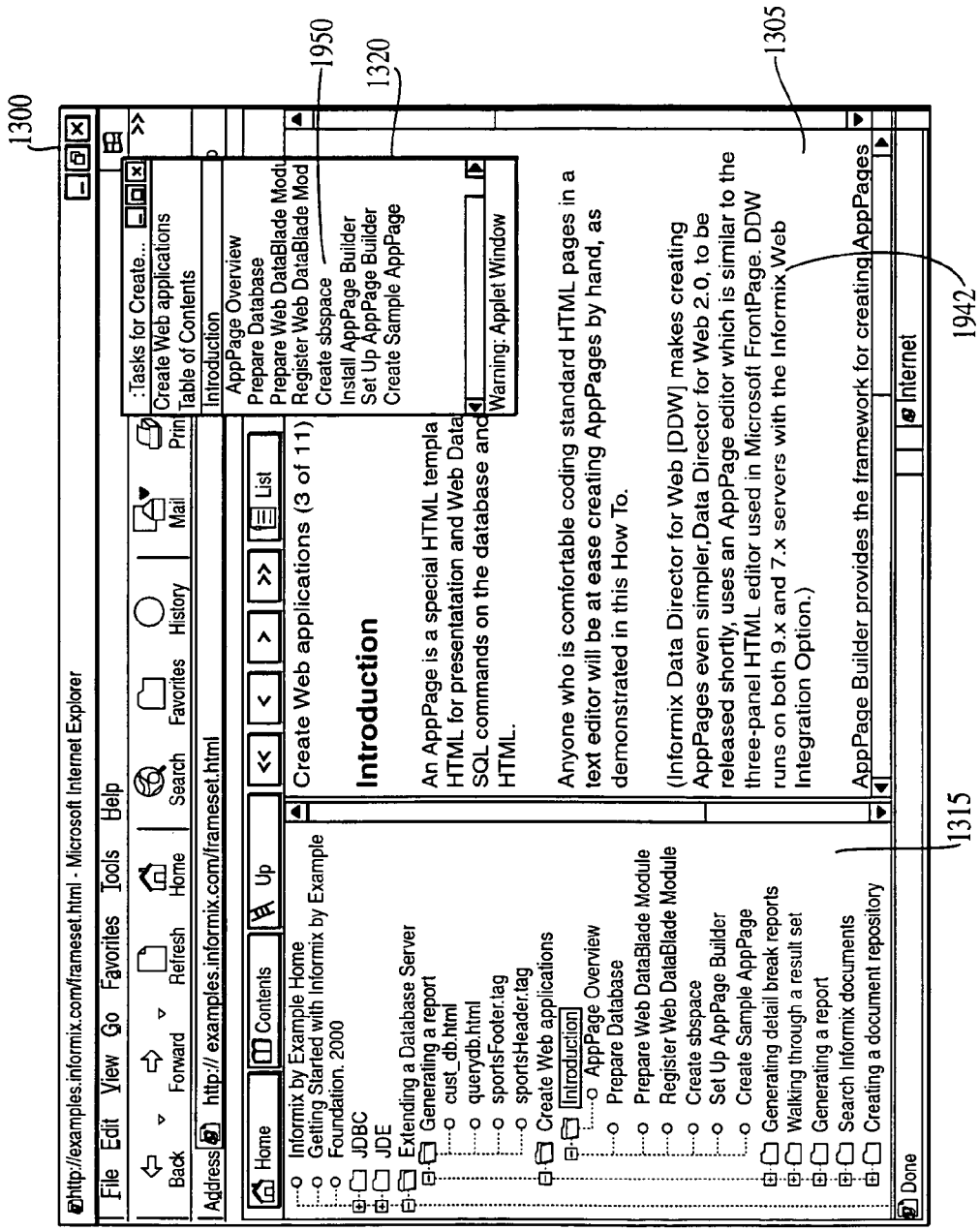

In contrast, the web version of by Example® uses a local table of contents model that provides a structured hierarchical view at a local corner of an unstructured web page of links. In this model, some of the pages in the document are root pages for the local TOC. For example, the page corresponding to the Create Web applications document 1900 is a root page for the local TOC. When the user navigates to any page that is unique to the local TOC, such as the root page (which is unique), the framework applet reads the local TOC for that root page. As seen in FIG. 19D, when the user navigates to the Introduction page in the local TOC 1320, the framework applet reads the local TOC for that root page and displays the corresponding information in the TOC frame 1315 and the content frame 1305. Each page in the local TOC is unique within the local TOC. The user can step through the pages in the local TOC sequentially, see the number of the page in the local TOC sequence, or view the local TOC hierarchy with the current page selected. Thus, the user is oriented within the local topic.

Figure 19E:
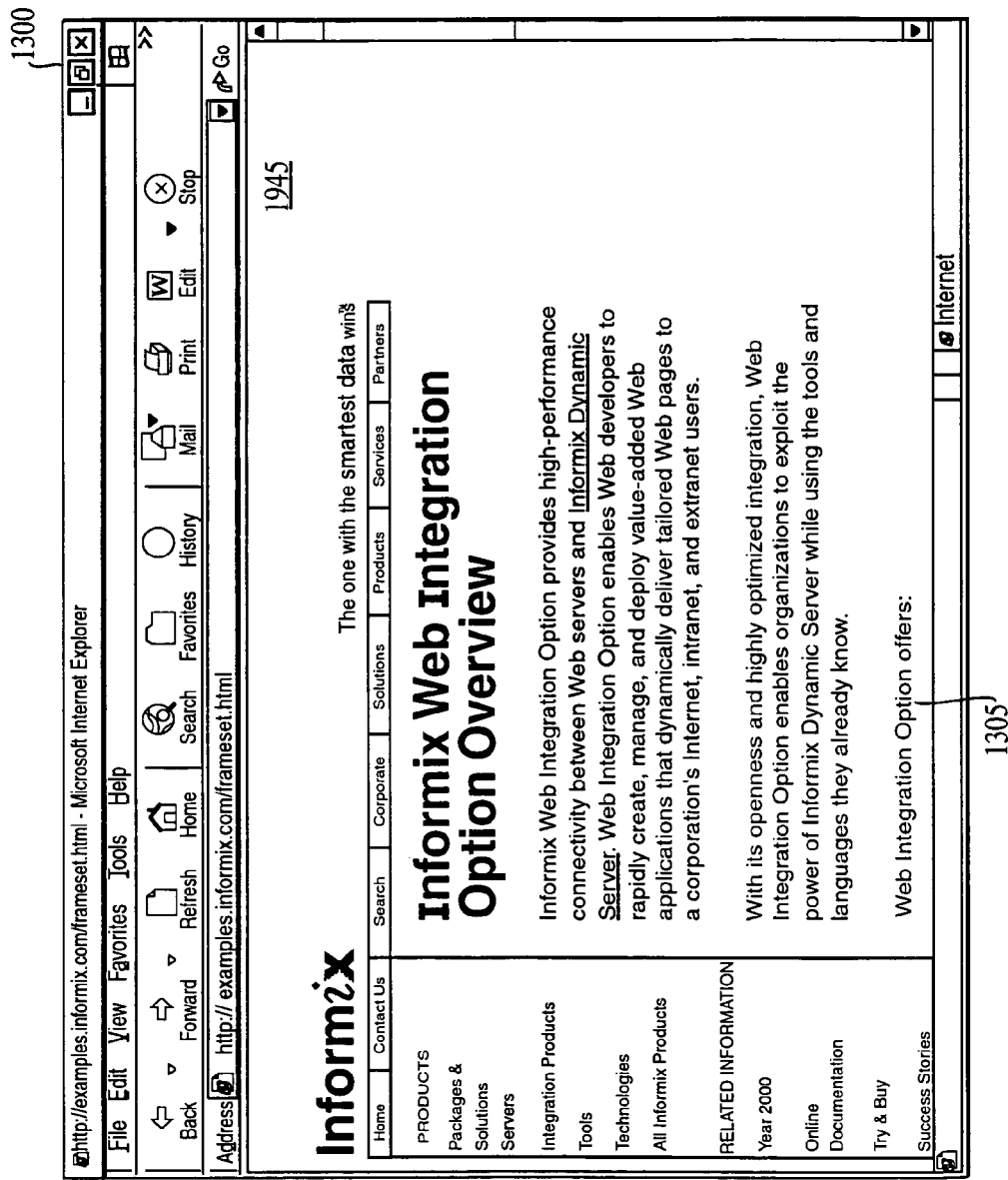

The local TOC does not constrain links in pages within the local TOC. That is, pages within the local TOC can have links to pages that are not in the local TOC 1320. For example, when the user selects the Informix Web Integration Option link 1942 in the Introduction document, the browser opens an Informix Web Integration Option page 1945 that is not in the local TOC 1320, as shown in FIG. 19E.

Moreover, pages can appear within multiple local TOCs. For example, the page entitled "Create subspace" 1950 in the local TOC in FIG. 19D might appear in another local TOC relating to another document. Only the root page (in this example, the "Create Web applications" page 1900) is constrained to a single local TOC.

Figure 19F:
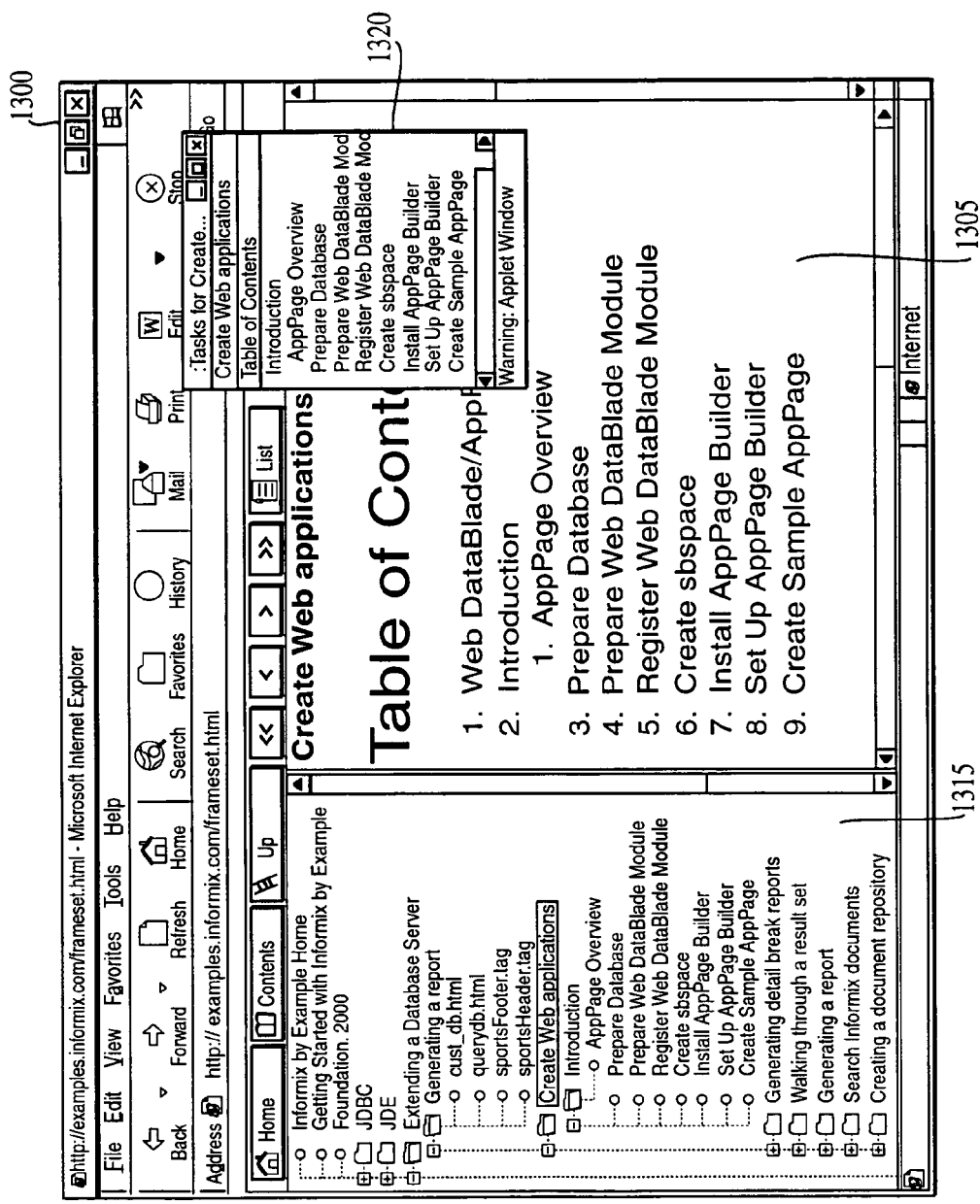

The user may navigate through the local TOC directly from the local TOC Window by selecting the topic of interest in the local TOC. Additionally, the user may navigate the through the local TOC via the top frame 1310 using the first page button 1910, the previous page button 1915, the next page button 1920, or the last page button 1925. These buttons basically turn the pages in the document for the user by moving through the local TOC. For example, if the user selects the next page button 1920 while in the Create Web applications document 1900, the browser displays the next document in the Create Web applications document, which is the "Table of Contents" document 1955, as shown in FIG. 19F.

Figure 20:
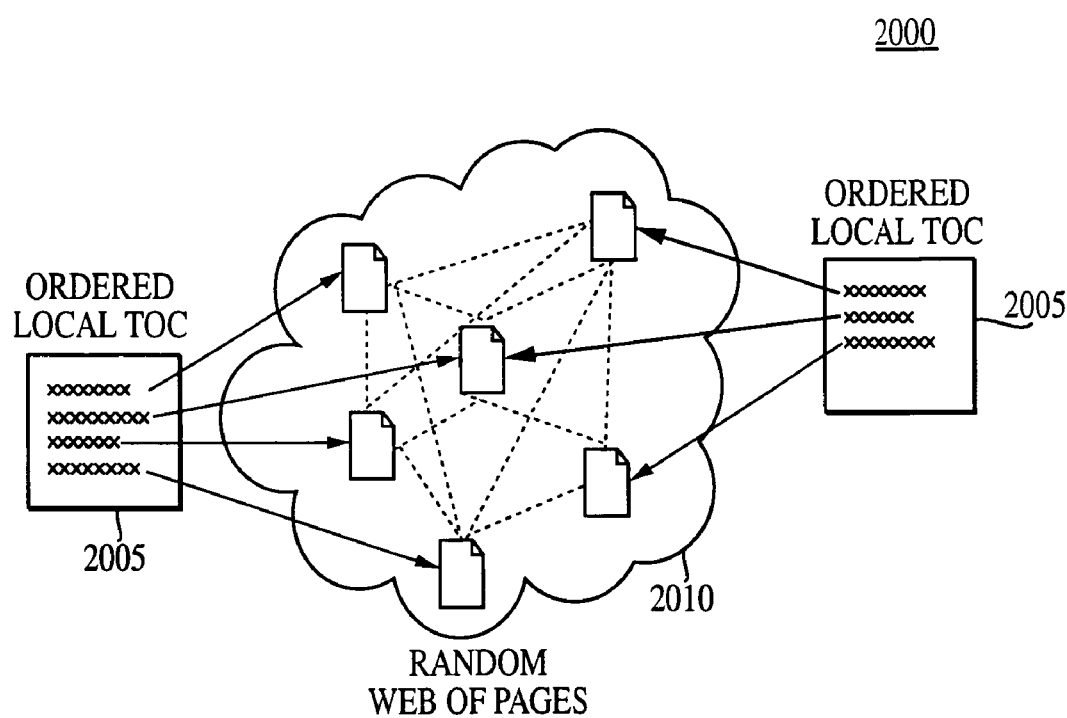
FIG. 20 is a block diagram of a local table of contents model used in the web-based application.

Referring to FIG. 20, a model 2000 of how the local TOCs 2005 are built is shown. The building of local TOCs imposes ordered views on the unstructured (or random) web of pages 2010, thus facilitating viewing of the web of pages 2010.

Other embodiments are within the scope of the following claims.

The web-based instruction system may support Java, Visual Basic, C, C++, HTML, Perl, JavaScript, SQL, Informix Stored Procedure Language (SPL), Embedded SQL for C(ESQL/C), SQLJ, JSP, ASP, and Informix Web DataBlade Module languages.

What is claimed is:

1. A method, performed in a web-based environment on a computer system, of helping a user learn to develop an application, the method comprising:
    providing dynamic, interactive examples demonstrating how to accomplish a task in the application;
    presenting an annotation page that includes one or more annotations descriptive of various aspect of the examples as they are being executed, each annotation including keyword links, annotation links, and detail of implementation of the application and explanation of code used in the application;
    providing a link to a resource in an annotation from among the one or more annotations;
    if the user selects a keyword link, presenting reference documentation associated with that keyword;
    if the user selects an annotation link, presenting another annotation descriptive of another source file of the application;
    executing one or more of the predetermined plurality of applications by downloading a hyper-text markup language page containing a Java applet; and
    presenting one or more annotations descriptive of the performed application in coordination with execution of the one or more of the predetermined plurality of applications.

2. The method of claim 1 in which performing the application comprises receiving input from the user.

3. The method of claim 2 further comprising presenting another annotation page in coordination with execution of the application based on input from the user.

4. The method of claim 3 in which presenting another annotation page comprises:
  automatically and simultaneously calling an annotation request module including the application, file, class and function names of a program unit for which detail should be displayed;
  mapping the request to an annotation; and
  informing a browser window in the web-based environment to display the other annotation page.

5. The method of claim 2 in which another annotation page is presented in coordination with execution of the application.

6. The method of claim 5 further comprising automatically generating a global table of contents comprising links to annotations by parsing structured links in web pages including annotation pages.

7. The method of claim 6 in which the links in the global table of contents are synchronized with presented annotations by highlighting links corresponding to a current annotation page.

8. The method of claim 7 in which the global table of contents is presented in a first frame of a first browser window, the annotation page is presented in a second frame of the first browser window, and the predetermined application is performed in a second browser window.

9. The method of claim 1 in which performing the predetermined application comprises launching a Java applet or application.

10. The method of claim 9 in which launching the Java applet or application comprises calling a Java application programming interface to ask a web browser to show the annotation page.

11. The method of claim 1 in which performing the predetermined application comprises sending a common gateway interface request to a web server that launches the application in a window in the web-based environment.

12. The method of claim 11 in which the application returns a hyper-text markup language page that includes JavaScript to ask a web browser to display the one or more annotations.

13. The method of claim 1 in which the annotation page is presented in a first browser window and the application is performed in a second browser window.

14. The method of claim 1 in which application implementation detail includes text descriptive of the application, fragments of source code from the application, or both.

15. The method of claim 14 in which source code fragments are imported directly from the source code file of the presented application.

16. The method of claim 1 further comprising automatically generating the annotation page descriptive of the source code file of a application.

17. The method of claim 16 in which generating the annotation page comprises:
  receiving a source code file that has embedded text marked up with instructions;
  parsing the source code to determine a structure of the application; and
  generating one or more annotations based on the application structure and instructions.

18. The method of claim 17 in which generating the annotation page comprises:
  generating one or more annotation links for navigating the annotations of the application;
  generating application implementation detail based on the embedded information; and
  generating one or more keyword links for reference documentation.

19. The method of claim 18 in which generating the annotation page comprises highlighting the keyword links and the annotation links in the annotation page.

20. The method of claim 17 further comprising automatically updating the annotation page descriptive of the source code file of the application when an updated source code file is received.

21. The method of claim 1 further comprising automatically generating a global table of contents by parsing the plurality of annotations for annotation links.

22. The method of claim 21 further comprising providing the global table of contents, in which the global table of contents comprises links to annotations.

23. The method of claim 21 further comprising generating a local table of contents, in which the local table of contents comprises links to web pages including annotation pages relating to an application.

24. The method of claim 23 further comprising providing the local table of contents when a local link in the global table of contents is selected.

25. The method of claim 1 in which the presented annotation page is descriptive of the performed application and the annotation page is presented in coordination with performance of the predetermined application.

26. The method of claim 1 further comprising:
  generating a source code file stripped of annotation mark up, the generated source code file including source code of the application but not including text from the annotations;
  presenting the stripped source code file; and
  permitting the user to edit the stripped source code file.

* * * * *